(12) United States Patent
Ding et al.

(10) Patent No.: US 11,234,204 B2
(45) Date of Patent: Jan. 25, 2022

(54) SERVER SELECTION FOR VEHICLE COMMUNICATIONS AND APPLICATIONS

(71) Applicant: Intel Corporation, Santa Clara, CA (US)

(72) Inventors: Zongrui Ding, Portland, OR (US); Qian Li, Beaverton, OR (US); Xiaopeng Tong, Beijing (CN); Leifeng Ruan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/786,546

(22) Filed: Feb. 10, 2020

(65) Prior Publication Data
US 2020/0178198 A1 Jun. 4, 2020

Related U.S. Application Data

(60) Provisional application No. 62/804,595, filed on Feb. 12, 2019.

(51) Int. Cl.
*H04W 60/04* (2009.01)
*H04W 4/44* (2018.01)
*G07C 5/00* (2006.01)

(52) U.S. Cl.
CPC ............ *H04W 60/04* (2013.01); *G07C 5/008* (2013.01); *H04W 4/44* (2018.02)

(58) Field of Classification Search
CPC .......... G06F 16/2322; G06F 17/30864; G06K 9/00791; G08G 1/202; H04W 4/40
See application file for complete search history.

(56) References Cited

U.S. PATENT DOCUMENTS

| | | | |
|---|---|---|---|
| 2018/0253497 A1* | 9/2018 | Muttineni | G06F 16/951 |
| 2020/0104289 A1* | 4/2020 | Premawardena | G01S 17/86 |
| 2021/0082287 A1* | 3/2021 | Hilgers | H04W 4/40 |

OTHER PUBLICATIONS

International Telecommunication Union, "Maintenance: Introduction and General Principles of Maintenance and Maintenance Organization", Mar. 1993, 69 pages.
"3rd Generation Partnership Project; Technical Specification Group Services and System Aspects; Network architecture (Release 15)", Mar. 2018, 115pages, 3GPP TS 23.002 V15.0.0, France.
"3rd Generation Partnership Project; Technical Specification Group Services and System Aspects; System Architecture for the 5G System; Stage 2 (Release 15)" Dec. 2018, 236 pages, 3GPP TS 23.501 V15.4.0, France.
Automotive Edge Computing Consortium (AECC), "General Principle and Vision—White Paper", Dec. 25, 20115 pages, version 2.1.0.

(Continued)

*Primary Examiner* — Iqbal Zaidi
(74) *Attorney, Agent, or Firm* — Schwabe, Williamson & Wyatt, P.C.

(57) ABSTRACT

Systems, apparatuses, methods, and computer-readable media, are provided for selecting edge or central servers for serving client systems based on network events monitored by one or more network elements. Embodiments may be relevant to multi-access edge computing (MEC) and Automotive Edge Computing Consortium (AECC) technologies. Other embodiments may be described and/or claimed.

41 Claims, 16 Drawing Sheets

(56) References Cited

OTHER PUBLICATIONS

"3rd Generation Partnership Project; Technical Specification Group Services and System Aspects; Architecture enhancements for 5G System (5GS) to support network data analytics services; (Release 16)", Feb. 2019, 40 pages, 3GPP TS 23.288 V0.1.0, France.

"3rd Generation Partnership Project; Technical Specification Group Services and System Aspects; Architecture enhancements for 5G System (5GS) to support network data analytics services (Release 16)", Dec. 2019, 57 pages, 3GPP TS 23.288 V16.2.0, France.

Automotive Edge Computing Consortium (AECC), "Driving Data to the Edge: The Challenge of Traffic Distribution", 2019, 48 pages.

* cited by examiner

SERVER SELECTION FOR VEHICLE COMMUNICATIONS AND APPLICATIONS

RELATED APPLICATIONS

The present application claims priority to, and/or is a continuation of, U.S. Provisional App. No. 62/804,595, titled "MSP EDGE SERVER SELECTION FOR VEHICLE APPLICATIONS", filed on Feb. 19, 2019, the contents of which are hereby incorporated by reference in its entirety.

FIELD

Various embodiments of the present application generally relate to the field of wireless communications, and in particular to Edge Computing technologies for supporting vehicle-to-everything (V2X) communications.

BACKGROUND

Vehicular mobile communications is increasing in importance for applications/services to make driving safer, improve traffic flow, provide energy consumption efficiencies, and reduce emissions. Several emerging services, such as intelligent driving, the creation of maps with real-time data and driving assistance based on cloud computing, may require vehicles to be connected to a cloud computing service and one or more networks to facilitate the transfer of large amounts of data among vehicles and between vehicles and the cloud. Cellular networks may provide mobile connectivity for vehicles, and 3GPP has produced standards for vehicle-based mobile networks. Current 3GPP standards for vehicle-based mobile networks (e.g., cellular V2X) mainly covers latency-sensitive safety applications and may not fully ensure the big data capacity growth between vehicles and the cloud.

Automotive Edge Computing Consortium (AECC) is a consortium for supporting network and computing infrastructure needs of automotive big data. AECC focuses on increasing network and computing capacity to accommodate automotive big data between vehicles and the cloud using edge computing and efficient system design. The AECC system architecture uses cellular networks as the primary access technology. However, the AECC system architecture lacks access network assisted edge selection mechanisms.

DETAILED DESCRIPTION

In the detailed description to follow, for ease of understanding, the present disclosure will be presented in the context of the AECC system being developed. However, the present disclosure is not limited to AECC compliant system only, and may be practiced in any edge computing system or edge network. AECC is a consortium for driving the network and computing infrastructure needs of automotive big data. AECC focuses on increasing network and computing capacity to accommodate automotive big data smartly between vehicles and the cloud using edge computing and more efficient system design. In the AECC system being developed, a vehicle User Equipment (vUE) can access services from an Mobility Service Provider (MSP) center server via one of a plurality of MSP edge servers, each of which are communicatively coupled with a respective network. Each network may utilize different Radio Access Technologies (RATs) and/or may be operated by different mobile network operators (MNOs). The MSP center server may be or represent, for example, a service provider platform, a cloud computing service, or the like. The MSP edge servers may be one or more application servers, Content Delivery Network (CDN) servers, MEC servers/hosts, or some other like server deployed at the "edge" of a network. In other words, the AECC system sits on top of an existing network access technology (e.g., Long Term Evolution (LTE), $5^{th}$ generation (5G) or New Radio (NR), WiFi (IEEE 802), dedicated short-range communications (DSRC), etc.). The present disclosure introduces apparatuses, systems, and procedures to enable access network assisted MSP Server selection.

Automotive Edge Computing Consortium (AECC) Aspects

Figure 1:
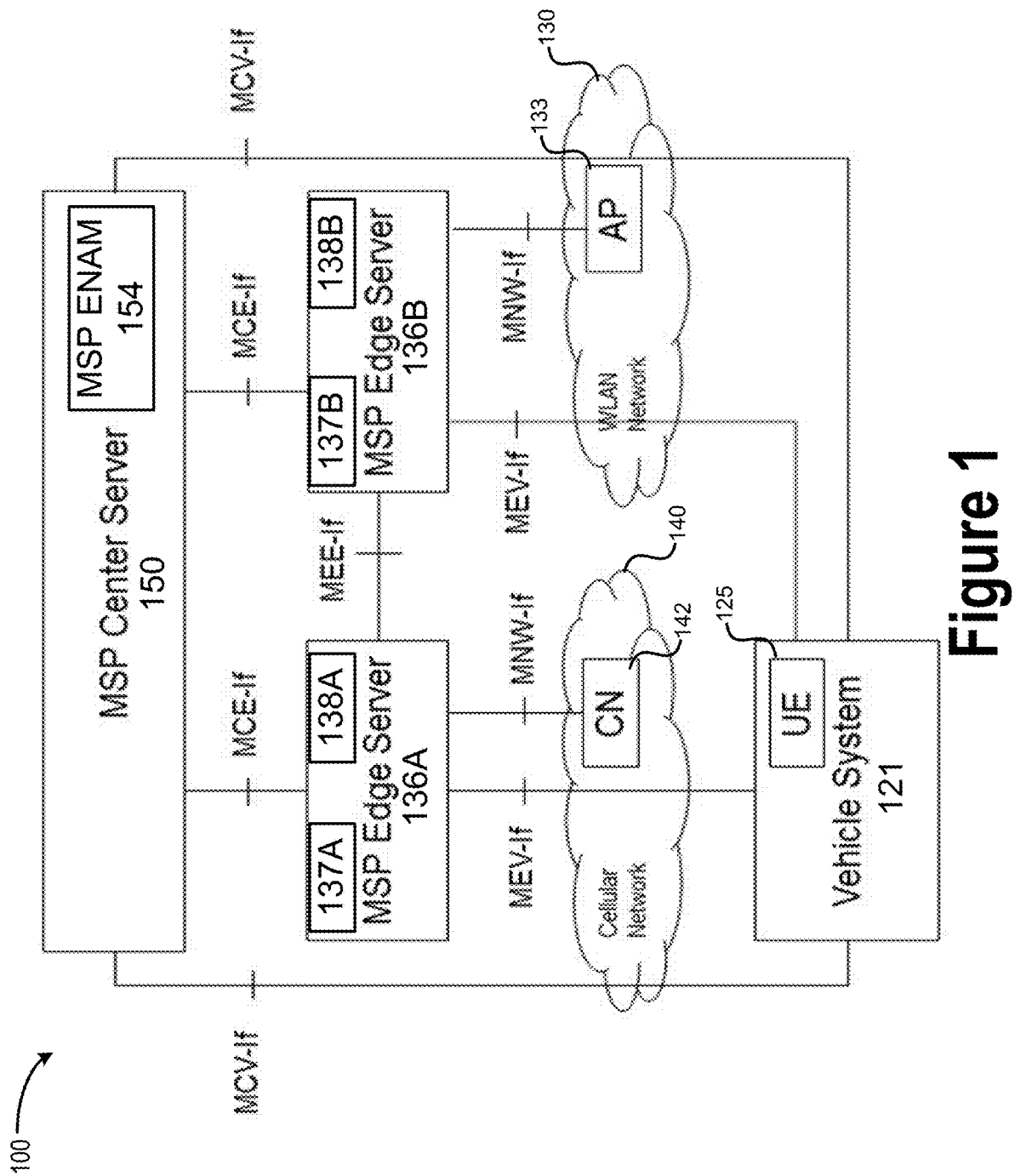
FIG. 1 illustrates an example AECC distributed cloud (or edge) computing architecture according to various embodiments.

Referring now to FIG. 1, which illustrates an example Automotive Edge Computing Consortium (AECC) system 100 according to various embodiments. AECC system 100 is an end-to-end system including vehicle systems 121, access/core networks, and cloud computing infrastructure that realizes the AECC use cases. The AECC system 100 may be built on a distributed computing and networking architecture, which includes the vehicle system 121; one or more networks including the cellular network 140, the wireless local area network (WLAN) 130, an MSP enterprise network (not shown by FIG. 1); and MSP servers including the MSP center server 150 and the MSP edge servers 136A and 136B (collectively referred to as "MSP edge servers 136" or "MSP edge server 136"). MSP edge servers 136A and 136B are respectively disposed at an edge of a communication network. The term "MSP" may refer to "Mobility Service Provider" or "Managed Services Provider", which is a platform-independent (service) provider that provides customers with access to one or more Connected Vehicle services, for example. For purposes of the present disclosure, "edge computing" refers to a type of distributed computing paradigm where the computing process is allocated to computing instances and data storage located at the Network Edge (closer to) in order to provide desired service levels, for example by improving response times and/or to conserve bandwidth. The "edge" of the communication network refers to the outermost part of a communication network that a client or user equipment connects to, and does not include the client or user equipment itself. The edge of a network, or "network edge" may also refer to one or more locations within a network domain in close adjacency to the source of the data producer/consumer. In embodiments, the AECC system 100 may be a cloud computing service used to run applications as needed.

As shown by FIG. 1, the MSP center server 150 is connected with individual MSP edge servers 136 via respective MCE-If reference points (discussed in more detail infra). A "center server" refers to computing hardware and software deployed in cloud or on premise to provide Connected Vehicle services. In some implementations, the MSP center server 150 may be a content delivery network (CDN), a cloud service provider (or "cloud"), and/or some other distributed computing platform. Here, the cloud may refer to a logical server that hosts services to store, manage, and process data, and/or a system including a set of remote servers accessed via the internet. In some embodiments, the MSP center server 150 may be connected to the cellular network 140 (or the core network 142) and the WLAN 130 (or the AP 133) via respective MCN-If reference points (not shown by FIG. 1).

Figure 15:
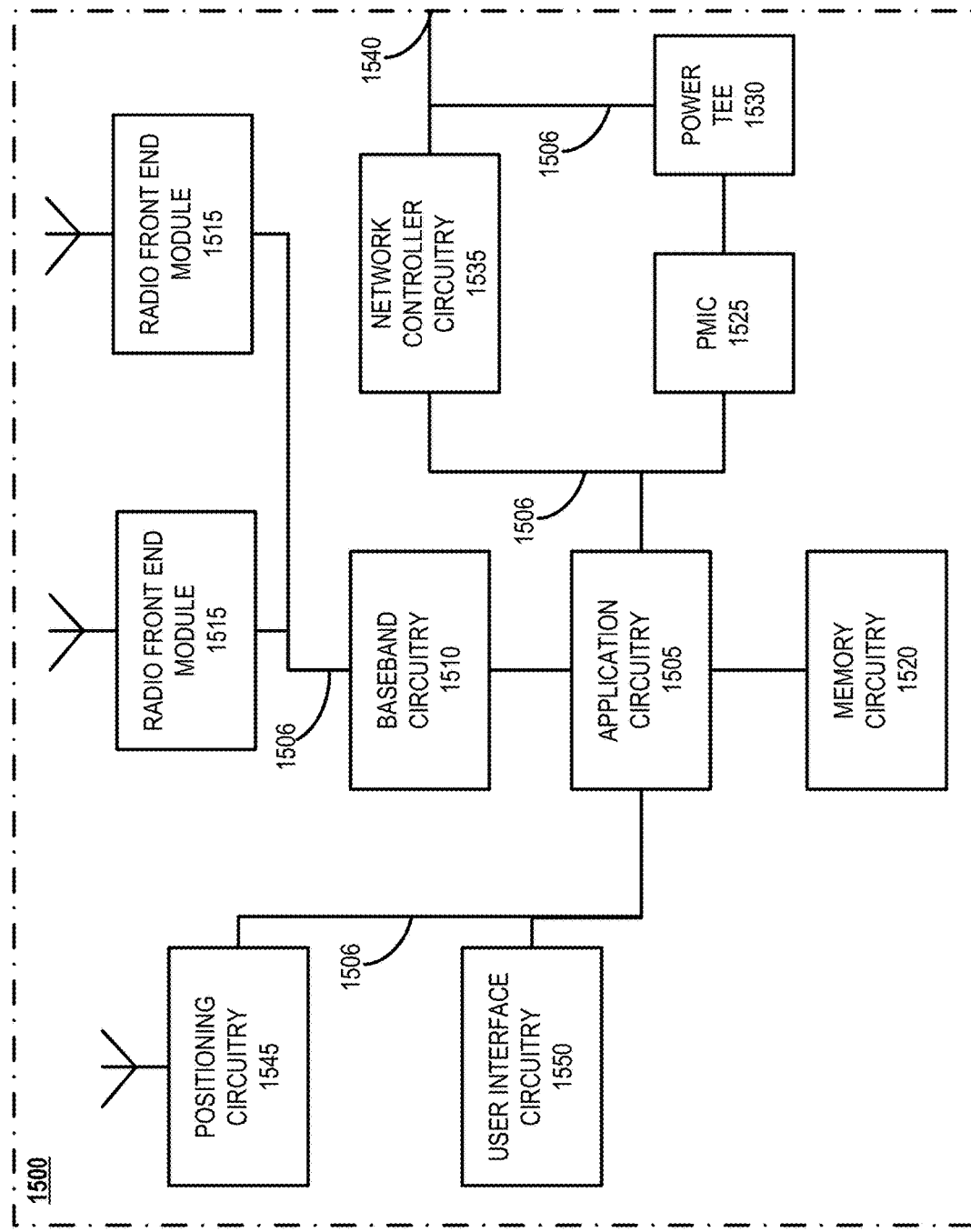
FIG. 15 depicts an example of infrastructure equipment in accordance with various embodiments.

The MSP center server 150 may include network interface circuitry (e.g., network controller circuitry 1535 of FIG. 15) coupled with processing circuitry (e.g., application circuitry 1505 of FIG. 15). The network interface circuitry may be arranged to communicatively couple the MSP center server 150 with the plurality of MSP edge servers 136. The processing circuitry is arranged to operate an MSP edge node allocation module (ENAM 154), which is an entity that manages data session and service continuity, and in particular, V2X data sessions and service continuity, for the connected vehicle across multiple MSP edge servers 136 in a multi-RAT environment, such as AECC system 100. For example, the processor circuitry may operate the MSP ENAM 154 to select an individual MSP edge server 136 of the plurality of MSP edge servers 136 to which traffic, computational tasks, and/or workloads of an individual vehicle system 121 (or vUE 125) should be offloaded, provision the individual vehicle system 121 (or vUE 125) with edge server information of the selected MSP edge server 136, provision the selected MSP edge server 136 with vehicle system 121 (or vUE 125) information, and handle/control MSP edge server 136 handover operations. The selection of an individual MSP edge server 136 may be based on receipt of an access network selection message and/or an access network reselection message from the vehicle system 121 (or vUE 125), and/or the compute capabilities of the MSP edge servers 136 or the services provided by the MSP edge servers 136.

Each of the plurality of MSP edge servers 136, as described earlier, are disposed at an edge of a corresponding communication network, and are arranged to provide network services and/or computing resources (e.g., computational task and/or workload offloading, cloud-computing capabilities, information technology (IT) services, and other like resources and/or services as discussed infra) in relatively close proximity to vehicle systems 121 and/or vehicle user equipment (vUEs) 125. An "edge server" refers to computing hardware and software deployed at a suitable location within the network to provide a relatively good balance among performance, efficiency, and availability for connected vehicle services.

Each MSP edge server 136 may include processing circuitry (e.g., application circuitry 15305 of FIG. 153) and network interface circuitry (e.g., network controller circuitry 1535 of FIG. 153) coupled with the processor circuitry. The network interface circuitry may be arranged to communicatively couple each MSP edge server 136 with a respective access network (e.g., cellular network 140 and WLAN network 130 in FIG. 1). In FIG. 1, the MSP edge server 136A is connected with the cellular core network (CN) 142 via a first MNW-If reference point, and MSP edge server 136B is connected with the access point (AP) 133 in the WLAN 130 via a second MNW-If reference point. Although FIG. 1 shows a one-to-one correspondence between MSP edge servers 136 and access networks, in some implementations, one or more MSP edge servers 136 may be communicatively coupled with multiple access networks. In some implementations, the MSP edge servers 136 may be edge computing servers, such as MEC servers (see e.g., FIGS. 8-10), CDN servers, application servers, and/or other like infrastructure equipment. In some implementations, the deployment location of the MSP Edge Servers 136 can leverage a suitable cellular network 140 access technology such as 5GS Edge Computing technology, which can allow User plane Function (UPF) steering data traffic to local data network as shown in the 5GS architecture reference model (see e.g., 3GPP TS 23.501). This may provide flexibility for the AECC system 100 deployment and address use cases that have low latency and/or low delay requirements.

Each of the MSP edge servers 136 are also connected with the vehicle system 121 via respective MCV-If reference points. In addition, the MSP edge servers 136 are connected with each other via an MEE-If reference point (the MSP edge servers 136 may also connect with other MSP edge servers 136 via other MEE-If reference points, which are not shown by FIG. 1). Furthermore, the MSP center server 150 is connected with the vehicle system 121 via individual MCV-if reference points of respective networks 140 and 130. Although not shown by FIG. 1, the AECC system 100 may serve multiple vehicle systems 121.

The vehicle system 121 may be or may include a vehicle UE ("vUE") 125 capable of attaching to one of the networks 130 and 140, and communicating with the MSP edge servers 136 over the cellular network 140 or the WLAN 130 via individual MEV-If reference points. The vehicle system 121 and/or the vUE 125 may be referred to as a "connected vehicle", which is a network attached vehicle that exchanges data with the cloud and other network attached devices and servers. To simplify discussions herein, the term "connected vehicle" may be used throughout this disclosure to refer to the vehicle system 121, the vUE 125, or both, even though these terms may refer to different concepts. The vehicle system 121 or the vUE 125 may include or operate a mobile communications module ("Mobile Comms Module") (not shown by FIG. 1), which is an application running in the connected vehicle that has the capability to interact with the MSP servers 150, 136 and/or other elements/devices in the AECC system 100. For example, in some embodiments, the vUE 125 may include baseband circuitry (e.g., baseband circuitry 1410 of FIG. 14) arranged to operate at least one wireless communication protocol entity to perform an attachment procedure to attach to an access network, and the vehicle system 121 or the vUE 125 may include application circuitry (e.g., processor circuitry 1402 of FIG. 14) communicatively coupled with the baseband circuitry. The application circuitry may be arranged to operate the Mobile Comms Module (also referred to as an "edge networking application" or the like) to register with the MSP center server 150 for accessing computational resources and/or edge networking services from the MSP edge server(s) 136. In some implementations, the Mobile Comms Module may be an internet layer or application layer entity (or application) that operates on top of the access network technology (or control plane protocol stack), which is operated by the vUE 125 to attach to the cellular network 140 or the WLAN 130. In MEC implementations (e.g., where at least the MSP servers 136 are MEC servers), the Mobile Comms Module may be a device application, a client application, or a combination thereof. In some implementations, vUE 125 may include multiple baseband chips for connecting with individual access networks. For example, the vUE 125 may include a cellular network baseband System-on-Chip (SoC) for attaching to and receiving network connectivity from cellular network 140 and a WiFi based baseband SoC for attaching to and receiving network connectivity from WLAN 130. In another example, the vUE 125 may include a first cellular network baseband SoC associated with a first mobile network operator (MNO) and a second cellular network SoC associated with a second MNO different than the first MNO. In another example, the vUE 125 may include a cellular network baseband SoC configured with a first subscriber identity module (SIM) associated with a first MNO used to connect with and receive network services from a first cellular network, and the cellular network SoC may be configured with a second SIM associated with a second MNO different than the first MNO in order to connect with and receive network services from a second cellular network.

The connected vehicle may also perform data gathering and pre-processing, and is responsible for the access interfaces to the cellular network 140, WLAN 130, and/or other networks. In some embodiments, the vehicle system 121 or the vUE 125 may include or operate a data plane (DP) module (not shown by FIG. 1) for performing background data transfer operations with the MSP edge servers 136. The background data transfer procedure is a procedure used to transmit data between vehicle system 121 and an MSP edge server 136 over an Access Network, which can be initiated by MSP edge server 136 or the vehicle system 121. The DP module may be an internet layer or application layer entity that operates on top of the access network technology (or user plane protocol stack) operated by the vUE 125 to communicate data to/from the cellular network 140 or the WLAN 130.

In some implementations, the cellular network 140 may be a 5G/NR cellular network where the CN 142 is a 5G core network (5GC). In these implementations, the 5G 142 may include various network function (NFs), such as those described in 3GPP technical specification (TS) 23.501 version (v) 15.4.0 (2018-12) or the like. In some implementations, the cellular network 140 may be a Long Term Evolution (LTE) cellular network where the CN 142 is an evolved packet core (EPC). In these implementations, the EPC 142 may include various core network entities, such as those described in 3GPP TS 23.002 v15.0.0 (2018-03) or the like. In some implementations, the cellular network 140 may be a non-standalone NR deployment, such as Evolved Universal Mobile Telecommunications Service Terrestrial Radio Access (E-UTRA)-NR Dual Connectivity (EN-DC) wherein the vUE 125 is connected to one evolved nodeB (eNB) that acts as a master node (MN) and one 5G or next generation nodeB (gNB) that acts as a secondary node (SN); NG-RAN E-UTRA-NR Dual Connectivity (NGEN-DC) wherein the vUE 125 is connected to one next generation eNB (ng-eNB) that acts as an MN and one gNB that acts as a SN; and NR-E-UTRA Dual Connectivity (NE-DC) wherein the vUE 125 is connected to one gNB that acts as an MN and one ng-eNB that acts as an SN. The vUE 125 uses an NR-Uu radio interface when the cellular network 140 is an NR/5G network, and the vUE 125 uses an LTE-Uu radio interface when the cellular network 140 is an LTE network.

The WLAN 130 may be a WiFi access technology based on the IEEE 802 standard or may be a 3GPP-based access technology (e.g., NR millimeter wave (mmWave) carriers). In some implementations, the WLAN 130 may connect to the CN 142 and/or connect to an internet service provider (ISP) network. In some implementations, the vUE 125 may connect to an MSP enterprise network (not shown by FIG. 1), which may be a WiFi (IEEE 802.11) network or use a 3GPP-based access technology. In such implementations, the MSP enterprise network may include its own core network based on proprietary technology or 3GPP based CN technology. In some implementations, the MSP enterprise network may be a dedicated core network (DCN) or a Network Slice Subnet Instance (NSSI) comprising dedicated CN entities or network functions for carrying out various MSP functionality.

Data pre-processing is (or is also) done in the MSP edge servers 136 that communicate with the vehicle system 121 via the MEV-If and with other MSP edge servers 136 via the MEE-If. The MSP edge servers 136 may be deployed or located at suitable locations within the AECC system 100 (referred to as the network edge) where the balance between performance, efficiency, and availability is dependent on the particular use case, and may be different from embodiment to embodiment. Each of the MSP edge servers 136 include a respective control plane (CP) modules 137 (e.g., CP module 137A in MSP edge server 136A and CP module 137B in MSP edge server 136B) and respective data plane (DP) modules 138 (e.g., DP module 138A in MSP edge server 136A and DP module 138B in MSP edge server 136B). The CP modules 137 may be software elements (e.g., engines, modules, objects, or other like logical units) that, when executed by suitable processing device(s) of a corresponding MSP edge server 136, perform functions for handling provisioning of UE information by the MSP center server 150 (see e.g., operation 308 of FIG. S1); for subscribing to a suitable network function(s) (NF(s)) in the cellular network 140 and/or the WLAN 130 for notifications regarding network (NW) and/or connected vehicle related events (see e.g., operation 310 of FIG. S1), as well as handling received event notifications from the suitable NF(s); and for handling MSP edge server handover (HO) related procedures/operations. The DP modules 138 may be software elements (e.g., engines, modules, objects, or other like logical units) that, when executed by suitable processing device(s) of a corresponding MSP edge server 136, perform functions for performing background data transfers between the corresponding MSP edge server 136 and the connected vehicle. Although not shown by FIG. 1, the connected vehicle may also include its own DP module for performing background data transfers with an MSP edge server 136.

The MSP edge server 136A communicates with the cellular network 140 or the CN 142 (e.g., one or more network elements within the CN, such as a UPF, Service Capability Exposure Function (SCEF), Network Exposure Function (NEF)) via the MNW-If reference point. Additionally, the MSP center server 150 may communicate with these NFs via the MCN-If reference point. In some implementations, each MSP edge server 136 (or MSP center server 150) acts as an Application Function (AF) when the CN 142 is a 5GC in a 5GS. An AF is an element offering application(s) that use IP bearer resources. This allows the MSP edge servers 136 (or MSP center server 150) to communicate with an NEF in the 5GC 142 using the N33 reference point and/or the Nnef service-based interface for event monitoring and/or other like services such as those discussed in 3GPP TS 23.501 v15.4.0 (2018-12) and/or 3GPP TS 23.502 v15.4.1 (2019-01). In these implementations, the MNW-If (and/or MCN-If) reference point corresponds to the N33 reference point and/or the Nnef service-based interface. Additionally or alternatively, each MSP edge server 136 (or MSP center server 150) acting as an AF may communicate with a Policy Control Function (PCF) over the N5 reference point, where the MNW-If (and/or MCN-If) reference point corresponds to the N5 reference point. Additionally or alternatively, the AFs may expose or otherwise provide services to various NFs in the 5GC 142 via the Naf service-based interface exhibited by each AFs; in this case, the MNW-If (and/or MCN-If) reference point corresponds to the Naf service-based interface. In other embodiments, the MSP enterprise network acts as a Data Network (DN) when the CN 142 is a 5GC in a 5GS, which allows the MSP edge servers 136 and/or MSP center server 150 to communicate with a UPF over an N6 reference point. In these implementations, the MNW-If (and/or MCN-If) reference point corresponds to the N6 reference point.

In some implementations, the MNW-If reference point corresponds (or is mapped) to a T8 reference point when the CN 142 is an EPC. The T8 reference point is between the Services Capability Server (SCS) and/or Application Server (AS) and a Service Capability Exposure Function (SCEF), where the MSP edge server 136 is the SCS/AS. The T8 reference point specifies APIs that allow the SCS/AS (e.g., MSP edge server 136) to access the services and capabilities provided by 3GPP network entities and securely exposed by the SCEF. In other implementations, the MNW-If reference point corresponds (or is mapped) to a S1 reference point when the CN 142 is an EPC. In these implementations, the MNW-If reference point includes a connection/interface between the MSP edge server 136 and one or more access network nodes (e.g., eNBs), and the eNBs are connected by means of the S1 interface to the EPC 142, more specifically to an Mobility Management Entity (MME) by means of an S1-MME interface and to a Serving Gateway (S-GW) by means of an S1-U interface. In some implementations, the MCN-If reference point may correspond to an Rx reference point, which is an interface that allows for dynamic Quality of Service (QoS) and charging-related service information to be exchanged between the Policy and Charging Rules Function (PCRF) and an AF (e.g., the MSP center server 150). This information is used by the PCRF for the control of service data flows and IP bearer resources. In other implementations, the MSP enterprise network acts as a Packet Data Network (PDN) when the CN 142 is an EPC 142, and a PDN GW (PGW) in the EPC 142 terminates the SGi interface towards the PDN. In these embodiments, the MNW-If (and/or MCN-If) reference point corresponds to the SGi interface. For the WLAN 130, the MNW-If (and/or MCN-If) reference point may be some other suitable proprietary interface. In other embodiments, the MNW-If and/or MCN-If reference points for both the WLAN 130 and the cellular network 140 may be new or proprietary interfaces/reference points.

As discussed previously, the MSP center server 150 is communicatively coupled with MSP edge servers 136 via respective MCE-If reference points/interfaces, the MSP center server 150 is communicatively coupled with the vehicle system 121 via MCV-If points/interfaces, the MSP center server 150 may be communicatively coupled with an access network over an MCN-If reference point (not shown), the MSP edge servers 136 are communicatively coupled with the vehicle system 121 via respective MEV-If reference points/interfaces, the MSP edge servers 136 are communicatively coupled with a respective access network (or network element) via respective MNW-If reference points/interfaces, and the MSP edge servers 136 are communicatively coupled with one another via MEE-If reference points/interfaces. For the purposes of the present disclosure, a Reference Point is a conceptual point at the conjunction of two non-overlapping functions or functional groups, and can be used to identify the type of information passing between these functions or functional groups. Additionally, an "interface" is a common boundary between two associated systems or functions. Although "reference point" and "interface" may refer to different concepts, these terms may be used interchangeably throughout the present disclosure. In some cases, one or more reference points can be replaced by one or more service-based interfaces, which provide equivalent functionality. A service-based interface is an interface over which a function or functional group may expose one or more services. Communications taking place over a reference point may be direct (where no intermediate nodes are involved) or indirect (where at least one intermediate node is involved). The direct communication over a reference point may be based on a consumer (or subscriber)/producer model where a consumer is configured with a producer's profile and directly communicates with that producer. The indirect communication over a reference point may also be based on a consumer (or subscriber)/producer model where a consumer queries an intermediate node, selects an end point (or termination point), and the consumer sends the request to the selected producer via the intermediate node. In various embodiments, these reference points/interfaces may operate on top of an existing wired/wireless communication protocol, such as those discussed herein or one or more proprietary communication protocols. Moreover, the connected vehicle can use multiple cellular networks operated by different MNOs as is shown by FIG. 2.

Figure 2:
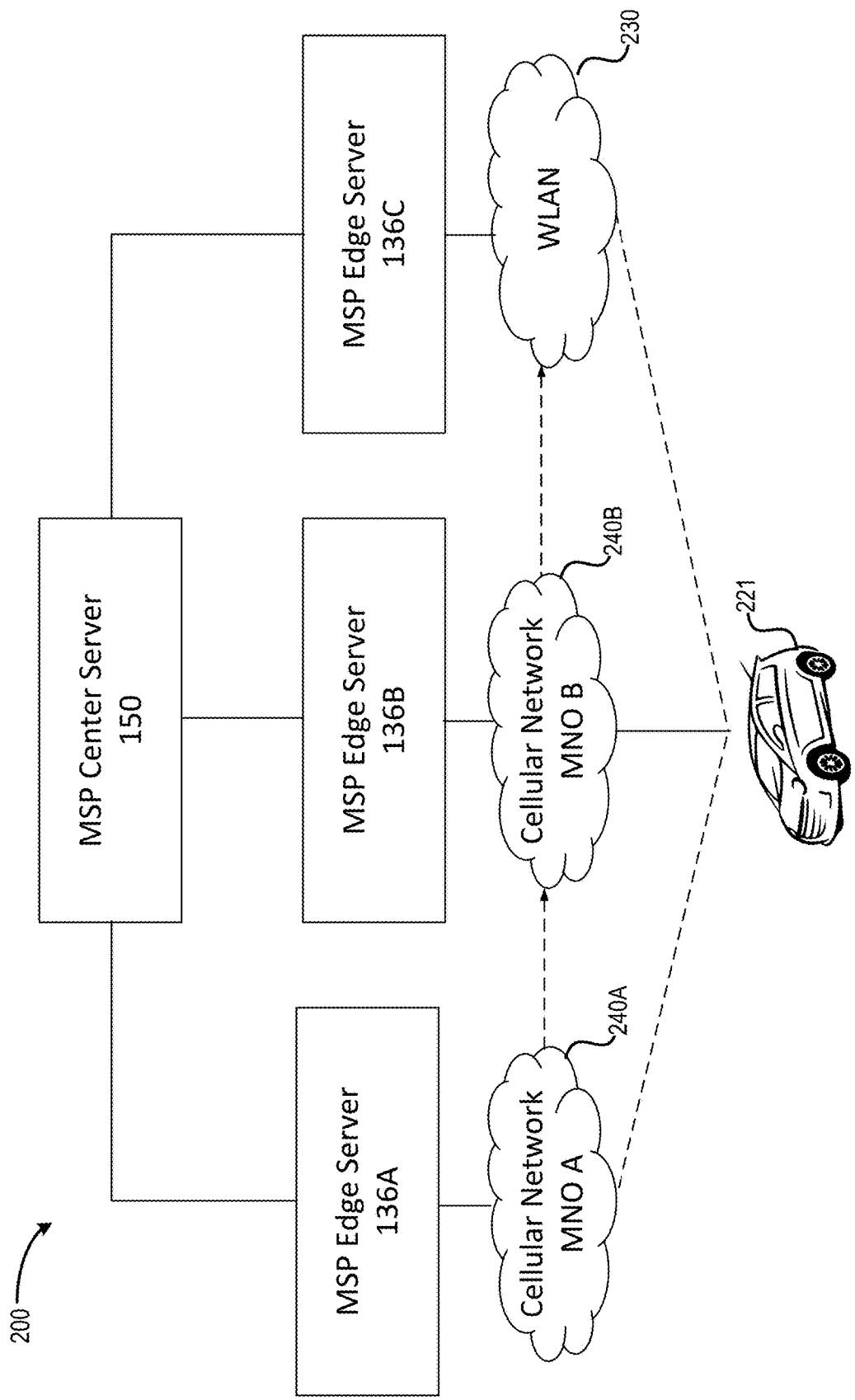
FIG. 2 illustrates another example of the AECC distributed cloud (or edge) computing architecture according to various embodiments.

FIG. 2 illustrates an example of an AECC system 200, according to various embodiments. In this example, the vehicle system 221 (which may include or correspond to vehicle system 121 and/or vUE 125) communicates with an MSP Edge Server 136A via a cellular network 240A associated with a mobile network operator (MNO) A. The vehicle system 221 may be standalone devices, subsystems, and/or systems. The vehicle system 221 may also be mounted/integrated as an individual device/subsystem/system, or a part of a vehicle. Additionally or alternatively, the vehicle system 221/121 includes a vUE 125 that is a mobile device used by a user (e.g., a smartphone or tablet). The vehicle system 221 may perform various embodiments herein together to achieve various goals in driving assistance (DA), navigation and/or like services. The vehicle system 221 may initiate, execute, and/or operate a DA application. The "DA application", for purposes of the present disclosure, refers to any applications, programs, and/or services designed for, but not limited to, DA, inter-vehicle services, intra-vehicular services, navigation assistance, and/or other services such as those discussed herein. The driving refers to various forms of transportation from a location to another location, including but not limited to vehicle driving, bicycling, walking/running, marine travel, and aviation. The AEC system 200 may also be used in other wireless involved services, including but not limited to eCommerce, security services, small cell communications, entertainment and/or infotainment services, navigation services, etc. To simplify discussions herein, only "driving assistance (DA) application" is used throughout this disclosure, but it is noted that all the above-mentioned applications/services can be implemented with the described technologies.

The AECC system 200 (as well as AECC systems 100 of FIG. 1 and AECC system 300 of FIG. 3 discussed infra) enables data communication between vehicle systems 221 and MSP Servers. As used herein, the term "MSP Server" or the like may refer to one or more MSP center servers 150, one or more MSP edge servers 136, or both MSP edge servers 136 and MSP center servers 150. In the case where there are multiple concurrent services in use within the vehicle system 221, the vehicle system 221 may connect to multiple MSP Servers as shown by FIG. 2. For example, in FIG. 2, the vehicle system 221 may connect with MSP Center Server 150, MSP Edge Server 136A or MSP Edge Server 136B. In another example, the vehicle system 221 connects with MSP Edge Server 136B in addition to MSP Edge Server 136C.

Additionally or alternatively, when travelling between various locations, the vehicle system 221 may need to be handed over or handed off from a source MSP Server to a target MSP Server, for example, from MSP edge server 136A to MSP edge server 136B, or from a first MSP center server 150 to another MSP center server 150 (not shown by FIG. 2). The "source" MSP Server refers to an MSP Server that is currently providing services to a vehicle system 221, and a "target" MSP Server refers to an MSP Server that is selected or desired to provide services to a vehicle system 221. Handoff/handover procedures may be triggered by the vehicle system 221 leaving a geographic region or coverage area of one or more MSP Servers (e.g., MSP edge server 136A in cellular network 140A) and entering a geographic region or coverage area of one or more other MSP Servers (e.g., MSP edge server 136B in cellular network 140B). This allow MSP Servers closer to the vehicle system 221 to serve the vehicle system 221, which provide faster and/or more reliable services to the vehicle system 221. Furthermore, MSP Server selection and/or re-assignment procedures may be performed for other purposes, for example, to achieve load balancing among various MSP Servers, or when overload conditions are detected at a particular MSP Server.

The embodiments herein provide access network assisted MSP Server Selection procedures for selecting one or more MSP Servers to serve a vehicle system 221. In these embodiments, a cellular network may provide or use information about the vehicle system 221 to help decide on which MSP Server should be selected for a particular vehicle system 221. Additionally or alternatively, the cellular network provides triggers for triggering an MSP Server Selection procedure.

In one embodiment, the cellular network may provide status information and/or events to an MSP Server that performs an MSP Server Selection procedure to select one or more MSP Servers to serve a vehicle system 221. This is referred to as an access network assisted AECC server based selection procedure, which is described in more detail infra with respect to FIG. 7. In another embodiment, the cellular network provides status information and/or events (e.g., alternative access, tariffs, QoS parameters, interference, congestion, and/or other like information) to the vehicle system 221, which then performs an MSP Server Selection procedure to select one or more MSP Servers with which to connect and consume services. This is referred to as an access network assisted vehicle based selection procedure, which is described in more detail infra with respect to FIG. 8. In another embodiment, the cellular network may use the status information/events and make the MSP server selection decision itself. This is referred to as an access network assisted non-AECC server based selection procedure, which is described in more detail infra with respect to FIG. 6.

Each service scenario may require the vehicle system 221 to connect to a certain MSP Server that is hosting dedicated applications for respective services. The objective of the MSP Server selection will vary, depending on each service scenario. For each objective, information such as vehicle geolocation, access network topology, server load, network performance, policies, and/or the like, may be consumed for the MSP Server selection process. A mechanism to collect, distribute, and process the information to enable selection of the appropriate MSP edge server 136 needs to be selected. Furthermore, the AECC system 200 may have a highly dynamic network topology, and therefore, restrictions may affect endpoints using IP addressing mechanisms. An addressing scheme may be necessary for the MSP Server selection process and must be established for subsequent use of the system. Part of the selection process is to ensure a dynamic addressing of the MSP edge servers 136, the MSP center servers 150, and vehicle systems 221.

In some embodiments, the cellular network may provide information about network conditions along the planned route generated by the DA application and a current (or previously determined) location of the vUE 125 in the cellular network (e.g., based on positioning techniques, or knowledge of a particular AN on which the vUE 125 is camped), which can be used for determining the optimal target MSP server for the vUE 125 at a particular time. Additionally, historical data of similar trajectories taken by the vUE 125 and/or or other UEs 125 may be used to provide knowledge about the cellular network for MSP server selection purposes.

In some embodiments, the cellular network may provide local area data network (LADN) information to the MSP server(s) and/or the vehicle for MSP server selection purposes, or the cellular network could use the LADN information to make the MSP server selection. LADN service area(s) and LADN data network names (DNNs) are configured in an Access and Mobility Management Function (AMF) within a 5GC on a per data network (DN) basis. An LADN is a service provided by a serving PLMN, where access to a specific DN via a PDU Session is only available in a specific LADN service area. An LADN service area is a set of Tracking Areas, and usage of an LADN DNN requires an explicit subscription to the DNN or subscription to a wildcard DNN. The vUE 125 is configured to know whether a DNN is an LADN DNN and an association between application and LADN DNN. The configured association is a UE local configuration. Alternatively, the UE 301 gets the information on whether a DNN is an LADN DNN from LADN Information during a cellular network (re-) registration procedure (which is managed by the AMF).

In some embodiments, the vehicle system 221 is a subscribed user of the MNO A. A plurality of access nodes (ANs) are disposed to cover a geographic region so that a subscribed user can access one or more cellular networks operated by the MNO A. The MNO A may be a primary cellular service provider to the vehicle system 221. The cellular networks include, but are not limited to, 2G, 3G, 4G, 5G, LTE, LTE-A, NR and 6G networks. However, there may be one or more geographic areas (also referred to as "pockets") in a region that lack coverage provided by the MNO A, due to lack of ANs. Further, there may be one or more geographic areas/pockets in the region that can only provide sub-quality coverages and/or services. For example, a vehicle system 221 may only receive weak cellular signals with low power levels in certain areas due to scarce AN allocations, obstacles obscuring a line-of-sight between the ANs and the vehicle system 221, adverse weather conditions, and/or other like causes of interference and/or poor signal quality and/or interference. Such a weak or no cellular service area is referred to as a "dead zone" or "coverage hole" for the vehicle system 221 with respect to the CN 142.

In embodiments, the vehicle system 221 may determine to travel from a geographic location A to another geographic location B. The vehicle system 221 may request or trigger a DA application to provide a route from the geographic location A to the geographic location B based on some algorithm of the application. Such a geographic route may be provided by the DA application and/or one or more third-party applications. The DA application may update, modify, or change an existing route based on real-time road/traffic condition feedback, knowledge of accessibility and/or signal conditions/quality of the wireless network infrastructure along the route. In some embodiments, the vehicle system 221 may go through certain areas with weak or no cellular connections. An area of weak cellular connection refers to an area that the vehicle system 221 cannot receive sufficient signals of to carry out communications with corresponding ANs. For example, the sufficiency of the signals can be determined based on quality of the signal, which can be the power levels of the signals received by the vehicle system 221, or some other factors. The power level may be based on any cellular network standards (e.g., LTE, 5G NR, etc.) or any particular values adopted by the MNO A. Such a power level may also be determined based on a service level agreement (SLA) between the MNO and the vehicle system 221. The SLA may provision whether the UE should have a minimum level of service contract with the MNO A as to connect to a respective AP or AN of a wireless service provider. The SLA may be application specific. For example, the DA application may have a higher requirement for signal quality to ensure reliability of the service. For those areas of weak or low cellular connections, the DA application may determine one or more supplement or alternative wireless connections that are either provided by a WLAN or another MNO, based on collected network information with respect to individual networks. For example, the DA application has information of one or more WLANs 230 regarding their respective services. Such a service may include, but is not limited to, information regarding its coverage area, availability to certain vehicle systems 221, associated SLAs, associated AP locations, and billing information.

In some embodiments, each MNO hosts (and eventually or potentially owns) individual MSP edge servers 136 so that the layered architecture of FIGS. 1 and 2 comprises two MSP edge servers 136 (e.g., MSP edge server 136 A and MSP edge server 136B) connected with one higher level MSP center server 150. This is because, in some cases, MNOs may have already deployed edge computing technology in their networks. In another embodiment, only one of the two MNOs deploys edge computing systems, while the other MNO only provides connectivity to an MSP edge server 136.

In embodiments, the AECC system 100 and 200 utilize or provide distributed computing on localized networks, where several localized networks accommodate the connectivity of vehicles 221 in their respective areas of coverage. A localized network is a local network that covers a limited number of connected vehicles in a certain area. This splits the huge amount of data traffic into reasonable volumes per area of data traffic between vehicles and the cloud. In these embodiments, the MSP center server 150 may be in a cloud computing environment, and each localized network may include an access network and one or more MSP edge servers 136. In the example of FIG. 2, a first localized network may include the MSP edge server 136A and cellular network 240A, a second localized network may include the MSP edge server 136B and cellular network 240B, and a third localized network may include the MSP edge server 136C and the WLAN 130. Computation power is added to these localized networks to enable them to process local data, allowing connected vehicles to obtain responses in a timely fashion. In these implementations, the MSP edge servers 136 provide distributed computing services and/or act as local data integration platforms, where computational resources are geographically distributed within the vicinity of one or more localized networks. This reduces the concentration of computation and shortens the processing time needed to conclude a transaction with a connected vehicle. Local data integration platforms integrate local data by utilizing a combination of one or more localized networks and distributed computation. By narrowing relevant information down to a specific area, data can be rapidly processed to integrate information and notify connected vehicles in real time.

Distributed computing on localized networks also encompasses edge computing technology. In automotive use cases, edge computing technology provides an end-to-end system architecture framework that enables distribution of computation processes over localized networks. The edge computing technology used for distributed computing on localized networks includes networking technology to split data traffic into several localities that cover a number of connected vehicles. The computational resources in the edge computing technology are hierarchically distributed and layered in a topology-aware fashion to accommodate localized data and to allow large volumes of data to be processed in a timely manner. In this infrastructure framework, localized data collected via local networks and wide area data stored in the cloud are integrated in the edge computing architecture to provide real-time information necessary for the services of connected vehicles. In the context of edge computing for automotive, the "edge" may refer to the hierarchically distributed non-central clouds where computation resources are deployed, and edge computing technology can be used to provide such a flexible topology-aware cloud infrastructure.

Traditional V2V/V2X applications are reliant on remote cloud data storage and processing to exchange and coordinate information. A cloud data arrangement allows for long-term data collection and storage, but is not optimal for highly time varying data, such as a collision, traffic light change, etc. and may fail in attempting to meet latency challenges, such as stopping a vehicle when a child runs into the street. The data message translation techniques discussed herein enable direct communication to occur among devices (e.g., vehicles) in a low-latency manner, using features in existing MEC services that provide minimal overhead. Depending on the real-time requirements in a vehicular communications context, a hierarchical structure of data processing and storage nodes are defined. For example, including local ultra-low-latency processing, regional storage and processing as well as remote cloud data-center based storage and processing. Service level agreements (SLAs) and key performance indicators (KPIs) may be used to identify where data is best transferred and where it is processed or stored. This typically depends on the Open Systems Interconnection (OSI) layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 3:
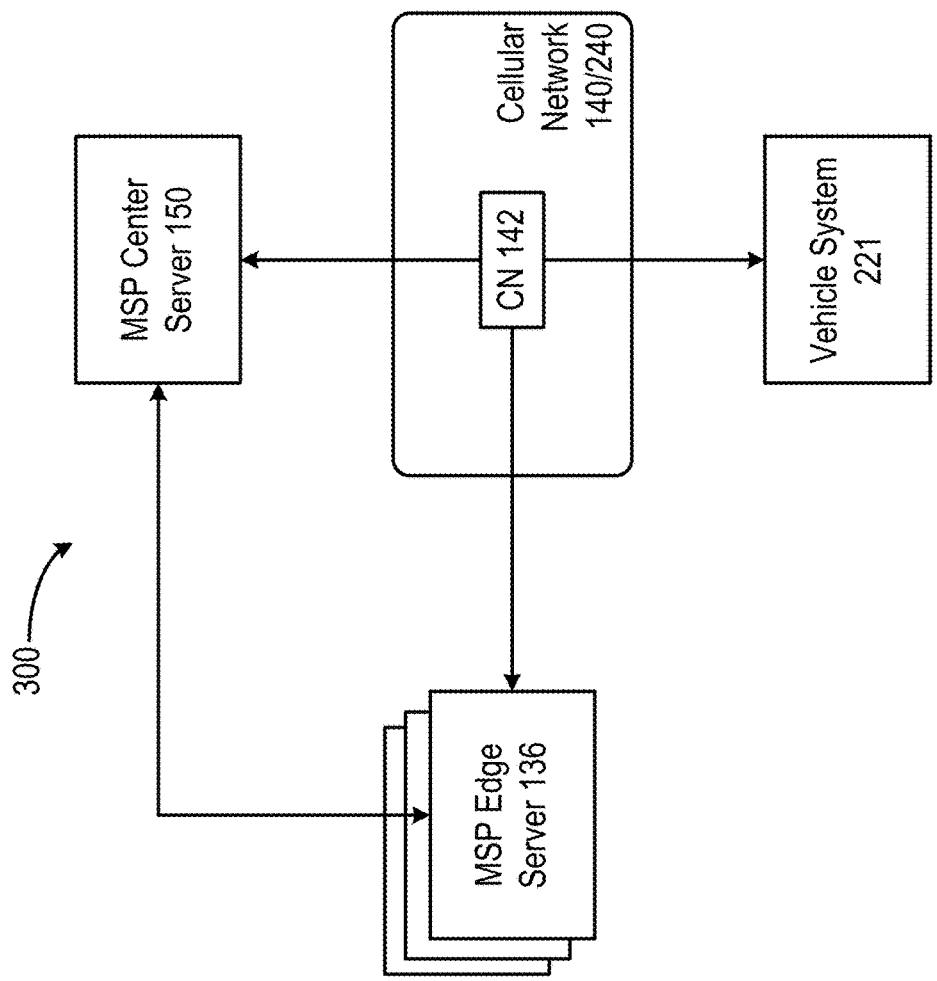
FIG. 3 illustrates another example of the AECC distributed cloud (or edge) computing architecture according to various embodiments.

Referring to FIG. 3, which illustrates another example AECC system 300, the MSP edge servers 136 are connected to the MSP center server 150 via an enterprise network (e.g., MSP Enterprise Network 460 of FIG. 4) as defined in the AECC distributed computing architecture reference model. According to the deployment of MSP edge server 136 instances, the data offloading points may be selected at appropriate places in the wireless network 230/240 to meet the service requirements on latency and capacity.

In general, the AECC system 300 proceeds with the several steps beginning with obtaining primary access through a wireless network such as cellular network 240 or WLAN 230. Then, the vehicle system 221 performs the MSP center sever 150 of selection to get connected to the AECC system 300. If necessary, one or more MSP edge servers 136 are selected to serve the vehicle system 221. As the vehicle system 221 moves, the availability of MSP edge servers 136 may change and the MSP center server 150 should support switching between edge servers 136 (e.g., handing vehicle system 221 from a source edge server 136 to a target edge server 136) based on prediction and status of the AECC system 300 and access networks 230/240.

Cellular networks are defined as AECC's primary access network technology. AECC also specifies multiple access technologies such as a primary cellular access network (e.g., cellular network 240A), one or more alternative (or secondary) cellular networks (e.g., cellular network 240A), and WLAN 230. The high-level logic of the solutions to edge server 136 selection is an on-going effort. However, the access network assisted edge selection is not addressed by existing AECC solutions.

The vehicle system 221 in AECC systems 100, 200, and/or 300 generates a relatively large amount of data which needs to be exchanged with the edge server(s) 136 and center server(s) 150. The cellular network 240 has information about the vehicle system's 221 status information such as radio link, dual connectivity, location, moving speed, trajectories and/or planned navigation routes, and/or other like information. In addition, the cellular network 240 can provide notifications about events such as switching of access (including between different ANs and between different RATs), radio link failures (RLFs), and the like. By leveraging the information or mechanisms from the cellular network 240, the AECC traffic or its urgency over the air could be reduced.

Various embodiments include procedures to enable access network assisted edge server 136 selection, which can be mapped into the AECC system (e.g., systems 100, 200, and 300). The embodiments include non-AECC server based selection, AECC server based selection, and vehicle based selection embodiments.

In particular, the access network assisted non-AECC server based selection involves an entity outside of the AECC elements (e.g., MSP Servers) making a decision on MSP Server selection using information such as load, rules of applications, status of the MSP Servers, and/or the like. This embodiment may also be referred to as an Access Network-based MSP Server Assignment procedure, a non-MSP Server Selection procedure, and the like. In this approach, an access network entity (e.g., one or more NFs in CN 142) becomes a proxy and a control agent for communication between the vehicle system 221 and the MSP Server(s), which makes the vehicle system 221 agnostic regarding the MSP Server selection/assignment. For example, in this embodiment, the cellular network 140/240 may perform MSP Server selection using information such as load, application rules and/or requirements, status of the MSP Servers, vehicle system 221 location, signal strength/quality being experienced by the vehicle system 221, cellular network 140/240 and/or MSP policies, and/or the like. This approach may also involve the access network (e.g., cellular network 140/240) operator and the MSP having a mutual agreement on how the assignment should occur. In this embodiment, the vehicle system 221 sends data through the access network (e.g., cellular network 140/240), the access network entity chooses the most suitable MSP Server based on the agreement with the MSP and/or other criteria such as current server load and/or the various information mentioned previously. Then, data is routed toward the target MSP Server, and a response from the MSP Server is routed back to the vehicle system 221 through the cellular network 140/240 or the aforementioned access network entity.

The access network assisted AECC server based embodiments involve the access network (e.g., cellular network 140/240) reporting the status, events, etc., to a Selection Function (e.g., operated by one or more MSP Servers), which performs the MSP Server selection. In this approach, the Selection Function receives information from the access network (e.g., the cellular network 140/240), but could also receive information from one or more MSP Servers and the vehicle system 221 itself. The Selection Function processes the information, selects a target MSP Server, and informs the source MSP Server and the vehicle system 221 about the target MSP server 520b. Then, the vehicle system 221 may initiate or establish a session with the selected MSP Server, or the target MSP Server may initiate or establish a session with the vehicle system 221. Specific configuration of the Selection Function may allow processing of information shared by the access network, vehicle systems 221, and MSP Servers, including but not limited to geolocation (of the vehicle systems 221 and MSP Servers), network load information, signal quality/strength data, server health checks, and/or the like. This approach is agnostic regarding the access network. In one example implementation, an MSP center server 150 may be, or may operate, the Selection Function to select a target MSP edge server 136 to serve the vehicle system 221. In another example implementation, the Selection Function can be, or may be operated by, a DNS server that translates domain names into IP addresses, making it possible for clients (e.g., vehicle system 221) to reach an intended server (e.g., the target MSP Server). In another example implementation, the Selection Function can be, or may be operated by, a proprietary application server owned and/or operated by the MSP, but is not used as an MSP Server. Other implementations are possible in other embodiments.

The Vehicle System-based MSP Server selection embodiments involve the vehicle system 221 receives information from the access network (e.g., cellular network 140/240) and/or information from potential candidate MSP Server(s), and performs the MSP Server selection. In one example, the information received from the access network may include information related to alternative access, tariffs, QoS, and the like. The vehicle system 221 may also select the target MSP Server based on in-vehicle information such as physical vehicle location, signal/cell measurements (including any of the measurements discussed herein), and the like. In some embodiments, the MSP Server selection may be performed when the vehicle system 221 experiences or detects circumstances such as weak coverage, network congestion, and/or the like. Additionally or alternatively, the vehicle system 221 may be triggered by the access network to perform the MSP Server selection. After the vehicle system 221 selects a target MSP Server, the vehicle system 221 initiate a session establishment or session transfer procedure with the necessary MSP Servers. In some embodiments, the Vehicle System-based MSP Server selection embodiments can be combined with any of the other MSP Server selection embodiments discussed herein, which may allow the vehicle system 221 to avoid sharing personal or sensitive data.

Figure 4:
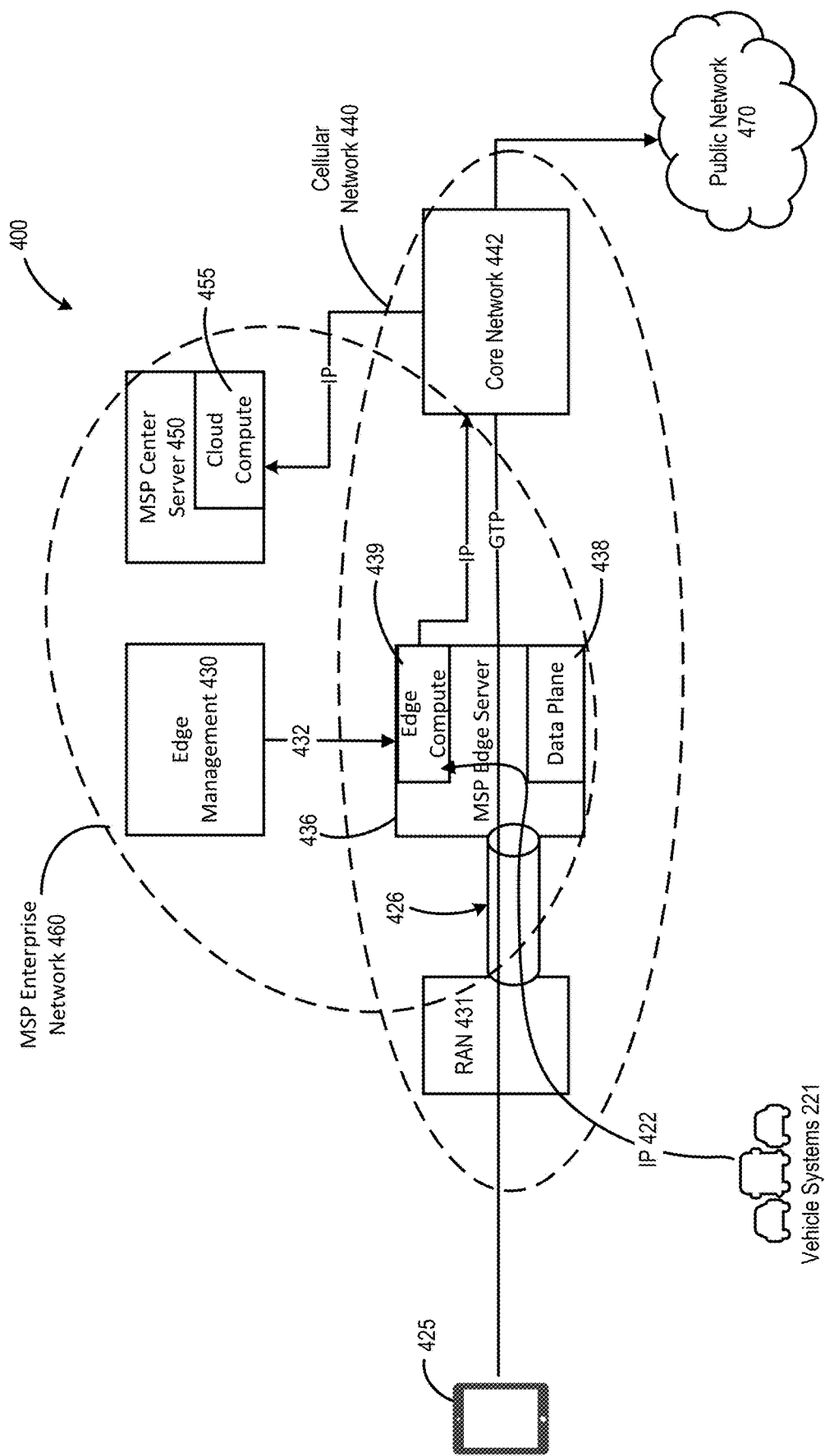
FIG. 4 illustrates an example system that integrates AECC and Edge Network architectures according to various embodiments.
Figure 12:
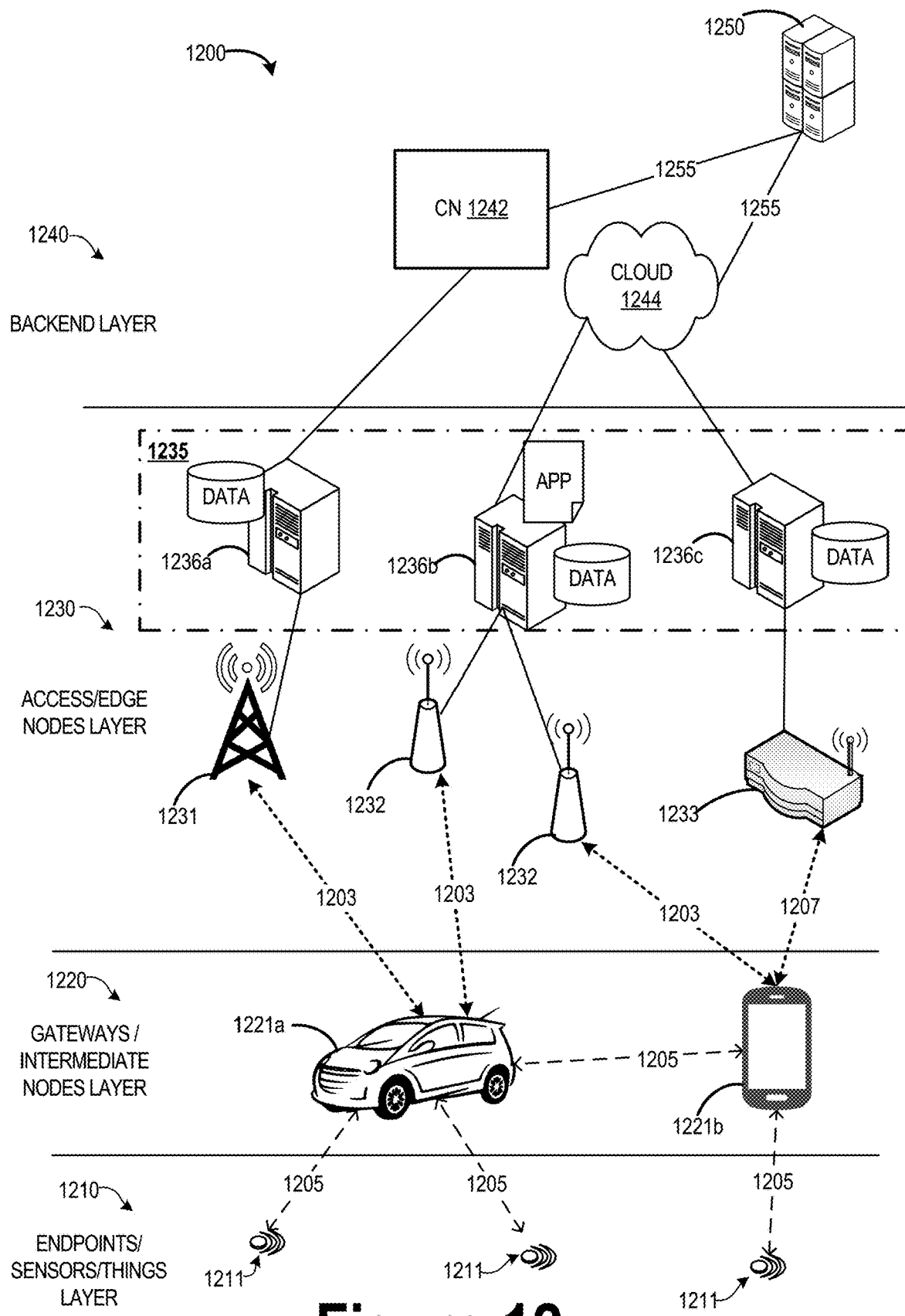
FIG. 12 depicts an example edge computing environment according to various embodiments.
Figure 13:
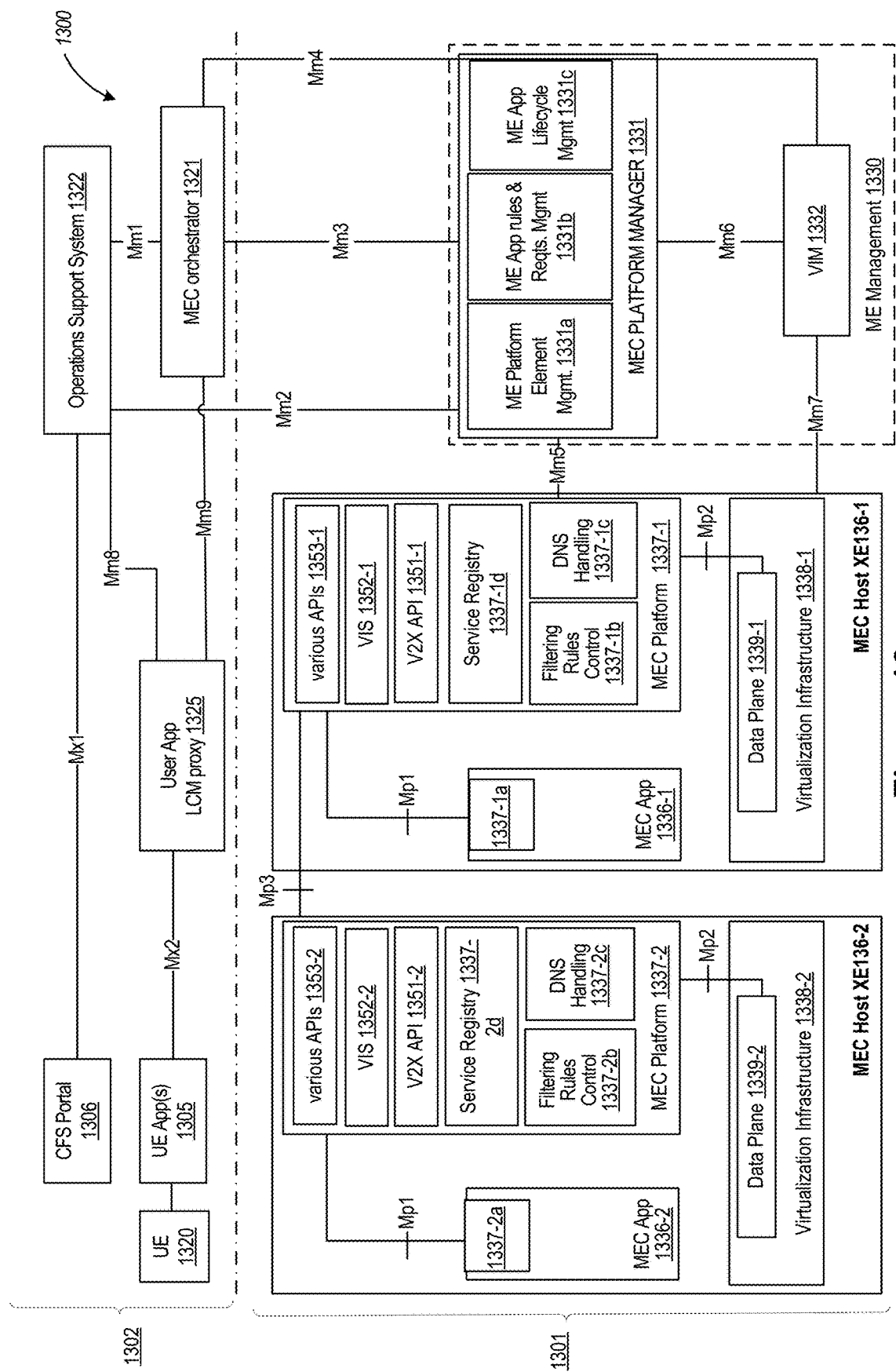
FIG. 13 illustrates an example multi-access computing (MEC) system architecture according to various embodiments.
Figure 14:
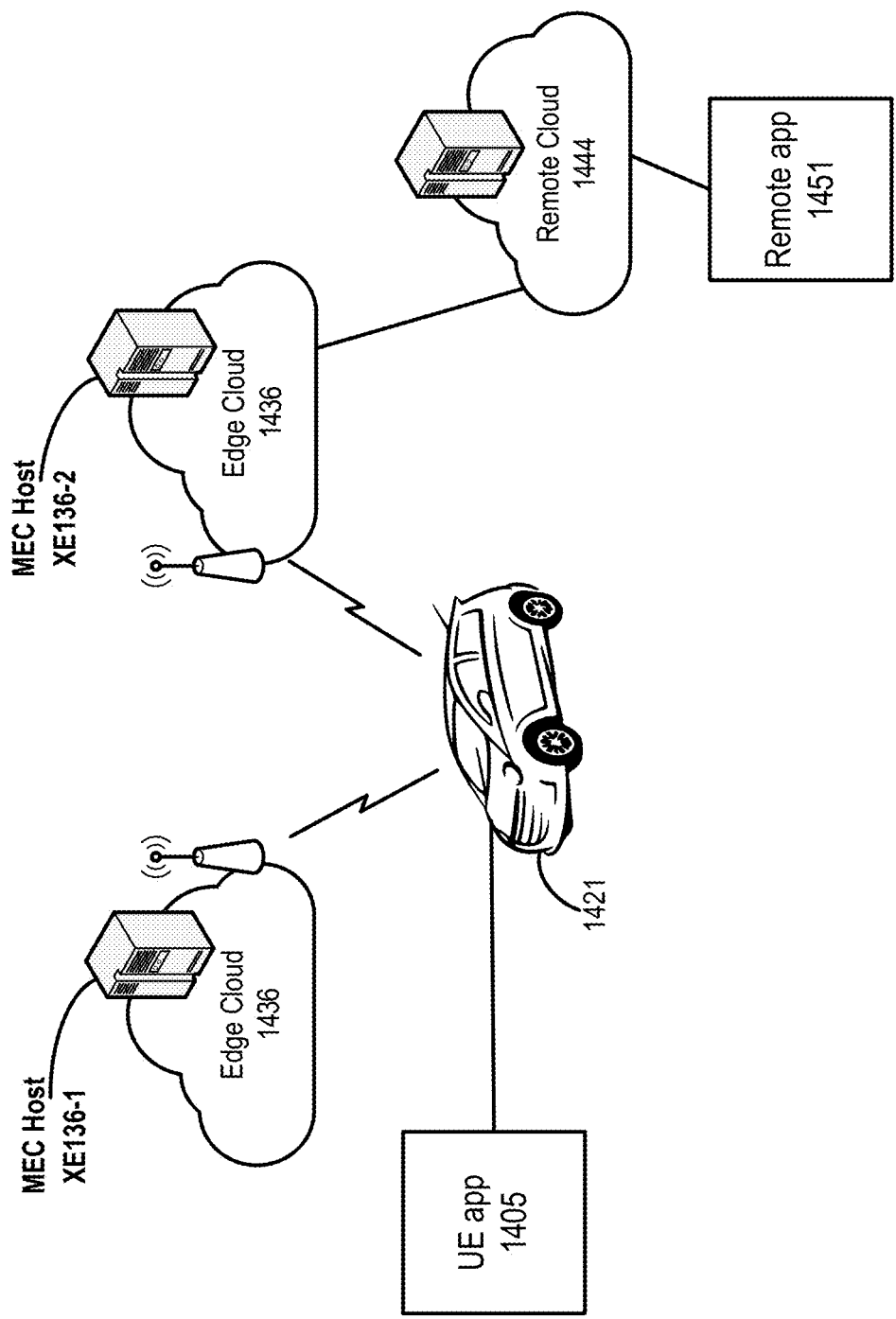
FIG. 14 illustrates a V2X system involving multiple MEC hosts according to various embodiments.

Referring now to FIG. 4, which illustrates an example system 300 that integrates an AECC system (see e.g., FIGS. 1-3) and an Edge computing system (see e.g., FIGS. 12, 13, and 14). As an example, the edge computing system may be an ETSI MEC system. ETSI MEC is regarded as a technology to bring computing capabilities into the edge of a mobile network operator's (MNO) network 440, which may be the same or similar as the cellular networks 140, 240 (including 240A and 240B) of FIGS. 1-3. It enables the implementation of mobile or multi-access edge applications (e.g., MEC Apps 1336 of FIG. 13) as software-only entities that run on top of a virtualization infrastructure, which is located in or close to the network edge. The system 400 focuses on what is unique about the network edge, builds upon and is consistent with NFV principles, provides flexibility in deployment with 4G and 5G cellular networks 440, and provides edge network data plane traffic handling. The system 400 can support re-routing of data to application(s), duplicated and pass-through for vehicle systems 221 and non-vehicular UEs 425.

The vehicle system 221 generates AECC Defined Traffic 422 (e.g., IP traffic 422), such as HD Map, Intelligent Driving Data, and/or other like traffic such as data related to the AECC services and the MSP edge server compute capabilities discussed previously. This IP traffic 422 is transmitted to the RAN 431, which sends/transmits/forwards the traffic 422 to the edge compute module 439 in the MSP edge server 436 via the tunnel 426. Similarly, the UEs 425 also generate and transmit IP data to the MSP edge server 436 via the tunnel 426 and RAN 431. The UEs 425 represents any UE other than AECC vehicle systems 221. the non-vehicular UEs 425 may be the same or similar to the UE 125 of FIG. 1 and/or other UEs discussed herein.

The tunnel 426 may be a GTP tunnel (or a GTP user plane tunnel) with IP data inside. The GTP tunnel 426 may be used for carrying user data (e.g., IP packets/PDUs) within the core network 442 to the Public Network 470 and between the RAN 431 and the CN 442. The user data transported can be packets in any of IPv4, IPv6, or PPP formats, for example.

The system 400 includes an MSP Enterprise Network 460, which includes an MSP edge sever 436. The MSP edge sever 436 interfaces with cellular CN 442 in the operator cellular network 440 via an IP connection rather than a GTP Tunnel (e.g., tunnel 426 in FIG. 4) to save GTP resources. Additionally, the cellular CN 442 conducts IP routing to the MSP center server 450, and in particular, to a cloud compute node 455 in the MSP center server 450. It will avoid AECC system to setup a separated network for MSP enterprise network 460. The MSP edge server 436, the MSP center server 450 may be the same or similar as the MSP edge servers 136 and the MSP center server 150 of FIGS. 1-3, respectively.

In system 400, the MSP edge server 436 resides at a site close to the RAN 431. The RAN 431 may be the same or similar as the RAN NANs 1231-1233 of FIG. 12. The data plane 438 within the MSP edge server 436 conducts traffic routing action(s) according to a traffic rules configuration (e.g., TR 1337B of FIG. 13) via a reference point or interface 432 from Edge Management 430. When the edge network is a MEC system, the MSP edge server 436 and the RAN 431 are in compliance with the ETSI MEC Reference Architecture, and the interface 432 is the Mm5 interface/reference point from MEC Management 430 (where the MEC management 430 may be the same or similar as the ME Mgmt 1330 of FIG. 13). The data plane 438 may be the same or similar as the DP modules 138 discussed previously with respect to FIGS. 1-3.

In embodiments, the routing edge computing node 439 conducts specific traffic flow handling locally, and can forward after-processed traffic data to MSP central server via data plane. In such embodiments, the edge computing node 439 employs a traffic filter (e.g., TR 1337B of FIG. 13) to perform the traffic flow handling. The traffic filter supports IP address, Port, ProtoType, IPDSRC, etc. In some embodiments, the traffic filter policy of the traffic filter may use different AECC traffic flow(s) and/or use different port(s). In embodiments, the routing action supports forward, drop, pass-through, duplicate, etc. In embodiments, the routing destination support application, local network, and external networks.

In some embodiments, MSP edge server 150 selection procedures include: (*a*) an MSP center server 150 centric procedure, as an AECC (application) level method (this procedure may apply to systems with either WLAN access or cellular access networks); (*b*) a access network assisted procedure, as the cellular network can provide information and assist the procedure of MSP edge server 136 selection (this procedure may only apply to systems with cellular access networks); and (c) a vehicle system 221 centric procedure, as the vehicle can collect information for AECC edge servers to perform MSP edge server selection (this procedure may only apply to system with cellular access network). These embodiments provide three options for MSP edge server 136 selection with WLAN 130 and cellular network 140 access in consideration. It also provides system level procedure to fulfill the requirements for AECC use cases, which also applies to general V2X applications.

Figure 5:
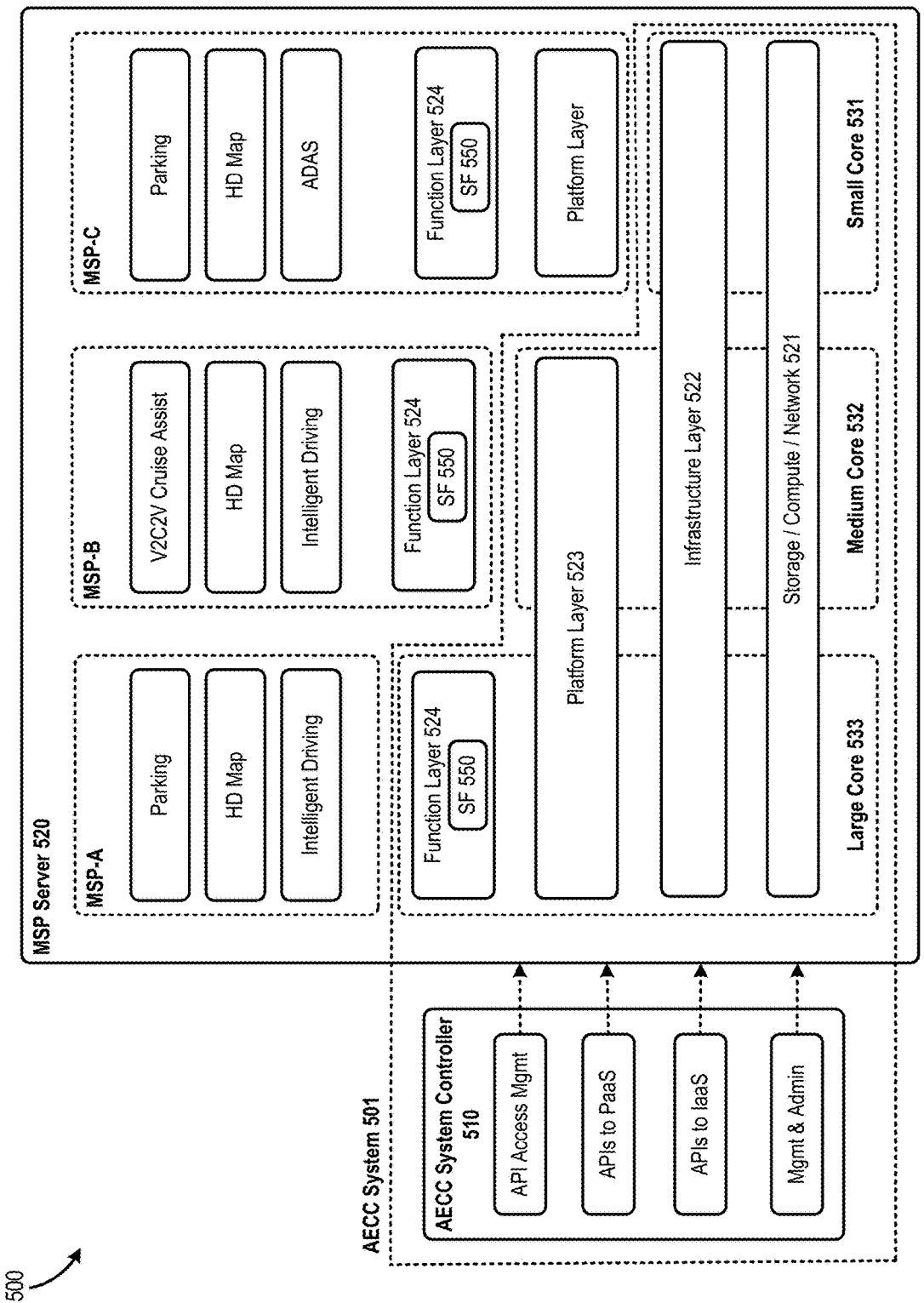
FIG. 5 illustrates a layered-model architecture illustrated with example applications and different deployment options according to various embodiments.

FIG. 5 illustrates an example layered-model architecture 500 illustrated with example applications and different deployment options, according to various embodiments. The architecture 500 includes a core set of functions available for use by MSP owners/operators in an AECC System 501 (e.g., MSP-A, MSP-B, and MSP-C in FIG. 5). The architecture 500 includes an MSP Server and an AECC system controller. The MSP server 520 may correspond to the MSP edge servers 136 and/or the MSP center server 150. Each of the MSP-A, MSP-B, and MSP-C represent different instances of MSP owners/operators to provide different applications/services to their subscribers/users. As shown by FIG. 5, the AECC system 501 includes the AECC system controller 510 and portions of the MSP server 520. The AECC system 501 is intended to support vehicle systems 221 and applications from multiple vehicle OEMs operating at the same time. The AECC system 501 is capable of accommodating a number of different approaches to perform core tasks including, for example, creating a distributed computing environment where applications can be executed in a distributed manner. These different approaches include the "small core" approach 531, the "medium core" approach 532, and the "large core" approach 533 shown by FIG. 5.

In the "small core" approach 531, the AECC system 501 offers a base set of capabilities covering the provision of hardware in the form of storage, computing and network services 521. An infrastructure layer 522 handles the provision and operation of services on top of the underlying hardware in an Infrastructure-as-a-Service (IaaS) approach. IaaS allows is a cloud service that allows users/customers of the cloud service to provision and use processing/compute, storage, and/or networking resources provided by the cloud service. Examples of the services provided by the infrastructure layer 522 may include virtual machine (VM) hosting, container hosting, Block & File storage, security, databases (DBs), and the like. The small core approach 531 enables MSPs to build their own platform layers 523 and function layers 524, on top of which providers can run their applications.

In the "medium core" approach 532, the AECC system 501 provides a platform layer 523 containing a set of functions and/or services such as operating systems (OS), OS-level virtualization, sandboxing, programming language execution environments (e.g., Python, Go, etc.), run-time environments, message buses, web servers, DBs, and the like. The medium core approach 532 enables MSPs to build their own function layers 524, on top of which they can run their created/acquired applications (e.g., the parking, high definition (HD) map, intelligent driving, Vehicle-to-Cloud-to-Vehicle (V2C2V) Cruise Assistance, and Advanced Driver-Assistance Systems (ADAS) applications shown by FIG. 5). Each MSP can create its own stack, which can then be deployed on the medium core 532, knowing that each AECC system 501 instance will offer a uniform set of Platform-as-a-Service (PaaS) and IaaS capabilities. PaaS is a cloud service that allows cloud service users/customers to deploy, manage, and run customer-created or customer-acquired applications using one or more programming languages and one or more execution environments supported by the cloud service provider.

In the "large core" approach 533, the AECC system 501 provides a function layer 524 containing a set of services such as vehicle location finding, artificial intelligence libraries, security functions, and/or the like. The function layer 524 includes one or more functions that provide services to applications or other functions in the AECC system 501. Examples of such function may include a Selection Function (SF) 550, a Configuration Function, an API Function, and/or other like functions. The large core 533 approach enables MSPs to build their own applications using the functions and capabilities provided by the platform. Each MSP can create its own application suite, which can then be deployed on the large core 533, knowing that each AECC system 501 instance will offer a uniform set of function layer 524, PaaS, and IaaS capabilities.

Complementing each of these approaches is an AECC System Controller 510 that provides management capabilities to each of the layers within the AECC system 501, exposing interfaces that the platform operator can leverage to perform lifecycle management as well as APIs for use by the MSPs. For example, in FIG. 5, the MSP-C may use the IaaS API in order to provision VMs for hosting applications/services. The API access management (mgmt) function provides a mechanism to control API interfaces for enabling or disabling users, API tokens, and the like.

The layered approach of the architecture 500 allows the system to be utilized by the broadest set of potential users to ease adoption. The layered approach also assists with system design longevity, enabling components within each of the layers to be replaced as new technologies and solutions become available, without requiring a redesign of the system architecture. This also allows the system to evolve over time. Additional implementation options are possible, such as MSPs building their own infrastructure and platform layers while using an AECC function layer 524 as a microservice or using AECC platform layer 523 elements mixed with MSP-owned and defined platform layer 523 elements. According to various embodiments, the function layer 524 may include an entity/element that performs the MSP selection procedures discussed herein. In the example of FIG. 5, the function layer 524 includes SF 550 (also referred to as "target server selector" or the like), which is configured to perform the operations discussed infra with respect to FIGS. 6-11.

Figure 6:
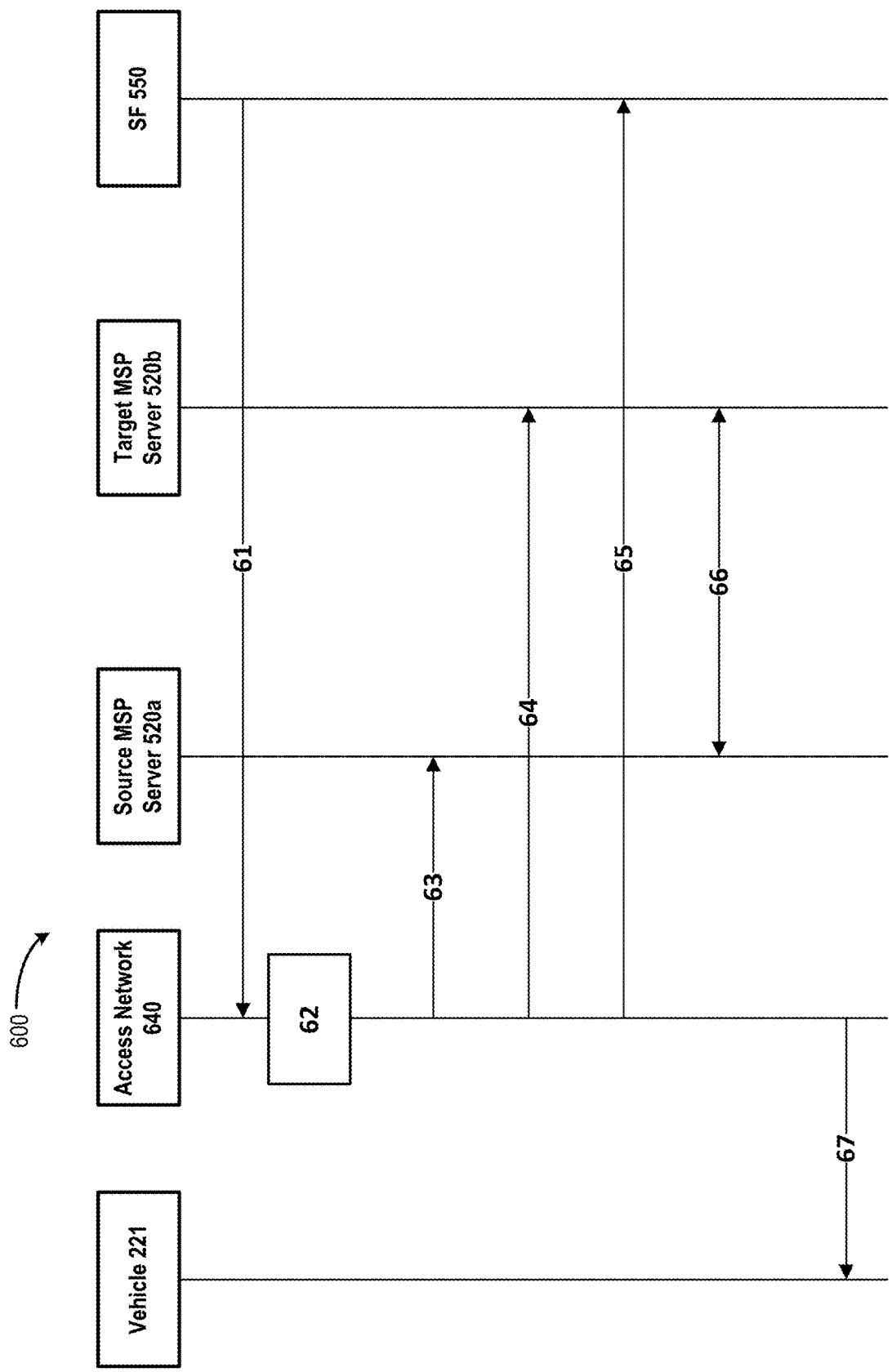
FIG. 6 depicts an example Access Network assisted Non-AECC Server based selection procedure, according to various embodiments.

Referring now to FIG. 6, which illustrates an example access network assisted non-AECC Server based selection procedure 600, according to various embodiments. In these embodiments, the access network 640 can select a new MSP Server 520*b* for the vehicle system 221 based on application rules/requirements, agreements (e.g., SLAs) with the MSP as configured by the SF 550. This scenario can be used for a triggering event such as location and/or location changes. For example, the SF 550 may calculate the trajectory of the vehicle 221 and may set rules for the access network 640 to perform MSP Server (re)selection if the vehicle 221 arrives at a certain location. This preset condition does not require the vehicle 221 to report its location very frequently to the MSP Server(s) 520 (or SF 550), but can be based on the access network's 640 tracking of the vehicle 221 in less time sensitive manner. This solution allows the MSP Server (re)selection process to be smooth and agnostic to vehicle 221. The term "non-AECC server" should be understood to mean that the MSP Server selection is performed by the access network 640 instead of an MSP Server 520.

Procedure 600 begins at operation 61, where the SF 550 creates application rules and/or trigger events for MSP Server (re)selection, and configures, provisions, or otherwise provides the rules or trigger events to the access network 640. In some embodiments the MSP may have an agreement with the access network 640 and creates application rules/events to trigger the access network 640 to (re)select an MSP Server 520 for the vehicle 221. The message to be sent to the access network 640 may include one or more of the following information (data items) vehicle 221 identity (ID), events/application rule details, SF 550 ID, restrictions, related subscription data (e.g., billing information, data rates and/or caps, etc.), and/or other like information. Additionally or alternatively, the SF 550 may provide access network registration information, attached access network types or RAT types (e.g., EPS, 5G, or WLAN) and attached cellular network PLMN ID, and/or other like information.

At operation 62, the access network 640 detects events triggering MSP Server (re)selection based on the configured trigger events, and selects a target MSP Server 520b based on configured rules from the SF 550. At operation 63, the access network 640 notifies the source MSP Server 520a about the MSP Server selection, and may provide target MSP Server 520b information to the source MSP Server 520a. The target MSP Server 520b information may include, for example, target MSP Server 520b ID, vehicle 221 ID, reason for the MSP Server selection/change, and/or other like information. At operation 64, the access network 640 notifies the target MSP Server 520b about the MSP Server selection, and may provide source MSP Server 520a information to the target MSP Server 520b. The source MSP Server 520a information may include, for example, source MSP Server 520a ID, vehicle 221 ID, reason for the MSP Server selection/change, and/or other like information. The MSP Server ID may include an IP address, Media Access Control (MAC) address, a universally unique identifier (UUID) and/or globally unique identifier (GUID), a resolvable fully qualified domain name (FQDN), socket, port number, and/or the like. In some embodiments, operations 63 and 64 can be conducted simultaneously, and the same message (including both source and target MSP Server 520b information) may be sent to the source MSP Servers 520a and target MSP Servers 520b. At operation 65, the access network 640 notifies the SF 550 about the MSP Server selection/change. The message sent at operation 65 may be the same or similar to the messages sent at operations 63 and/or 64, and may include the same or similar information. In some embodiments, operation 65 is omitted.

At operation 66, information/data exchange between the source and target MSP Servers 520b takes place. In various embodiments, the exchanged information includes "stateful" application related data so as to provide session and service continuity. In some embodiments, the data exchange may take place as discussed in commonly assigned International App. No. PCT/US2019/35660, titled "VEHICLE-TO-EVERYTHING SESSION AND SERVICE CONTINUITY IN AUTOMOTIVE EDGE COMPUTING SYSTEMS", filed on Jun. 5, 2019, and which is incorporated by reference in its entirety. At operation 67, the access network 640 notifies the vehicle system 221 about the MSP Server selection/change. The message sent at operation 67 may be the same or similar to the messages sent at operations 63, 64, and/or 65, and may include the same or similar information. In some embodiments, operation 67 is omitted.

In one example implementation of procedure 600, the access network 640 may be a cellular network 140/240 and the SF 550 is an MSP center server 150 that configures the cellular network 140/240 with rules and trigger events to perform MSP edge server 136 selection (61). In this example, the MSP center server 150 creates the logic (e.g., rules and/or events) for MSP edge server 136 reselection, and which will be, for example, a subscription request from the MSP center server 150 to the cellular network 140 (61). The subscription may be made to an NEF within a 5GC 142 of the cellular network 140, and then the NEF subscribes the events to other NFs within the 5GC 142. In this case, a new subscription message may be added to the existing NEF subscription/service APIs to indicate that the subscription is for MSP edge server (re)selection and its related rules and criteria.

Once the configured events are detected (62), a notification is sent to the MSP center server 150 (65). For example, if a rule created by the MSP center server 150 is based on location, where the rule indicates that if the vehicle system 221 moves out of a specific location, then the vehicle system 221 needs to switch to a different MSP edge server 136. The decision to reselect an MSP edge server 136 for the vehicle system 221 may be directly made by the cellular network 140 (or one or more NFs) when the cellular network 140 (or one or more NFs) detect that the vehicle system 221 has moved out of the specific location. Additionally or alternatively, the MSP edge server 136 (re)selection may be based on other criteria/parameters. In this case, the cellular network 140/240 may connect to multiple MSP edge servers 136 (e.g., over respective MNW-If reference points) and obtain information about their load, status, capabilities, and/or other like information. For example, the MSP edge servers 136 may be represented as AFs, and the cellular network 140/240 (or an NEF or Network Data Analytics Function (NWDAF) in the 5GC 142) can subscribe or get notified about events to collect AF (MSP edge server 136) data for one or more UEs (e.g., vehicle system 221), or updates the subscription which is already defined in AF (see e.g., 3GPP TS 23.502 and 3GPP TS 23.288 v0.1.0 (2019-02)). Then the cellular network 140 notifies the source MSP edge server 136 that the vehicle system 221 will be switched to another MSP edge server 136 (63), and then notifies the target MSP edge server 136 that the vehicle system 221 will be switched to the target MSP edge server 136 (64). After the data exchange takes place (66), the switch will be successful and then the vehicle system 221 will be notified (67), which instructs the vehicle system 221 to set up a session with the target MSP edge server 136.

Figure 7:
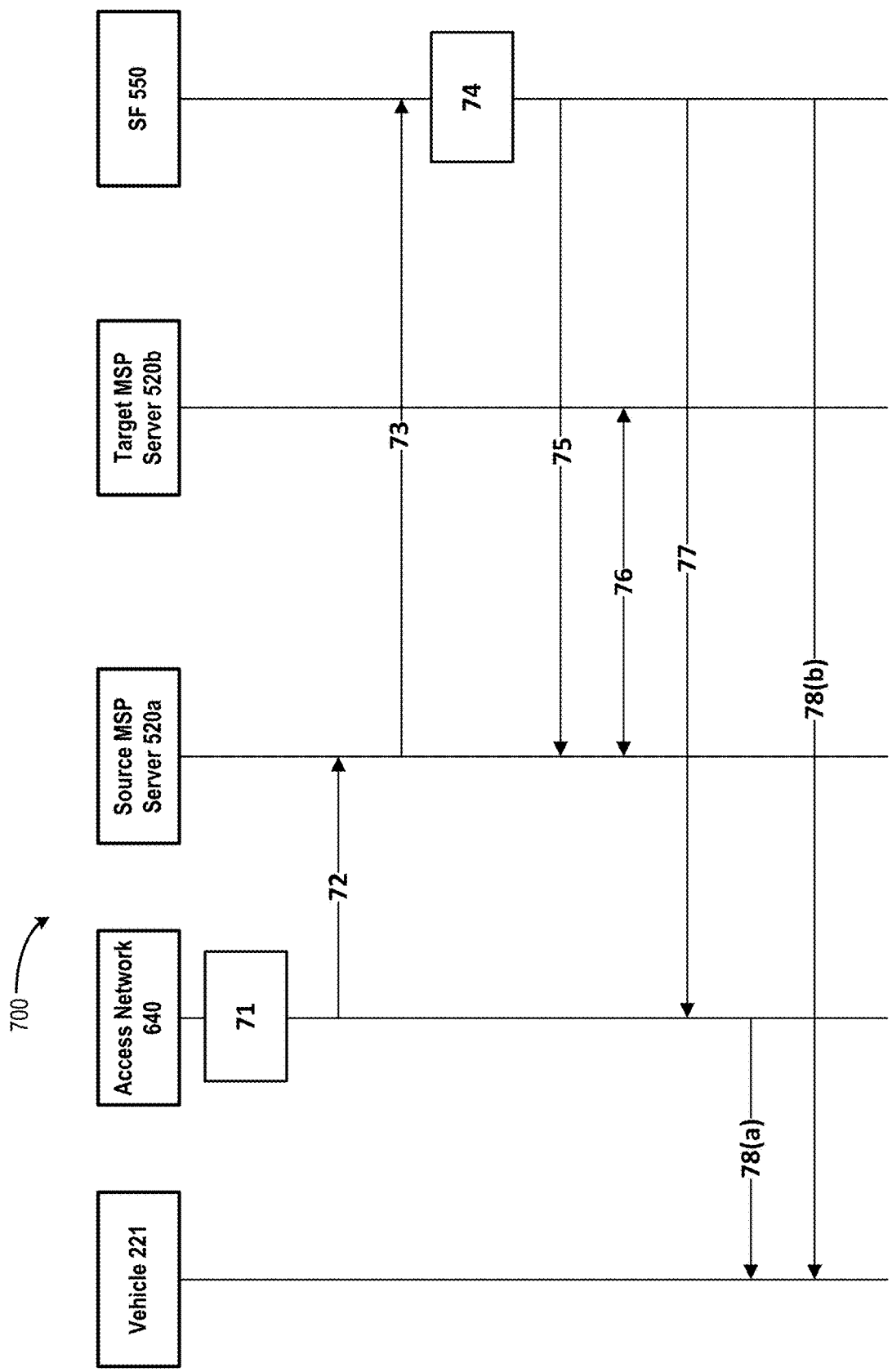
FIG. 7 depicts an example Access Network assisted AECC server based selection procedure according to various embodiments.

FIG. 7 depicts an example access network assisted AECC server based MSP Server selection procedure 400 according to various embodiments. In this embodiment, the SF 550 subscribes to event notifications from the access network 640 such as network congestion information, vehicle system 221 location changes, and/or other like notifications. The SF 550 gets notified about these events, which triggers the SF 550 to perform the MSP Server selection procedure. In this case, the vehicle system 221 can also be agnostic to the MSP Server reselection procedure.

Procedure 700 begins at operation 71, where the access network 640 detects the occurrence of one or more configured events. At operation 72 the access network 640 reports the event(s) to the source MSP Server 520a, and at operation 73, the source MSP server 520a reports the events to the SF 550. In some embodiments, the source MSP Server 520a forwards the reports received from the access network to the SF 550. In other embodiments, the source MSP Server 520a converts or translates the reports received from the access network into a suitable format that may be consumed by the SF 550. As examples, the configured events may be based on vehicle system 221 status changes, such as receipt of a report (e.g., measurement report, etc.) from the vehicle system 221, timer expiry, location changes of the vehicle system 221, measurements (e.g., collected and reported by the vehicle system 221) being at, above, or below some predetermined or configured threshold, and/or the like. Additionally or alternatively, the configured events may be based on network status updates/changes, such as network congestion levels, latency information, number of vehicles 221 or other UEs in one or more geographical areas, and/or the like. The SF 550 may have subscribed to the access network 640 to receive notifications of these events in a same or similar manner as discussed previously.

At operation 74, the SF 550 performs the MSP Server selection procedure, and selects the target MSP Server 520b to serve the vehicle system 221. In some embodiments, operation 74 involves the SF 550 determining or identifying a target MSP Server 520b ID such as an IP address, MAC address, a UUID and/or GUID, a resolvable FQDN, socket, port number, and/or the like. At operation 75, the SF 550 instructs the source MSP Server 520a about the MSP Server selection. In some embodiments, this notification may include the MSP Server ID of the target MSP Server 520b and/or other information such as discussed previously with respect to FIG. 6.

At operation 76, information/data exchange between the source MSP Servers 520a and target MSP Servers 520b takes place. In various embodiments, the exchanged information includes "stateful" application related data so as to provide session and service continuity, and may take place as discussed in commonly assigned Int'l App. No. PCT/US2019/35660. At operation 77, the SF 550 notifies the access network 640 about the MSP Server selection/change. At operation 78(a), the access network 640 notifies the vehicle system 221 about the MSP Server selection/change, and/or at operation 78(b), the SF 550 notifies the vehicle system 221 about the MSP Server selection/change. In some embodiments, one or both of operations 78(a) and 78(b) is/are omitted. Additionally, the messages sent at operation 77, 78(a), and 78(b) may be the same or similar to the messages sent at operations 75 (or operations 63, 64, and 64 of procedure 600 of FIG. 6), and may include the same or similar information.

In one example implementation of procedure 700, the access network 550 may be a cellular network 140/240 and the SF 550 is an MSP center server 150 that subscribes to the cellular network 140/240 to receive event notifications to perform MSP edge server 136 selection. Similar to the example implementation discussed previously, the subscription may be made to an NEF within the 5GC 142, and the NEF subscribes to other NFs within the 5GC 142 to receive same/similar event notifications. In this case, existing subscription messages and NEF subscription/service APIs may be used for the event monitoring purposes. Once the subscribed-to events are detected (71) by the cellular network 140 (or one or more NFs in the 5GC 142), an event notification is sent to the MSP center server 150 (e.g., by the NEF using existing notification messages for the detected events) to indicate the detected event (72). Once the MSP center server 150 receives an event notification, the MSP center server 150 performs the MSP Server selection procedure to select the target MSP edge server 136 (74), and then allocates the target MSP edge server 136 for the vehicle 221 (75). Additionally or alternatively, the MSP edge server 136 (re)selection may be based on other criteria/parameters, such as those discussed previously. In one example implementation of procedure 700, the SF 550 may invoke the Nnef Trigger service of an NEF instance in the access network 640 to request that the network send an application trigger to the vUE 221 (78(a) and/or 78(b)), where the vUE 221 takes specific actions in response to the received device/application trigger (e.g., establishing a communication session with the target MSP Server 520b), and may take into consideration the content of the trigger payload (e.g., a target MSP Server 520b ID included in the application trigger). Alternatively, the target MSP Server 520b may invoke the Nnef_Trigger service.

After the data exchange takes place (76), the MSP center server 150 notifies the cellular network 140 about the MSP edge server 136 transfer (77). A new message format/type (e.g., an edge server selection message) may be used to notify the cellular network 140 about the MSP edge server 136 transfer. This is because the cellular network 140 may need to perform various actions depending on the data offloading technique being used. For example, the cellular network 140 may need to switch different information/contexts for the vehicle system 221, change a network status, allocate a new instances of various NFs for the vehicle 221, and/or the like. Therefore, the MSP center server 150 would need to provide all this information or instructions to the cellular network 140, or the MSP and the cellular network 140 may have negotiated what information will be needed beforehand enable the cellular network 140 to make the necessary changes for the vehicle system 221. This new message can be added to the existing APIs and interfaces between the AF (e.g., MSP center server 150) and the NEF, or may be used in a new API/interface between the AF (e.g., MSP center server 150) and the 5GC 142.

Figure 8:
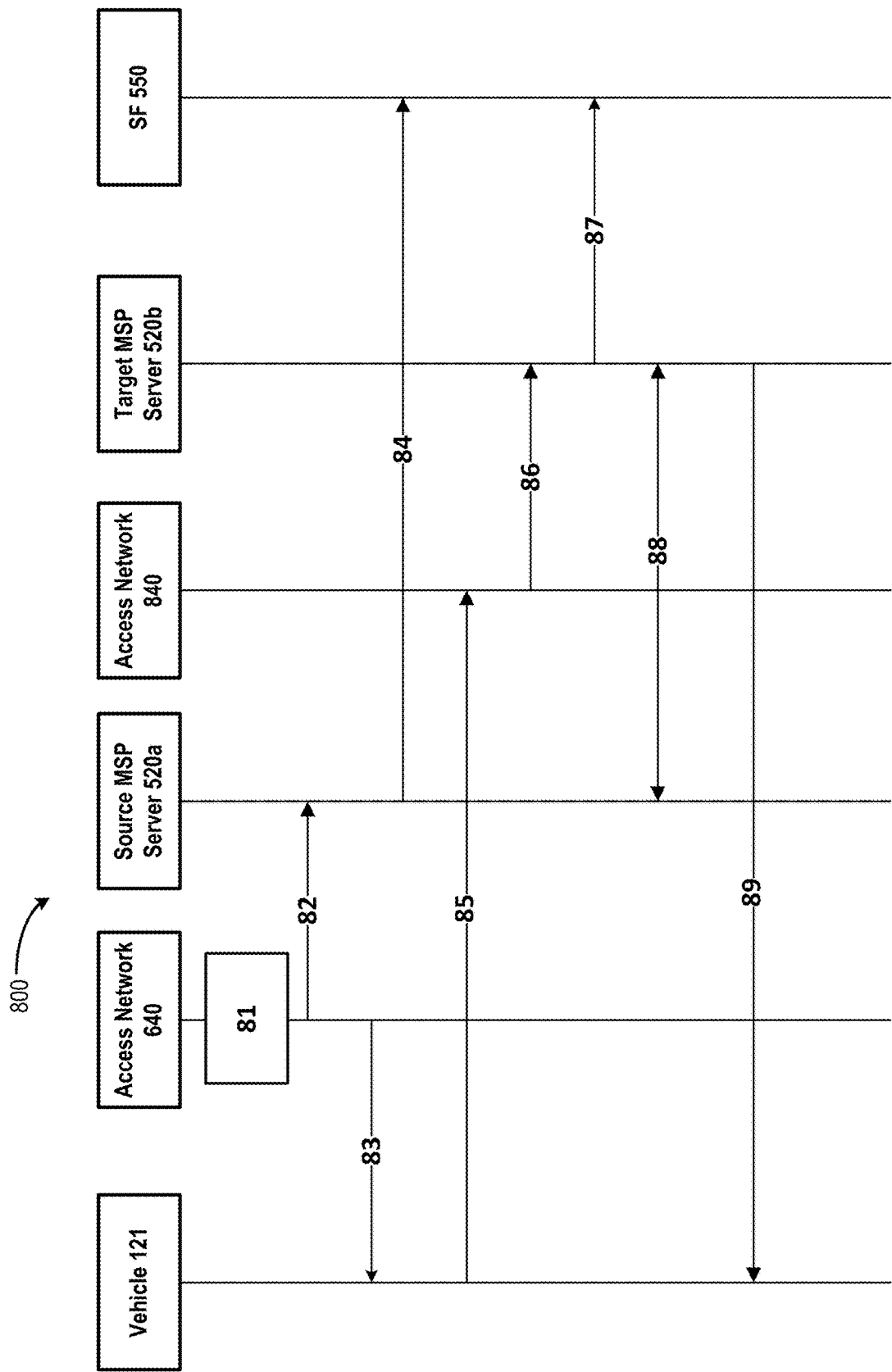
FIG. 8 depicts an example Access Network assisted vehicle based procedure according to various embodiments.

FIG. 8 depicts an example access network assisted vehicle based MSP Server selection procedure 800 according to various embodiments. In this embodiment, the vehicle system 221 chooses the target MSP Server 520b based on its own measurements and information it receives from the access network 640 and MSP Servers 520.

Procedure 800 begins at operation 81, where the access network 640 detects the occurrence of one or more configured events. At operation 82 the access network 640 reports the event(s) to the source MSP Server 520a. The configured events may be the same or similar to those discussed previously with respect to FIGS. 6-7. At operation 83, the access network 640 reports the event(s) to the vehicle system 221. In some embodiments, the access network 640 notifies the vehicle system 221 to change to alternative access (e.g., access network 820 in FIG. 8) and includes additional information about the alternative access. In one example, an Access Network Discovery and Selection Function (ANDSF) in the access network 640 (e.g., cellular network 140) can provide a list of available alternative access networks. Additionally or alternatively, WLAN interworking, LTE-WLAN Aggregation (LWA) and/or LTE WLAN Radio Level Integration with IPsec Tunnel (LWIP) mechanisms can be used as well. In either embodiment, the access network 640 may include information about one or more alternative access networks. In these embodiments, the information about each alternative access network may include, for example, tariffs (e.g., billing) information, data rates, QoS parameters or requirements, network status information, profiling for new network access, location data for access network nodes, access credentials, vehicle's context information, and/or the like.

At operation 84, the source MSP server 520a reports the events to the SF 550. In some embodiments, the source MSP Server 520a forwards the reports received from the access network to the SF 550. In other embodiments, the source MSP Server 520a converts or translates the reports received from the access network into a suitable format that may be consumed by the SF 550. In either of these embodiments, the report sent to the SF 550 may be the same or similar to the reports sent at operations 82 and 83, and/or include the same or similar information as the reports sent at operations 82 and 83. At operation 85, the vehicle system 221 access the alternative access network 840 by performing various connection establishment procedures, authentication procedures, and/or the like (which may be different depending on the protocols of the access network 840). Operation 85 may also include the vehicle system 221 selecting a target MSP Server 520b based on its measurements and information received at operation 83. At operation 86, the vehicle system 221 connects to the target MSP Server 520b through alternative access network 840. At operation 87, the target MSP Server 520b notifies the SF 550 about the MSP Server selection/change. At operation 88, information/data exchange between the source and target MSP Servers 520*b* takes place. In various embodiments, the exchanged information includes "stateful" application related data so as to provide session and service continuity, and may take place as discussed in commonly assigned Int'l App. No. PCT/US2019/35660. At operation 89, the target MSP Server 520*b* notifies (confirms) the vehicle system 221 about the successful MSP Server selection/change.

In one example implementation of procedure 800, the access networks 640 and 840 may be cellular networks 140, WLANs 130, or different access nodes or access technologies in a same network. In one example, access network 640 is a first cellular network 240A operated by an MNO A and access network 840 is a second cellular network 240B operated by an MNO B (see e.g., FIG. 2). In another example, access network 640 is a cellular network 140/240 and access network 840 is a WLAN 130 (see e.g., FIG. 1). In another example, access network 640 is a WLAN 130 (e.g., ITS-G5 or DSRC) and access network 840 is a cellular network 140/240 (see e.g., FIG. 1). In another example, access network 640 is a millimeter wave (mmWave) RAT and access network 840 is a gNB in the same cellular network 140 as the mmWave RAT. In another example, access network 640 may be a first instance of a P-GW or UPF in a 5GC 142 and access network 840 is a second instance of a P-GW or UPF in the same 5GC 142.

In any of the above described embodiments (or any other embodiment discussed herein), the access network can provide the following information to the SF 550 and/or an MSP Server for MSP Server selection: Radio Access Network (RAN) information, policies, application rules (e.g., application logic to trigger execution of another application), triggers (e.g., type of event triggering MSP Server selection and/or triggering notification of such an event), data offloading conditions (conditions that may affect ability to offload workloads to the MSP edge servers 136), location services (e.g., determination of vehicle's 221 geographic location, camped-on cell, tracking area, registration area, LADN service area, and/or the like), and Edge information (e.g., processor and/or memory utilizations, capabilities, etc. of the one or more edge servers 136 to which the access network may establish a connection). The RAN information may include, for example, a UE's 125/121 radio status (e.g., radio link failure (RLF) reports, signal measurements, etc.), alternative access status (e.g., secondary radio network status in roaming, or dual connectivity), congestion status, subscription data (e.g., tariffs, data caps, throttling information, QoS, etc.), identities or IDs of various entities (including UEs and access network nodes), WLAN availability (e.g., if WLAN connects to 3GPP core network via WLAN interworking, LWA, LWIP, etc.), and/or the like. Additionally, the access network may consider any of the aforementioned data/information for MSP Server selection (see e.g., procedure 600 of FIG. 6).

Additionally, In any of the above described embodiments (or any other embodiment discussed herein), the MSP Server Selection/Assignment may take into account one or more of the following parameters: IP Ping Round Trip Time (RTT) (e.g., the RTT between the vehicle system 221 and reachable MSP Servers; Completion Rate (e.g., the quality of this parameter is inversely proportional to the number of packet losses and timeouts between the Vehicle System and the MSP Server); hops (e.g., the number of hops needed to route the data between the Vehicle System and the MSP Server); Vehicle System Physical Location (e.g., to address localized contents/process, vehicle physical location is needed); Request SLA (e.g., By identifying the dataflow, the system is able to know the SLA of the request, including the required time needed to finish a particular data flow); Server Turnaround Time (e.g., the time needed for an application in the MSP Server to complete a process queried by the Vehicle System); Server Load (e.g., the load of an MSP Server, which might include the CPU and memory usage ratio); Application State (e.g., the current application state, which indicates when reselection of MSP Edge Server can be done without interrupting the application); and/or other like parameters. Where application state is considered for MSP Server Selection, various parameters used for Session and Service Continuity as discussed in commonly assigned Int'l App. No. PCT/US2019/35660 may also be used for MSP Server selection.

Figure 9:
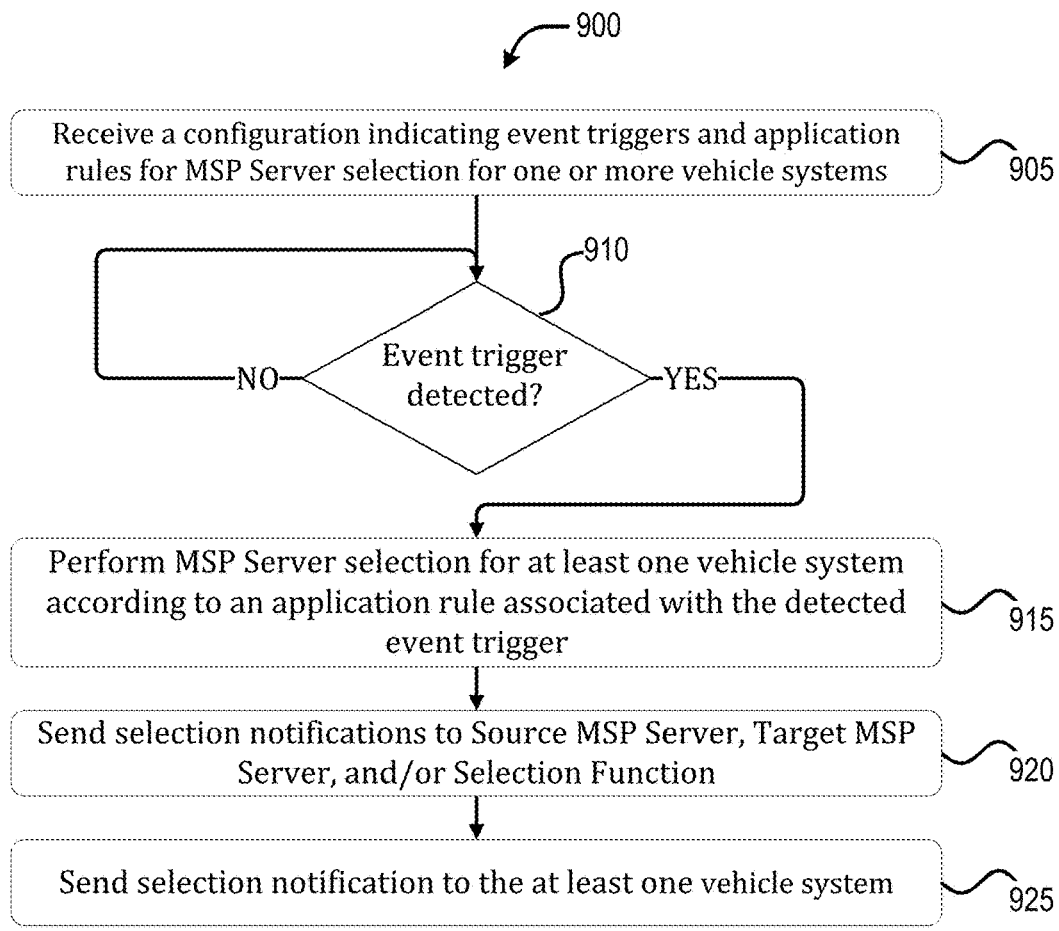
FIGS. 9-11 show an example procedures for practicing various embodiments herein.
Figure 10:
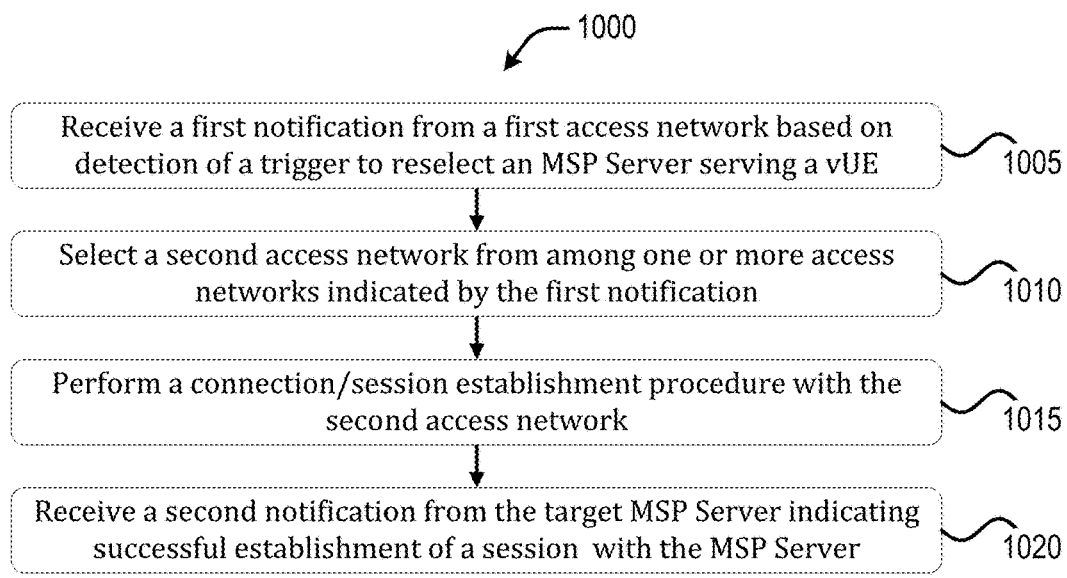
Figure 11:
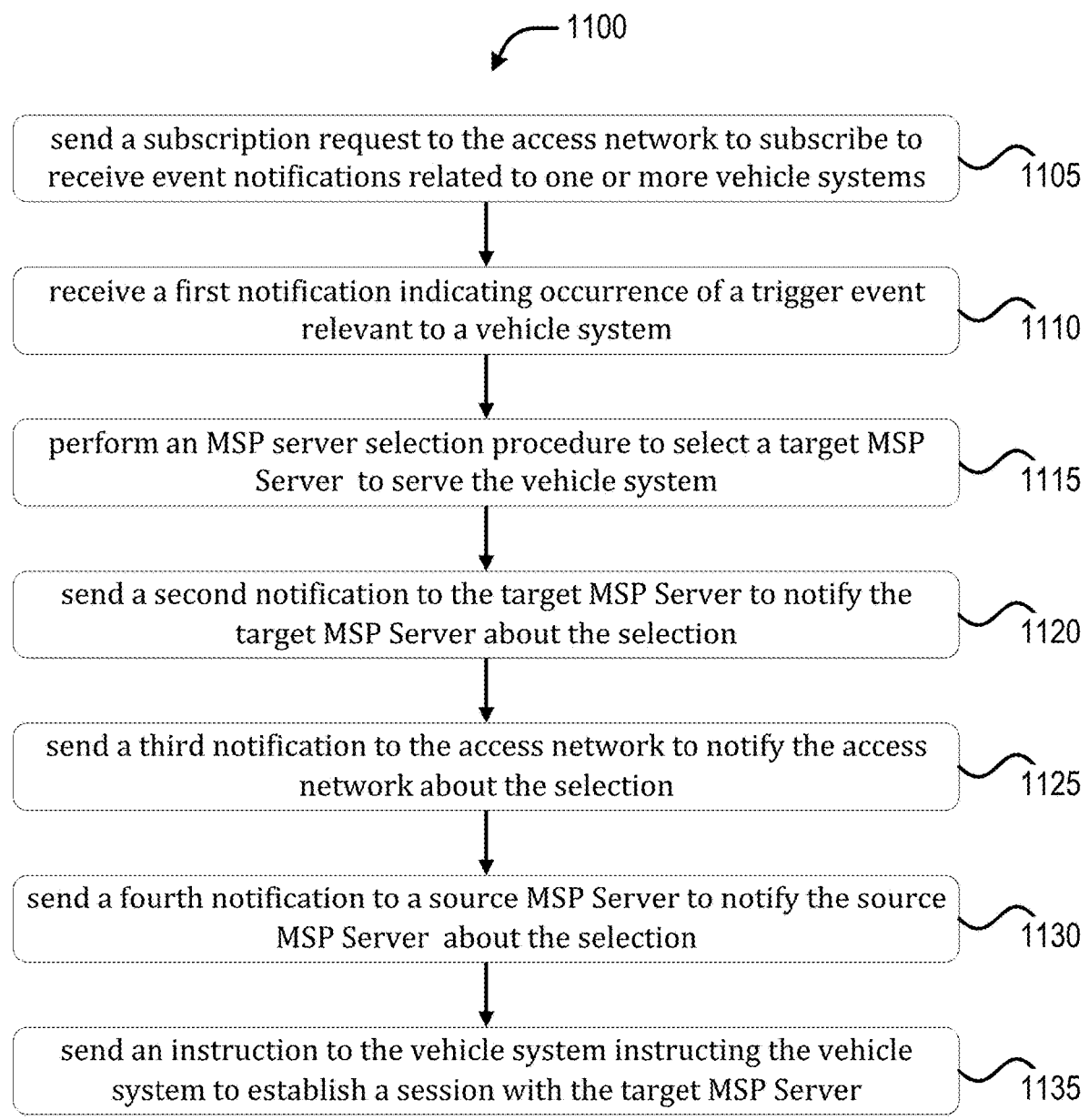

FIGS. 9-11 show example processes 900-1100, respectively, in accordance with various embodiments. For illustrative purposes, the various operations of processes 900-1100 is described as being performed by the various elements discussed with respect to FIGS. 1-8 or elements thereof. The various messages/signaling communicated between the these elements may be sent/received over the various interfaces discussed herein with respect to FIGS. 1-8, and using the various mechanisms discussed herein including those discussed herein with respect to FIGS. 12-17. While particular examples and orders of operations are illustrated FIGS. 9-11, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 9 shows an example Access Network assisted Non-MSP Server based selection process 900, according to various embodiments. Process 900 is described as being performed by an access network element (ANE), which may be, for example, a selection function 550 operated by a suitable access network node when the access network is a WLAN 130 (e.g., an access point, access router, base station, etc.) or implemented as an NF or core network element in a cellular core network 142 when the access network is a cellular network 140. Alternatively, the ANE may be an NEF and/or some other existing NF within a 5GC 142; a P-GW, ANDSF, and/or some other core network entity within an EPC 142; or the like.

Process 900 begins at operation 905 where the ANE receives a configuration indicating one or more application rules for MSP Server reselection and one or more event triggers. In some embodiments, the SF 550 (e.g., operated by an MSP center server 150 or an MSP edge server 136) may generate and send the configuration to the ANE. Each of the application rules indicate how the ANE is to select an appropriate MSP Server based on a corresponding event trigger indicated by the configuration. The application rules may also indicate specific vUEs 221 (e.g., using an ID assigned to the vUE 221 by the access network, an IP address of the vUE, or some other identifier) or groups of vUEs 221 (e.g., using any of the aforementioned vUE IDs, or a group ID for a vUE group) to which the rules and/or triggers should apply. As examples, one or more event triggers may include one or more of receipt of measurement reports from the vUE 221, signal measurements indicated by the measurement reports being above or below a threshold signal strength or signal quality, timer expiry, location changes of the vUE 221, network congestion level being above or below a threshold congestion level, a latency measurement being above or below a threshold latency value, and/or a number of vehicle systems 221 in or entering one or more geographical areas (see also e.g., 3GPP TS 23.501 and 3GPP TS 23.502). Additionally, the application rules may indicate that the MSP Server selection should also take into account any of the following types of information: RAN information, one or more policies (or policy parameters), data offloading conditions at each available MSP Server, location of the vUE 221, and/or MSP Server capabilities.

At operation 910, the ANE determines whether an event trigger has been detected. If the ANE determines that an event trigger has not been detected, the ANE loops back to operation 910 to continue to monitor for a trigger event. If the ANE determines at operation 910 that an event trigger has been detected, the ANE proceeds to operation 915 to perform MSP Server selection for at least one vUE 221 according to an application rule associated with the detected event trigger. At operation 920, the ANE generates and sends a selection notification to the selected (target) MSP Server, a current (source) MSP Server, and/or the SF 550. The selection notification may include an MSP Server ID of the selected (target) MSP Server, which may be or include an IP address, a MAC address, a UUID, GUID, an FQDN, a socket, a port number, and/or some other like identified. At operation 925, the ANE generates and sends a selection notification to the at least one vUE 221. This selection notification may be the same notification sent at operation 920. Additionally or alternatively, the selection notification sent to the vUE 221 may instruct the vUE 221 to connect with, or establish a session with the selected (target) MSP Server. Additionally or alternatively, the selection notification sent to the vUE 221 may include a list of candidate MSP Servers from which the vUE 221 may select a suitable target MSP Server 520b. After operation 925, the vUE 221 may connect or establish a communication session with the target MSP server 520b, and then process 900 may end or repeat as necessary.

FIG. 10 shows an example Access Network assisted vehicle 221 based selection process 1000 according to various embodiments. Process 1000 may be performed by the vehicle system 221 (or portions thereof) as discussed with respect to FIGS. 1-8 to, inter alia, select an MSP Server from which to access services and/or to offload computational tasks/workloads. Process 1000 begins at operation 1005 where the vehicle system 221 receives a first notification from a first access network (or first ANE) based on detection of a trigger to reselect an MSP Server serving the vehicle system 221. In some embodiments, the first notification includes an instruction to switch access networks (e.g., to establish a connection with another access network different than an access network currently serving the vehicle system 221. In some embodiments, the first notification includes information about one or more access networks including MSP Server information about candidate MSP Servers associated with each of the one or more access networks. The MSP Server information may include, for example, a current server load of each candidate MSP Server (e.g., processor and/or memory utilization, current power consumption levels, number of UEs 125 being served, etc.), compute capabilities of each candidate MSP Server (e.g., processor speed, storage capabilities, offloading capacity, etc.), relative distance between the vehicle system 221 and each candidate MSP Server, and/or other like information. The vehicle system 221 may also take into consideration signal/cell measurements when selecting a suitable access network. At operation 1010, the vehicle system 221 selects a second access network (or second ANE) from among one or more access networks (or ANEs) indicated by the first notification. Additionally or alternatively, the vehicle system 221 may select an MSP Server associated with the second access network (or second ANE). At operation 1015, the vehicle system 221 performs a connection establishment procedure with the second access network (or second ANE). In embodiments, the vehicle system 221 may also perform a session establishment procedure with an MSP Server associated (e.g., co-located) with the second access network (or second ANE). At operation 1020, the vehicle system 221 receives a second notification from the selected (target) MSP Server indicating successful establishment of a session or service with the selected MSP Server. After operation 1020, process 1000 may end or repeat as necessary.

FIG. 11 shows an example Access Network assisted MSP Server based selection process 1100 according to various embodiments. Process 700 may be performed by the SF 550, which may be operated by an MSP center server 150 or an MSP edge server 150 (or portions thereof) as discussed with respect to FIGS. 1-8 to perform MSP Server selection. Process 1100 begins at operation 1105 where the SF 550 sends a subscription request to an access network to subscribe to receive event notifications related to one or more vehicle system 221. The subscription request may be sent to an NEF in a 5GC 142, or some other NF, core network entity, and/or the like. The event notifications may indicate when one or more event triggers have occurred (or were triggered by one or more vehicle systems 221). As examples, the event triggers may include one or more of receipt of measurement reports from the vUE 221, signal measurements indicated by the measurement reports being above or below a threshold signal strength or signal quality, timer expiry, location changes of the vUE 221, network congestion level being above or below a threshold congestion level, a latency measurement being above or below a threshold latency value, and/or a number of vehicle systems 221 in or entering one or more geographical areas (see also e.g., 3GPP TS 23.501 and 3GPP TS 23.502).

At operation 1120, the SF 550 receives a first notification indicating occurrence of a trigger event (e.g., one of the subscribed-to events) relevant to a vehicle system 221. At operation 1115, the SF 550 performs an MSP Server selection procedure to select an MSP Server among a plurality of MSP Servers to serve a vehicle system 221. In embodiments, the SF 550 may use configured application rules to select an appropriate target MSP Server 520b, where each application rule indicates how the SF 550 is to select a target MSP Server 520b based on a corresponding event trigger indicated by the event notification. The application rules may apply to individual vehicle systems 221 and/or groups of vehicle systems 221. Additionally, the application rules may indicate that the MSP Server selection should also take into account any of the following types of information: RAN information, one or more policies (or policy parameters), data offloading conditions at each available MSP Server, location of the vehicle system 221, and/or MSP Server capabilities.

At operation 1120, the SF 550 generates and sends a second notification to the target MSP Server 520b to notify the target MSP Server 520b about the selection. In some embodiments, the second notification may include a vehicle system ID and/or a source MSP Server 520a from which the vehicle system 221 is to be handed over. At operation 1125, the SF 550 sends a third notification to the access network to notify the access network about the selection. This notification may be used by the access network to adjust various service parameters and the like. At operation 1130, the SF 550 sends a fourth notification to a source MSP Server 520*a* to notify the source MSP Server 520*a* about the selection. In embodiments, the fourth notification causes the source MSP Server 520*a* to perform a data transfer procedure with the target MSP Server 520*b*. At operation 1135, the SF 550 sends an instruction to the vehicle system 221 instructing the vehicle system 221 to establish a communication session with the target MSP Server 520*b*. After performance of operation 1135, process 1100 may end or repeat as necessary.

MSP Edge Server Compute Capabilities Aspect. As mentioned previously, the MSP edge servers 136 may provide computational offloading services and/or network services to connected vehicles. These services may be indicated to vehicle systems 121 as "compute capabilities" in provisioning messages provided by the MSP center server 150 as discussed previously. Examples of these services or compute capabilities may include consumer-oriented services (e.g., gaming, remote mobile/desktop applications, augmented reality/virtual reality, content streaming services, cognitive assistance services such as text-to-speech or speech-to-text processing, and the like), operator or third party services (e.g., active device location tracking, "big data" applications, security/safety aspects, enterprise services, and the like), and network performance or Quality of Experience (QoE) services (e.g., Domain Name System (DNS) resolution, CDN/web caching, performance optimization, content streaming optimization, workload offloading, and the like). Some or all of these services may include vehicle-to-cloud (V2C) services such as intelligent driving services, high-definition map (HDM) services, V2C cruising assist service, Mobility as a Service (MaaS), among many other services.

Intelligent driving applications/services may include applications that support safe and efficient driving (e.g., traffic notifications) and may include autonomous driving. Cloud-based intelligent driving services may collect data such as cruising data, biometric sensor data, and control data. This data may be gathered from various sources including movement logs from in-vehicle sensors and on-board biometric sensors/cameras. The data volume for these applications may be very large, creating a heavy load on both networking and computing resources. In these cases, the above described edge servers instruct the vehicle system 121 the type of data to be collected and sent to the cloud via the MSP edge server 136, how the vehicle system 121 should process the collected data prior to transmission, and pre-process the collected data from the vehicle system 121 before sending the data to the cloud. The collected data is then sent to the cloud via one or more access networks for processing. Based on the data collected, the cloud computes the intelligent driving parameter-set using artificial intelligence (AI) and/or advanced machine learning techniques. The intelligent driving parameter-set may need to be sent to vUEs 121 in a timely manner. The intelligent driving service may benefit from the various embodiments discussed herein because the MSP Center Server may transfer the ongoing data session from one edge server to another to timely provide the intelligent driving parameter-set to the vUEs 121. In this way, the intelligent driving service may be provided in a manner that appears uninterrupted to subscribers (e.g., a user of the vehicle system 121).

HDM services consolidate static and dynamic information (e.g., vehicle position, pedestrians and obstacles, etc.), and creates and distributes maps based on such information. The HDM may require many data transactions with high capacity as well as efficient processing to keep the information up to date. The HDM must be able to accurately localize dynamic objects including vehicles, which is required for automated driving beyond traditional route guidance applications. A large number of data transfers may be required to consistently update the HDM. Data is collected from on-board cameras, radar sensors, laser scanners (LIDAR), and/or other like sensors of the vUE. The collected data is transferred and processed in the cloud by an HDM service. In some cases, the edge servers may pre-process the collected data and provide HDM deviations to the cloud-based HDM service (e.g., map says X, but camera says Y). These deviations are sent to the cloud to update the HDM. The completed map information is stored in the MSP center server or an edge server and needs to be distributed to relevant vehicles in a timely manner. The HDM service may benefit from the various embodiments discussed herein because the MSP Center Server may transfer ongoing data sessions from one edge server to another so that HDM information may be provided to relevant vUEs 121 in a timely manner. In this way, the HDM may be updated seamlessly or in a manner that appears uninterrupted to subscribers (e.g., a user of the vehicle system 121).

V2C cruise assist is an example use case of a more flexible service evolution model than the conventional DSRC. V2C Cruise Assist involves network mediated V2V communications by integrating information obtained from neighboring cars. This mechanism is called the V2C2V service. This service scenario is especially effective when used to broadcast information to vehicles that need the same information, by utilizing the combination of neighboring vehicles, roadside units, and other entities/devices.

To realize this service scenario, vehicles and roadside units transmit their cruising data to the cloud to be analyzed, to provide information for driving assistance (such as collision avoidance, cruising control for platooning and signal control). The generated information is then distributed to relevant vUEs 121 and roadside facilities in the neighboring area. This transport system among different vehicles in the neighboring area through the network requires low-latency communication and ultra-fast computing processing to fulfill service timing criteria. The V2C cruise assist service may benefit from the various embodiments discussed herein because the MSP Center Server may transfer ongoing data sessions from one edge server to another so that driving assistance information may be provided to relevant vUEs, RSUs, and other entities/devices in a timely manner.

Mobility as a Service (MaaS) refers to a shift away from personally-owned modes of transportation and towards mobility solutions that are consumed as a service. Many services (e.g., route navigation services) rely on mobility data from vUEs 121 to provide their services (e.g., real-time navigation). The gathered mobility data can be used by third parties to offer new services, such as traffic flow control by road authorities. These kinds of services are the building blocks of MaaS, which will bring improvement to mobility experiences. MaaS is enabled by combining public and/or private transportation services through a unified gateway that creates and manages the transportation. Users can pay per trip or a subscription fee for MaaS. The key concept behind MaaS is to offer travelers mobility solutions based on their travel needs. MaaS may include ride-sharing, e-haling, vehicle-sharing (including car-, bike-, and scooter-sharing services), online/mobile delivery, and/or pop-up or on-demand bus services. These sharing services typically utilize a trip or route planner (e.g., using a mobile application in a UE or vUE 125) that shows a user a route from one destination to another and the mode of transportation (or combination or transportation modes) that the user can use. The user can then choose their preferred trip based on cost, time, and convenience, and then books or reserve their transport (e.g. haling a taxi, reserving a seat on a train, etc.). As these services evolve, there will soon be new emerging services beyond the current ones, such as mobility sharing and multimodal navigation. Mobility sharing is a service that includes ride sharing, car sharing, and even parking lot/ space sharing, while multimodal navigation services are end-to-end route guidance that uses various modes of transportation and also provides mobility sharing services information. Mobility sharing services will involve various types of information being shared in a timely manner between asset owners, service providers and end users; accordingly, these types of services should be built on top of intelligent driving, high-definition maps and cruise assist. These emerging services may benefit from or rely on the various session transfer mechanisms of the various embodiments discussed herein.

Edge Computing Aspects

FIG. 12 illustrates an example edge computing environment 1200 in accordance with various embodiments. FIG. 12 specifically illustrates the different layers of communication occurring within the environment 1200, starting from endpoint sensors or things layer 1210 (e.g., operating in an Internet of Things (IoT) network topology) comprising one or more IoT devices 1211 (also referred to as edge endpoints 1210 or the like); increasing in sophistication to gateways or intermediate node layer 1220 comprising one or more UEs 1221a and 1221b (also referred to as intermediate nodes 1220 or the like), which facilitate the collection and processing of data from endpoints 1210; increasing in processing and connectivity sophistication to access node layer 1230 (or "edge node layer 1230") comprising a plurality of network access nodes (NANs) 1231, 1232, and 1233 (collectively referred to as "NANs 1231-1233" or the like) and a plurality of edge compute nodes 1236a-c (collectively referred to as "edge compute nodes 1236" or the like) within an edge computing system 1235; and increasing in connectivity and processing sophistication to a backend layer 1210 comprising core network (CN) 1242 and cloud 1244. The processing at the backend layer 1210 may be enhanced by network services as performed by a remote application server 1250 and/or other cloud services. Some or all of these elements may be equipped with or otherwise implement some or all aspects of the embodiments discussed herein.

The environment 1200 is shown to include end-user devices, such as intermediate nodes 1220 and endpoints 1210, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1231, 1232, and/or 1233 (also referred to as "nodes of attachment" or "NAs"). The NANs 1231-1233 are arranged to provide network connectivity to the end-user devices via respective links 1203, 1207 between the individual NANs and the one or more UEs 1211, 1221. As examples, the communication networks and/or access technologies may include cellular technology such as LTE, MuLTEfire, and/or NR/5G (e.g., as provided by Radio Access Network (RAN) node 1231 and/or RAN nodes 1232), WiFi or wireless local area network (WLAN) technologies (e.g., as provided by access point (AP) 1233 and/or RAN nodes 1232), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1220 include UE 1221a and UE 1221b (collectively referred to as "UE 1221" or "UEs 1221"). In this example, the UE 1221a is illustrated as a vehicle UE, and UE 1221b is illustrated as a smartphone (e.g., handheld touchscreen mobile computing device connectable to one or more cellular networks). However, these UEs 1221 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1210 include UEs 1211, which may be IoT devices (also referred to as "IoT devices 1211"), which are uniquely identifiable embedded computing devices (e.g., within the Internet infrastructure) that comprise a network access layer designed for low-power IoT applications utilizing short-lived UE connections. The IoT devices 1211 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1211 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1211 can utilize technologies such as M2M or MTC for exchanging data with an MTC server (e.g., a server 1250), an edge server 1236 and/or edge computing system 1235, or device via a PLMN, ProSe or D2D communication, sensor networks, or IoT networks. The M2M or MTC exchange of data may be a machine-initiated exchange of data.

The IoT devices 1211 may execute background applications (e.g., keep-alive messages, status updates, etc.) to facilitate the connections of the IoT network. Where the IoT devices 1211 are, or are embedded in, sensor devices, the IoT network may be a WSN. An IoT network describes an interconnecting IoT UEs, such as the IoT devices 1211 being connected to one another over respective direct links 1205. The IoT devices may include any number of different types of devices, grouped in various combinations (referred to as an "IoT group") that may include IoT devices that provide one or more services for a particular user, customer, organizations, etc. A service provider (e.g., an owner/operator of server 1250, CN 1242, and/or cloud 1244) may deploy the IoT devices in the IoT group to a particular area (e.g., a geolocation, building, etc.) in order to provide the one or more services. In some implementations, the IoT network may be a mesh network of IoT devices 1211, which may be termed a fog device, fog system, or fog, operating at the edge of the cloud 1244. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1244 to Things (e.g., IoT devices 1211). The fog may be established in accordance with specifications released by the OFC, the OCF, among others. In some embodiments, the fog may be a tangle as defined by the IOTA foundation.

The fog may be used to perform low-latency computation/ aggregation on the data while routing it to an edge cloud computing service (e.g., edge nodes 1230) and/or a central cloud computing service (e.g., cloud 1244) for performing heavy computations or computationally burdensome tasks. On the other hand, edge cloud computing consolidates human-operated, voluntary resources, as a cloud. These voluntary resource may include, inter-alia, intermediate nodes 1220 and/or endpoints 1210, desktop PCs, tablets, smartphones, nano data centers, and the like. In various implementations, resources in the edge cloud may be in one to two-hop proximity to the IoT devices 1211, which may result in reducing overhead related to processing data and may reduce network delay.

In some embodiments, the fog may be a consolidation of IoT devices 1211 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 1244. The fog operating at the edge of the cloud 1244 may overlap or be subsumed into an edge network 1230 of the cloud 1244. The edge network of the cloud 1244 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1236 or edge devices). The Fog layer resides on top of the edge layer and is a consolidation of networking devices such as the intermediate nodes 1220 and/or endpoints 1210 of FIG. 12.

Data may be captured, stored/recorded, and communicated among the IoT devices 1211 or, for example, among the intermediate nodes 1220 and/or endpoints 1210 that have direct links 1205 with one another as shown by FIG. 12. Analysis of the traffic flow and control schemes may be implemented by aggregators that are in communication with the IoT devices 1211 and each other through a mesh network. The aggregators may be a type of IoT device 1211 and/or network appliance. In the example of FIG. 12, the aggregators may be edge nodes 1230, or one or more designated intermediate nodes 1220 and/or endpoints 1210. Data may be uploaded to the cloud 1244 via the aggregator, and commands can be received from the cloud 1244 through gateway devices that are in communication with the IoT devices 1211 and the aggregators through the mesh network. Unlike the traditional cloud computing model, in some implementations, the cloud 1244 may have little or no computational capabilities and only serves as a repository for archiving data recorded and processed by the fog. In these implementations, the cloud 1244 centralized data storage system and provides reliability and access to data by the computing resources in the fog and/or edge devices. Being at the core of the architecture, the Data Store of the cloud 1244 is accessible by both Edge and Fog layers of the aforementioned edge-fog network.

As mentioned previously, the access networks provide network connectivity to the end-user devices 1220, 1210 via respective NANs 1231-1233. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. In some embodiments, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. In these embodiments, the CRAN, CR, or vBBUP may implement a RAN function split, wherein one or more communication protocol layers are operated by the CRAN/CR/vBBUP and other communication protocol entities are operated by individual RAN nodes 1231, 1232. This virtualized framework allows the freed-up processor cores of the NANs 1231, 1232 to perform other virtualized applications, such as virtualized applications for performing MSP Server selection according to the embodiments discussed herein.

The UEs 1221, 1211 may utilize respective connections (or channels) 1203, each of which comprises a physical communications interface or layer. The connections 1203 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. In some embodiments, the UEs 1211, 1221 and the NANs 1231-1233 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1211, 1221 and NANs 1231-1233 may operate using LAA, enhanced LAA (eLAA), and/or further eLAA (feLAA) mechanisms. The UEs 1221, 1211 may further directly exchange communication data via respective direct links 1205, which may be LTE/NR Proximity Services (ProSe) link or PC5 interfaces/ links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

The UEs 1211, 1221 are capable of measuring various signals or determining/identifying various signal/channel characteristics. Signal measurement may be performed for cell selection, handover, network attachment, testing, and/or other purposes. The measurements collected by the UEs 1211, 1221 may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1231-1233 reference time and a GNSS-specific reference time for a given GNSS), GNSS code measurements (e.g., The GNSS code phase (integer and fractional parts) of the spreading code of the $i^{th}$ GNSS satellite signal), GNSS carrier phase measurements (e.g., the number of carrier-phase cycles (integer and fractional parts) of the $i^{th}$ GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215, IEEE 802.11, Part 11: "Wireless LAN Medium Access Control (MAC) and Physical Layer (PHY) specifications, IEEE Std.", and/or the like. The same or similar measurements may be measured or collected by the NANs 1231-1233.

The UE 1221b is shown to be configured to access an access point (AP) 1233 via a connection 1207. In this example, the AP 1233 is shown to be connected to the Internet without connecting to the CN 1242 of the wireless system. The connection 1207 can comprise a local wireless connection, such as a connection consistent with any IEEE 802.11 protocol, wherein the AP 1233 would comprise a WiFi® router. In embodiments, the UEs 1221 and IoT devices 1211 can be configured to communicate using suitable communication signals with each other or with any of the AP 1233 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the embodiments is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1231 and 1232 that enable the connections 1203 may be referred to as "RAN nodes" or the like. The RAN nodes 1231, 1232 may comprise ground stations (e.g., terrestrial access points) or satellite stations providing coverage within a geographic area (e.g., a cell). The RAN nodes 1231, 1232 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1231 is embodied as a NodeB, evolved NodeB (eNB), or a next generation NodeB (gNB), and the RAN nodes 1232 are embodied as relay nodes, distributed units, or Road Side Unites (RSUs). Any other type of NANs can be used.

Any of the RAN nodes 1231, 1232 can terminate the air interface protocol and can be the first point of contact for the UEs 1221 and IoT devices 1211. In some embodiments, any of the RAN nodes 1231/1232 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. In embodiments, the UEs 1211, 1221 can be configured to communicate using OFDM communication signals with each other or with any of the NANs 1231, 1232 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

For most cellular communication systems, the RAN function(s) operated by the RAN or individual NANs 1231-1232 organize downlink transmissions (e.g., from any of the RAN nodes 1231, 1232 to the UEs 1211, 1221) and uplink transmissions (e.g., from the UEs 1211, 1221 to RAN nodes 1231, 1232) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1211, 1221 at each transmission time interval (TTI). A TTI is the duration of a transmission on a radio link 1203, 1205, and is related to the size of the data blocks passed to the radio link layer from higher network layers.

The NANs 1231/1232 may be configured to communicate with one another via respective interfaces or links (not shown), such as an X2 interface for LTE implementations (e.g., when CN 1242 is an Evolved Packet Core (EPC)), an Xn interface for 5G or NR implementations (e.g., when CN 1242 is an Fifth Generation Core (5GC)), or the like. The NANs 1231 and 1232 are also communicatively coupled to CN 1242. In embodiments, the CN 1242 may be an evolved packet core (EPC) network, a NextGen Packet Core (NPC) network, a 5G core (5GC), or some other type of CN. The CN 1242 may comprise a plurality of network elements, which are configured to offer various data and telecommunications services to customers/subscribers (e.g., users of UEs 1221 and IoT devices 1211) who are connected to the CN 1242 via a RAN. The components of the CN 1242 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 1242 may be referred to as a network slice, and a logical instantiation of a portion of the CN 1242 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1242 components/functions.

The CN 1242 is shown to be communicatively coupled to an application server 1250 and a network 1250 via an IP communications interface 1255. the one or more server(s) 1250 comprise one or more physical and/or virtualized systems for providing functionality (or services) to one or more clients (e.g., UEs 1221 and IoT devices 1211) over a network. The server(s) 1250 may include various computer devices with rack computing architecture component(s), tower computing architecture component(s), blade computing architecture component(s), and/or the like. The server(s) 1250 may represent a cluster of servers, a server farm, a cloud computing service, or other grouping or pool of servers, which may be located in one or more datacenters. The server(s) 1250 may also be connected to, or otherwise associated with one or more data storage devices (not shown). Moreover, the server(s) 1250 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1250 offer applications or services that use IP/network resources. As examples, the server(s) 1250 may provide traffic management services, cloud analytics, content streaming services, immersive gaming experiences, social networking and/or microblogging services, and/or other like services. In addition, the various services provided by the server(s) 1250 may include initiating and controlling software and/or firmware updates for applications or individual components implemented by the UEs 1221 and IoT devices 1211. The server(s) 1250 can also be configured to support one or more communication services (e.g., Voice-over-Internet Protocol (VoIP) sessions, PTT sessions, group communication sessions, social networking services, etc.) for the UEs 1221 and IoT devices 1211 via the CN 1242.

The cloud 1244 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1244 include application capabilities type, infrastructure capabilities type, and platform capabilities type. A cloud capabilities type is a classification of the functionality provided by a cloud service to a cloud service customer (e.g., a user of cloud 1244), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1244 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

In some embodiments, the cloud 1244 may represent a network such as the Internet, a local area network (LAN) or a wide area network (WAN) including proprietary and/or enterprise networks for a company or organization, or combinations thereof. The cloud 1244 may be a network that comprises computers, network connections among the computers, and software routines to enable communication between the computers over network connections. In this regard, the cloud 1244 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1244 may be via a wired or a wireless connection using the various communication protocols discussed infra. More than one network may be involved in a communication session between the illustrated devices. Connection to the cloud 1244 may require that the computers execute software routines which enable, for example, the seven layers of the OSI model of computer networking or equivalent in a wireless (cellular) phone network. Cloud 1244 may be used to enable relatively long-range communication such as, for example, between the one or more server(s) 1250 and one or more UEs 1221 and IoT devices 1211. In some embodiments, the cloud 1244 may represent the Internet, one or more cellular networks, local area networks, or wide area networks including proprietary and/or enterprise networks, TCP/Internet Protocol (IP)-based network, or combinations thereof. In such embodiments, the cloud 1244 may be associated with network operator who owns or controls equipment and other elements necessary to provide network-related services, such as one or more base stations or access points, one or more servers for routing digital data or telephone calls (e.g., a core network or backbone network), etc. The backbone links 1255 may include any number of wired or wireless technologies, and may be part of a LAN, a WAN, or the Internet. In one example, the backbone links 1255 are fiber backbone links that couple lower levels of service providers to the Internet, such as the CN 1212 and cloud 1244.

In embodiments, the edge compute nodes 1236 may include or be part of an edge system 1235 (or edge network 1235). The edge compute nodes 1236 may also be referred to as "edge hosts 1236" or "edge servers 1236." The edge system 1235 includes a collection of edge servers 1236 (e.g., MEC hosts/servers 1236-1 and 1236-2 of FIG. 13) and edge management systems (not shown by FIG. 12) necessary to run edge computing applications (e.g., MEC Apps 1336 of FIG. 13) within an operator network or a subset of an operator network. The edge servers 1236 are physical computer systems that may include an edge platform (e.g., MEC platform 1337 of FIG. 13) and/or virtualization infrastructure (e.g., VI 1338 of FIG. 13), and provide compute, storage, and network resources to edge computing applications. Each of the edge servers 1236 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1220 and/or endpoints 1210. The VI of the edge servers 1236 provide virtualized environments and virtualized resources for the edge hosts, and the edge computing applications may run as VMs and/or application containers on top of the VI. One example implementation of the edge system 1235 is a MEC system 1235, which is discussed in more detail infra with respect to FIGS. 13-XP2. It should be understood that the disclosed MEC systems and services deployment examples are only one illustrative example of edge computing systems/networks 1235, and that the example embodiments discussed herein may be applicable to many other edge computing/networking technologies in various combinations and layouts of devices located at the edge of a network. Examples of such other edge computing/networking technologies that may implement the embodiments herein include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

As shown by FIG. 12, each of the NANs 1231, 1232, and 1233 are co-located with edge compute nodes (or "edge servers") 1236a, 1236b, and 1236c, respectively. These implementations may be small-cell clouds (SCCs) where an edge compute node 1236 is co-located with a small cell (e.g., pico-cell, femto-cell, etc.), or may be mobile micro clouds (MCCs) where an edge compute node 1236 is co-located with a macro-cell (e.g., an eNB, gNB, etc.). The edge compute node 1236 may be deployed in a multitude of arrangements other than as shown by FIG. 12. In a first example, multiple NANs 1231-1233 are co-located or otherwise communicatively coupled with one edge compute node 1236. In a second example, the edge servers 1236 may be co-located or operated by RNCs, which may be the case for legacy network deployments, such as 3G networks. In a third example, the edge servers 1236 may be deployed at cell aggregation sites or at multi-RAT aggregation points that can be located either within an enterprise or used in public coverage areas. In a fourth example, the edge servers 1236 may be deployed at the edge of CN 1242. These implementations may be used in follow-me clouds (FMC), where cloud services running at distributed data centers follow the UEs 1221 as they roam throughout the network.

In any of the aforementioned embodiments and/or implementations, the edge servers 1236 provide a distributed computing environment for application and service hosting, and also provide storage and processing resources so that data and/or content can be processed in close proximity to subscribers (e.g., users of UEs 1221, 1211) for faster response times The edge servers 1236 also support multi-tenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1236 from the UEs 1211/1221, CN 1242, cloud 1244, and/or server(s) 1250, or vice versa. For example, a device application or client application operating in a UE 1221/1211 may offload application tasks or workloads to one or more edge servers 1236. In another example, an edge server 1236 may offload application tasks or workloads to one or more UE 1221/1211 (e.g., for distributed ML computation or the like).

FIG. 13 depicts a block diagram for an example MEC system architecture 1300 according to various embodiments. The MEC system architecture 1300 may correspond to the edge computing system 1235 of FIG. 12. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 1300 may be access-agnostic and not dependent on a particular deployment. MEC enables implementation of MEC applications (MEC Apps) 1336-1 and 1336-2 (collectively referred to as "MEC Apps 1336" or the like) as software-only entities that run on top of a Virtualization Infrastructure (VI) 1338-1 and 1338-2 (collectively referred to as "VI 1338" or the like), which is located in or close to the network edge. A MEC app 1336 is an application that can be instantiated on a MEC host 1236 within the MEC system 1300 and can potentially provide or consume MEC services 1337*a*. The term "user application" in the context of MEC refers to an MEA 1336 that is instantiated in the MEC system 1300 in response to a request from a user (e.g., UE 1221) via a device application. FIG. 13 shows the general entities involved, and these entities can be grouped into multi-access edge system level 1302, multi-access edge host level 1301, and network level entities (not shown). The multi-access edge host level 1301 includes a MEC host 1236-1 and MEC Host 1236-2 (which may be the same or similar to the MEC servers 1236 discussed previously, and re collectively referred to as "MEC host 1236" or the like) and Multi-access Edge (ME) management 1330, which provide functionality to run MEC Apps 1336 within an operator network or a subset of an operator network. The multi-access edge system level 1302 includes multi-access edge system level management 1302, UE 1320 (which may be the same or similar to the intermediate nodes 1220 and/or endpoints 1210 discussed herein), and third party entities. The network level (not shown) includes various external network level entities, such as a 3GPP network (e.g., CN 1242 of FIG. 12), a local area network (e.g., a LAN, WLAN, PAN, etc.), and an external network (e.g., CN 1242 and/or cloud 1244 of FIG. 12). The multi-access edge host level 1301 includes multi-access edge host level management and one or more MEC hosts 1236. The multi-access edge host level management may include various components that handle the management of the multi-access edge specific functionality of a particular MEC platform 1337, MEC host 1236, and the MEC Apps 1336 to be run. The MEC host 1236 includes the MEC platform 1337, MEC Apps 1336, and VI 1338.

The MEC system 1300 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 1300 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 1236 is an entity that contains an MEC platform 1337 and VI 1338 which provides compute, storage, and network resources for the purpose of running MEC Apps 1336. Each of the VIs 1338 includes a respective data plane (DP) 1339 (including DP 1339-1 and 1339-2) that executes respective traffic rules 1337-1*b* and 1337-2*b* (collectively referred to as "traffic rules 1337*b*") received by the MEC platform 1337, and routes the traffic among applications (e.g., MEC Apps 1336), MEC services 1337-1*a* and 1337-2*a* (collectively referred to as "MEC services 1337*a*"), DNS server/proxy (see e.g., via DNS handling entities 1337-1*c* and 1337-2*c*), 3GPP network, local networks, and external networks. The MEC DP 1338*a* may be connected with the (R)AN nodes 1231 and CN 1242 of FIG. 12, and/or may be connected with the AP 1233 of FIG. 12 via a wider network, such as the internet, an enterprise network, or the like. The other entities depicted and/or discussed herein may be the same or similar as those discussed with regard to FIG. 12.

The MEC platforms 1337-1 and 1337-2 (collectively referred to as "MEC platform 1337" or the like) within a MEC host 1236 may be a collection of essential functionality required to run MEC Apps 1336 on a particular VI 1338 and enable them to provide and consume MEC services 1337*a*, and that can provide itself a number of MEC services 937*a*. The MEC platform 1337 can also provide various services and/or functions, such as offering an environment where the MEC Apps 1336 can discover, advertise, consume and offer MEC services 1337*a* (discussed infra), including MEC services 1337*a* available via other platforms when supported. The MEC platform 1337 may be able to allow authorized MEC Apps 1336 to communicate with third party servers located in external networks. The MEC platform 1337 may receive traffic rules from the MEC platform manager 1331, applications, or services, and instruct the data plane accordingly (see e.g., Traffic Rules Control 1337*b*). The MEC platform 1337 may send instructions to the DP 1338 within the VI 1338 via the Mp2 reference point. The Mp2 reference point between the MEC platform 1337 and the DP 1338 of the VI 1338 may be used to instruct the DP 1338 on how to route traffic among applications, networks, services, etc. In some implementations, the MEC platform 1337 may translate tokens representing UEs XP01 in the traffic rules into specific IP addresses. The MEC platform 1337 also receives DNS records from the MEC platform manager 1331 and configures a DNS proxy/server accordingly. The MEC platform 1337 hosts MEC services 1337*a* including the multi-access edge services discussed infra, and provide access to persistent storage and time of day information. Furthermore, the MEC platform 1337 may communicate with other MEC platforms 1337 of other MEC servers 1236 via the Mp3 reference point.

The VI 1338 may represent the totality of all hardware and software components which build up the environment in which MEC Apps 1336 and/or MEC platform 1337 are deployed, managed and executed. The VI 1338 may span across several locations, and the network providing connectivity between these locations is regarded to be part of the VI 1338. The physical hardware resources of the VI 1338 includes computing, storage and network resources that provide processing, storage and connectivity to MEC Apps 1336 and/or MEC platform 1337 through a virtualization layer (e.g., a hypervisor, VM monitor (VMM), or the like). The virtualization layer may abstract and/or logically partition the physical hardware resources of the MEC server 1236 as a hardware abstraction layer. The virtualization layer may also enable the software that implements the MEC Apps 1336 and/or MEC platform 1337 to use the underlying VI 1338, and may provide virtualized resources to the MEC Apps 1336 and/or MEC platform 1337, so that the MEC Apps 1336 and/or MEC platform 1337 can be executed.

The MEC Apps 1336 are applications that can be instantiated on a MEC host/server 1236 within the MEC system 1300 and can potentially provide or consume MEC services 1337*a*. The term "MEC service" refers to a service provided via a MEC platform 1337 either by the MEC platform 937 itself or by a MEC App 1336. MEC Apps 1336 may run as VM on top of the VI 1338 provided by the MEC server 1236, and can interact with the MEC platform 1337 to consume and provide the MEC services 1337*a*. The MEC Apps 1336 are instantiated on the VI 1338 of the MEC server 1236 based on configuration or requests validated by the ME management 1330. In some embodiments, the MEC Apps 1336 can also interact with the MEC platform 1337 to perform certain support procedures related to the lifecycle of the MEC Apps 1336, such as indicating availability, preparing relocation of user state, etc. The MEC Apps 1336 may have a certain number of rules and requirements associated to them, such as required resources, maximum latency, required or useful services, etc. These requirements may be validated by the ME management 1330, and can be assigned to default values if missing. MEC services 1337-1*a* and 1337-2*a* (collectively referred to as "MEC services "437*a*" or the like) are services provided and/or consumed either by the MEC platform 1337 and/or MEC Apps 1336. The service consumers (e.g., MEC Apps 1336 and MEC platform 1337) may communicate with particular MEC services 1337*a* over individual APIs (including MEC V2X API 1351-1, 1351-2 and various APIs 1353-1, 1353-2 in FIG. 13). When provided by an application, a MEC service 1337*a* can be registered in a list of services in the service registries 1337-1*d* and 1337-2*d* (collectively referred to as "service registry 1337*d*" or the like) to a respective the MEC platform 1337 over the Mp1 reference point. Additionally, the MEC Apps 1336 can subscribe to one or more services 1337*a* for which it is authorized over the Mp1 reference point.

The MEC system 1300 may support a feature called UserApps. When the MEC system 1300 supports the feature UserApps, the ME management 1330 may support the instantiation of MEC Apps 1336 (or user applications) on multiple MEC hosts 1236 following a single instantiation request, and when required by the operator in response to a request by the user. The application instance may need to fulfil a number of potential constraints predefined for the application 1305. Once instantiated, connectivity may be established between the UE 1320 and the application instance. Potential constraints may include latency, location, compute resources, storage resources, network capability, security conditions, and the like. As part of the user application (or MEC app 1336) instantiation, the MEC system 1300 will create an associated application context that the MEC system 1300 maintains for the lifetime of the user application (or MEC app 1336). The application context is a set of reference data about an application instance that is used to identify it, enable lifecycle management operations and associate it with its device application, The term "user context" in the context of MEC refers to application-specific runtime data maintained by a MEC app 1336, which is associated with a user of that application. The application context contains information specific to the application instance such as its unique identifier within the MEC system 1300 and the address (e.g., URI or the like) provided for clients (e.g., UE 1320) that are external to the MEC system 1300 to interact with the user application.

When the MEC system 1300 supports the feature UserApps, the system 1300 may, in response to a request by a user, support the establishment of connectivity between the UE 1320 and an instance of a specific MEC App 1336 fulfilling the requirements of the MEC App 1336 regarding the UE 1320. If no instance of the MEC App 1336 fulfilling these requirements is currently running, the multi-access edge system management may create a new instance of the application 1305 on a MEC host 1236 that fulfils the requirements of the application 1305. Once instantiated, connectivity is established between the UE 1320 and the new MEC App 1336 instance. Requirements of the application can include latency, location, compute resources, storage resources, network capability, security conditions, and the like. When the MEC system 1300 supports the UserApps feature, the system 1300 may support the on-boarding of MEC Apps 1336 during the execution of an instantiation request, may allow the establishment of connectivity between the UE 1320 and a specific instance of an MEC App 1336, may support the capability to terminate the MEC App 1336 instance when no UE 1320 is connected to it anymore, and may support the termination of the MEC App 1336 running on multiple MEC servers 1236 following a single termination request.

As shown by FIG. 13, the Mp1 reference point is between the MEC platform 1337 and the MEC Apps 1336. The Mp1 reference point may provide service registration 1337*d*, service discovery, and communication support for various services, such as the MEC services 1337-1*a* provided by MEC host 1236-1 and MEC services 1337-2*a* provided by MEC Host 1236-2 (collectively referred to as "MEC services 1337*a*" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 1337*a* include Radio Network Information Service (RNIS), location services, and bandwidth management services. The RNIS, when available, provides authorized MEC Apps 1336 with radio network related information, and expose appropriate up-to-date radio network information to the MEC Apps 1336. The radio network information (RNI) may include, inter alia, radio network conditions, measurement and statistics information related to the user plane, information related to UEs 1320 served by the radio node(s) associated with the MEC host 1236 (e.g., UE context and radio access bearers), changes on information related to UEs 1320 served by the radio node(s) associated with the MEC host 1236, and/or the like. The RNI may be provided at the relevant granularity (e.g., per UE 1320, per cell, per period of time).

The service consumers (e.g., MEC Apps 1336 and MEC platform 1337) may communicate with the RNIS over an RNI API 1353 to obtain contextual information from a corresponding RAN. RNI may be provided to the service consumers via an access node (e.g., (R)AN nodes 1231, 1232, or AP 1233 of FIG. 12). The RNI API 1353 may support both query and subscription (e.g., a pub/sub) based mechanisms that are used over a Representational State Transfer (RESTful) API 1353 or over a message broker of the MEC platform 1337 (not shown by FIG. 13). A MEC App 1336 may query information on a message broker via a transport information query procedure, wherein the transport information may be pre-provisioned to the MEC App 1336 via a suitable configuration mechanism. The various messages communicated via the RNI API 1353 may be in XML, JSON, Protobuf, or some other suitable format.

The RNI may be used by MEC Apps 1336 and MEC platform 1337 to optimize the existing services and to provide new types of services that are based on up to date information on radio conditions. As an example, a MEC App 1336 may use RNI to optimize current services such as video throughput guidance. In throughput guidance, a radio analytics MEC App 1336 may use MEC services to provide a backend video server with a near real-time indication on the throughput estimated to be available at the radio downlink interface in a next time instant. The throughput guidance radio analytics application 1336 computes throughput guidance based on the required radio network information it obtains from a multi-access edge service running on the MEC server 1236. RNI may be also used by the MEC platform 1337 to optimize the mobility procedures required to support service continuity, such as when a certain MEC App 1336 requests a single piece of information using a simple request-response model (e.g., using RESTful mechanisms) while other MEC Apps 1336 subscribe to multiple different notifications regarding information changes (e.g., using a pub/sub mechanism and/or message broker mechanisms).

The location services (LS), when available, may provide authorized MEC Apps 1336 with location-related information, and expose such information to the MEC Apps 1336. With location related information, the MEC platform 1337 or one or more MEC Apps 1336 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1320 currently served by the radio node(s) associated with the MEC server 1236, information about the location of all UEs 1320 currently served by the radio node(s) associated with the MEC server 1236, information about the location of a certain category of UEs 1320 currently served by the radio node(s) associated with the MEC server 1236, a list of UEs 1320 in a particular location, information about the location of all radio nodes currently associated with the MEC server 1236, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 1236, or a subset thereof, according to a desired deployment. In this regard, the OMA Zonal Presence API 1353 provides means for MEC Apps 1336 to retrieve information about a zone, the access points associated to the zones and the users that are connected to the access points. In addition, the OMA Zonal Presence API 1353, allows authorized application to subscribe to a notification mechanism, reporting about user activities within a zone. In various embodiments, a MEC server 1236 may access location information or zonal presence information of individual UEs 1320 using the OMA Zonal Presence API 1353 to identify the relative location or positions of the UEs 1320.

The bandwidth management services (BWMS) provides for the allocation of bandwidth to certain traffic routed to and from MEC Apps 1336, and specify static/dynamic up/down bandwidth resources, including bandwidth size and bandwidth priority. MEC Apps 1336 may use the BWMS to update/receive bandwidth information to/from the MEC platform 1337. In some embodiments, different MEC Apps 1336 running in parallel on the same MEC server 1236 may be allocated specific static, dynamic up/down bandwidth resources, including bandwidth size and bandwidth priority. The BWMS includes a bandwidth management (BWM) API 1353 to allowed registered applications to statically and/or dynamically register for specific bandwidth allocations per session/application. The BWM API 1353 includes HTTP protocol bindings for BWM functionality using RESTful services or some other suitable API mechanism.

Referring back to FIG. 13, multi-access edge management comprises multi-access edge system level management and the multi-access edge host level management 1330. The ME management 1330 comprises the MEC platform manager 1331 and the VI manager (VIM) 1332, and handles the management of MEC-specific functionality of a particular MEC server 1236 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 1331 is responsible for managing the life cycle of applications including informing the multi-access edge orchestrator (MEC-O) 1321 of relevant application related events. The MEC platform manager 1331 may also provide MEP element management functions 1331a to the MEC platform 1337, manage MEC App rules and requirements 1331b including service authorizations, traffic rules, DNS configuration and resolving conflicts, and manage MEC App 1336 lifecycles (MEALC mgmt 1331c). The MEC platform manager 1331 may also receive virtualized resources fault reports and performance measurements from the VIM 1332 for further processing. The Mm5 reference point between the MEC platform manager 1331 and the MEC platform 1337 is used to perform platform configuration, configuration of the MEPE mgmt 1331a, the MERR mgmt 1331b, the MEALC mgmt 1331c, management of application relocation, etc.

The VIM 1332 may be an entity that allocates, manages and releases virtualized (compute, storage and networking) resources of the VI 1338, and prepares the VI 1338 to run a software image. To do so, the VIM 1332 may communicate with the VI 1338 over the Mm7 reference point between the VIM 1332 and the VI 1338. Preparing the VI 1338 may include configuring the VI 1338, and receiving/storing the software image. When supported, the VIM 1332 may provide rapid provisioning of applications, such as described in "Openstack++ for Cloudlet Deployments", available at http://reports-archive.adm.cs.cmu.edu/anon/2015/CMU-CS-15-123.pdf. The VIM 1332 may also collect and report performance and fault information about the virtualized resources, and perform application relocation when supported. For application relocation from/to external cloud environments, the VIM 1332 may interact with an external cloud manager to perform the application relocation, for example using the mechanism described in "Adaptive VM Handoff Across Cloudlets", and/or possibly through a proxy. Furthermore, the VIM 1332 may communicate with the MEC platform manager 1331 via the Mm6 reference point, which may be used to manage virtualized resources, for example, to realize the application lifecycle management. Moreover, the VIM 1332 may communicate with the MEC-O 1321 via the Mm4 reference point, which may be used to manage virtualized resources of the MEC server 1236, and to manage application images. Managing the virtualized resources may include tracking available resource capacity, etc.

The multi-access edge system level management includes the MEC-O 1321 as a core component, which has an overview of the complete MEC system 1300. The MEC-O 1321 may maintain an overall view of the MEC system 1300 based on deployed multi-access edge hosts 901, available resources, available MEC services 1337*a,* and topology. The Mm3 reference point between the MEC-O 1321 and the MEC platform manager 1331 may be used for the management of the application lifecycle, application rules and requirements and keeping track of available MEC services 1337*a.* The MEC-O 1321 may communicate with the user application lifecycle management proxy (UALMP) 1325 via the Mm9 reference point in order to manage MEC Apps 1336 requested by UE application 1305.

The MEC-O 1321 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1302 to handle the applications. The MEC-O 1321 may select appropriate MEC host(s) 901 for application instantiation based on constraints, such as latency, available resources, and available services. The MEC-O 1321 may also trigger application instantiation and termination, as well as trigger application relocation as needed and when supported.

The Operations Support System (OSS) 1322 refers to the OSS of an operator that receives requests via the Customer Facing Service (CFS) portal 1306 (and over the Mx1 reference point) and from UE applications 1305 for instantiation or termination of MEC Apps 1336, and decides on the granting of these requests. The CFS portal 1306 (and the Mx1 interface) may be used by third-parties to request the MEC system 1300 to run applications 1306 in the MEC system 1300. Granted requests may be forwarded to the MEC-O 1321 for further processing. When supported, the OSS 1322 also receives requests from UE applications 1305 for relocating applications between external clouds and the MEC system 1300. The Mm2 reference point between the OSS 1322 and the MEC platform manager 1331 is used for the MEC platform manager 1331 configuration, fault and performance management. The Mm1 reference point between the MEC-O 1321 and the OSS 1322 is used for triggering the instantiation and the termination of multi-access edge applications 1336 in the MEC system 1300.

The UE app(s) 1305 (also referred to as "device applications" or the like) is one or more applications running in a device, computing system, etc. (e.g., UE 1320), that has the capability to interact with the MEC system 900 via the user application lifecycle management proxy 1325. The UE app(s) 1305 may be, include, or interact with one or more client applications, which in the context of MEC, is application software running on a device, computing system, etc. that utilizes functionality provided by one or more specific MEC application(s) 1336. The user application lifecycle management proxy ("user app LCM proxy") 1325 may authorize requests from UE applications 1305 in the UE and interacts with the OSS 1322 and the MEC-O 1321 for further processing of these requests. The term "lifecycle management," in the context of MEC, refers to a set of functions required to manage the instantiation, maintenance and termination of a MEC application 1336 instance. The user app LCM proxy 1325 may interact with the OSS 1322 via the Mm8 reference point, and is used to handle UE applications 1305 requests for running applications in the MEC system 1300. A user application 1305 may be an MEC App 1336 that is instantiated in the MEC system 1300 in response to a request of a user via an application running in the UE 1320 (e.g., UE application 1305). The user app LCM proxy 1325 allows UE applications 1305 to request on-boarding, instantiation, termination of user applications and when supported, relocation of user applications in and out of the MEC system 1300. It also allows informing the UE applications 1305 about the state of the user applications 1305. The user app LCM proxy 1325 is only accessible from within the mobile network, and may only be available when supported by the MEC system 1300. A UE application 1305 may use the Mx2 reference point between the user app LCM proxy 1325 and the UE application 1305 to request the MEC system 1300 to run an application in the MEC system 1300, or to move an application in or out of the MEC system 1300. The Mx2 reference point may only be accessible within the mobile network and may only be available when supported by the multi-access edge system.

In order to run an MEC App 1336 in the MEC system 1300, the MEC-O 1321 receives requests triggered by the OSS 1322, a third-party, or a UE application 1305. In response to receipt of such requests, the MEC-O 1321 selects a MEC server 1236 to host the MEC App 1336 for computational offloading. These requests may include information about the application to be run, and possibly other information, such as the location where the application needs to be active, other application rules and requirements, as well as the location of the application image if it is not yet on-boarded in the MEC system 1300.

In various embodiments, the MEC-O 1321 selects one or more MEC servers 1236 for computational intensive tasks. The selected one or more MEC servers 1236 may offload computational tasks of a UE application 1305 based on various operational parameters, such as network capabilities and conditions, computational capabilities and conditions, application requirements, and/or other like operational parameters. The application requirements may be rules and requirements associated to/with one or more MEC Apps 1336, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 1336 to be able to run; multi-access edge services that the MEC Apps 1336 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 1337*b;* DNS rules 1337*c;* etc.

The MEC-O 1321 considers the requirements and information listed above and information on the resources currently available in the MEC system 1300 to select one or several MEC servers 1236 within the MEC system 901 to host MEC Apps 1336 and/or for computational offloading. After one or more MEC servers 1236 are selected, the MEC-O 1321 requests the selected MEC host(s) 1236 to instantiate the application(s) or application tasks. The actual algorithm used to select the MEC servers 1236 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1321 may decide to select one or more new MEC servers 1236 to act as a master node, and initiates the transfer of an application instance or application-related state information from the one or more source MEC servers 1236 to the one or more target MEC servers 1236.

In addition, the MEC system architecture 1300 also provides support for various applications and use cases, including various automotive use cases such as those relevant to the embodiments discussed herein.

FIG. 14 illustrates a V2X system involving multiple MEC hosts (corresponding to MEC hosts 1336 in FIG. 13) and the use of V2X Information Services (VIS) 1352*a*-*b* (collectively referred to as "MEC VIS 1352"). FIGS. 13-14 is an example of application instances in a V2X service with MEC V2X API 1351*a* and 1351*b* (collectively referred to as "MEC V2X API 1351"). With reference to FIGS. 13 and 14, the UE app 1305 is an application instance running on a vehicle or vUE 1421 (corresponding to UE 1221*a* and/or 1320), and requesting V2X service to the system. MEC hosts 1236 are co-located with edge infrastructure (e.g., nodes 1231-133 of FIG. 12) and communicate with each other through the Mp3 interface. In the framework of V2X services, a vehicle 1421 (which may be the same or similar as vehicle system 121 or 221 of FIGS. 1-2) is hosting a client application 1405, and is connected to a certain MEC host 1236 (and a related MEC app 1336). In presence of multiple MEC hosts/servers 1236, the VIS 1352 permits to expose information between MEC apps 1336 running on different MEC hosts/servers 1236. In addition, other remote application server 1451 instances can be located somewhere else (e.g., private clouds owned by the operator or by the OEM such as cloud 1244). The VIS 1352 may be produced by the MEC platform 1337 or by the MEC Apps 1336. In particular, the VIS 1352 permits information exposure, pertinent to the support of automotive use cases, to MEC application instances. VIS 1352 also permits a single V2X/ITS operator to offer a V2X service(s) over a region that may span different countries and involve multiple network operators, MEC systems 1300 and MEC apps 1336 providers. For that purpose, the MEC VIS 1352 includes the following functionalities.

In some aspects, the MEC platform 1337 can include a MEC V2X API 1351 and provide MEC VIS 1352, which can include the following functionalities: (*a*) gathering of PC5 V2X relevant information from the 3GPP network for purposes of performing UE authorization for V2X communications (e.g., obtaining a list of V2X authorized UEs 1421, obtaining relevant information about the authorization based on the UE subscription, and obtaining V2X configuration parameters such as a common set of V2X configuration parameters which can include PC5 configuration parameters); (*b*) exposure of the information obtained in (*a*) to MEC apps 1336 in the same host or MEC apps in other MEC hosts; (*c*) enablement of MEC apps 1336 to communicate securely with the V2X-related 3GPP core network logical functions (e.g., enabling communication between the MEC host and a V2X control function in the core network); (*d*) enablement of MEC apps 1336 in different MEC systems 1300 to communicate securely with each other; and (*e*) gathering and processing information available in other MEC APIs 1353 (e.g., gathering and processing information obtained from a RNI API, Location API, WLAN API, and other APIs that may be implemented within the MEC platform 1337) in order to predict radio network congestion, and provide suitable notifications to the UE 1421.

From that perspective, the VIS 1352 is relevant to Mp1 and Mp3 reference points in the MEC architecture 1300. In particular, the relevant information is exposed to MEC apps 1336 via the Mp1 reference point, and the Mp3 reference point may enable the possibility to transfer this information between different MEC platforms 1337. The MEC V2X API 1351 provides information to MEC apps 1336 in a standardized way, which provides interoperability in multi-vendor scenarios. Nevertheless, MEC apps 1336 may communicate in a direct way (e.g., without the use of MEC platform 1337). Inter-system communication may be realized between MEC Orchestrators 1321. As an alternative, or, in addition to that, possible Mp3 enhancements (or new reference points between MEC systems 1300) may be defined.

In some aspects, the MEC Host 1236-2 can also implement a MEC V2X API 1351-2, which can provide an interface to one or more of the apps instantiated within MEC Host 1236-2, such as MEC App 1336-2*b*. In this regard, MEC host 1236-1 and MEC Host 1236-2 can communicate with each other via the Mp3 interface as well as the MEC V2X APIs 1351-1, 1351-2. Additionally, one or more of the MEC apps 1336-1 instantiated within MEC host 1236-lean communicate with one or more of the MEC apps 1336-2 instantiated within MEC Host 1236-2 via the MEC V2X APIs 1351-1, 1351-2 as well as the Mp3 interface between the MEC host 1236-land MEC Host 1236-2.

In some aspects, each of the MEC hosts 1236 can be owned/managed by a different mobile services operator (while it can be operated directly by a MEC vendor or a third party). In some aspects, MEC apps 1336 instantiated on MEC host 1236-land MEC Host 1236-2 can be used to provide V2X-related services, and can be operated by the mobile services operator, by a MEC vendor, or by a third party (e.g., OEM, or OEM supplier, or system integrator).

In some aspects, the MEC V2X APIs 1351 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 1351 can be configured to gather information and data from sensors. In this regard, the deployment of the MEC V2X APIs 1351 is ensuring continuity of the service across different mobile networks, for the same OEM (e.g., automobile manufacturer). If a standard implementation of a V2X API 1351 is introduced (e.g., by ETSI MEC), this functionality can ensure the same basic V2X service characteristics for all OEMs in a 5G communication system with MEC functionalities.

In some aspects, MEC app 1336*a* and MEC app 1336*b* can use the corresponding MEC V2X APIs 1351 to retrieve information from the 3GPP network. In some aspects, MEC apps 1336 can be configured to host V2X configuration parameters such as PC5 configuration parameters (or a common set of V2X configuration parameters that can be available within a multi—PLMN communication environment). The availability of these V2X configuration parameters also in absence of network coverage is ensured by the usage of an Mp3 interface (or another type of interface) between the hosts. In some aspects, MEC app 1336-1 can be configured to connect to MEC Host 1236-2 (through V2X MEC API 1351-2 in MEC Host 1236-2), and MEC app 1336-2 can be configured to connect to MEC host 1236-1 (through V2X MEC API 1351-1 in MEC host 1236-1). In case of a multi-operator architecture, multiple MEC hosts can be configured to communicate with each other via the MEC V2X APIs 1351 and synchronize in order to transfer the relevant V2X configuration parameters, so that they can be available across the multi-operator architecture in absence of cellular coverage (e.g., outside of the 3GPP domain). In this way, a vUE 1421 can have access to V2X configuration parameters even when the UE is not under coverage of its 3GPP network.

In some aspects, one or more ME apps within a MEC host 1236 can be instantiated to perform functionalities of a V2X application function, which may include providing VIS 1352. Additionally, MEC hosts can use MEC V2X APIs 1351 to perform various V2X or VIS 1352 functions. In particular, one or more ME apps can be instantiated within a MEC host to perform functionalities associated with a V2X application function. In some aspects, these ME apps can be configured to perform the following V2X application functions: obtaining V2X subscription information for a vUE 1421, determining whether the vUE 1421 is authorized to perform V2X communications in response to a request for V2X services, communicating V2X configuration parameters such as a common set of V2X configuration parameters, and so forth.

Systems and Implementations

FIG. 15 illustrates an example of infrastructure equipment 1500 in accordance with various embodiments. The infrastructure equipment 1500 (or "system 1500") may be implemented as a base station, radio head, access network node (e.g., the edge nodes 1230 shown and described previously), MEC servers 1236, server(s) 1250, and/or any other element/device discussed herein. In other examples, the system 1500 could be implemented in or by an intermediate node 1220 or endpoint 1210.

The system 1500 includes application circuitry 1505, baseband circuitry 1510, one or more RFEMs 1515, memory circuitry 1520, PMIC 1525, power tee circuitry 1530, network controller circuitry 1535, network interface connector 1540, positioning circuitry 1545, and user interface 1550. In some embodiments, the device 1500 may include additional elements such as, for example, memory/storage, display, camera, sensor, or I/O interface. In other embodiments, the components described below may be included in more than one device. For example, said circuitries may be separately included in more than one device for CRAN, vBBU, or other like implementations.

Application circuitry 1505 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 1505 may be coupled with or may include memory/storage elements and may be configured to execute instructions stored in the memory/storage to enable various applications or operating systems to run on the system 1500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1505 may include, for example, one or more processor cores, CPUs, application processors, GPUs, RISC processors, one or more Acorn RISC Machine (ARM) processors, CISC processors, one or more DSPs, one or more FPGAs, one or more PLDs, one or more ASICs, one or more microprocessors or controllers, or any suitable combination thereof. In some embodiments, the application circuitry 1505 may comprise, or may be, a special-purpose processor/controller to operate according to the various embodiments herein. As examples, the processor(s) of application circuitry 1505 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 1500 may not utilize application circuitry 1505, and instead may include a special-purpose processor/controller to process IP data received from an EPC or 5GC, for example.

In some implementations, the application circuitry 1505 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices PLDs such as CPLDs, HCPLDs, and the like; ASICs such as structured ASICs and the like; programmable SoCs; and/or the like. In such implementations, the circuitry of application circuitry 1505 may comprise logic blocks or logic fabric, and other interconnected resources that may be programmed to perform various functions, such as the procedures, methods, functions, etc. of the various embodiments discussed herein. In such embodiments, the circuitry of application circuitry 1505 may include memory cells (e.g., EPROM, EEPROM, flash memory, static memory (e.g., SRAM, anti-fuses, etc.)) used to store logic blocks, logic fabric, data, etc. in look-up-tables (LUTs) and the like.

In some implementations, such as implementations where subsystems of the edge nodes 1230, intermediate nodes 1220, and/or endpoints 1210 of FIG. 12 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 1505 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany198 based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 1510 may be implemented, for example, as a solder-down substrate including one or more integrated circuits, a single packaged integrated circuit soldered to a main circuit board or a multi-chip module containing two or more integrated circuits. The baseband circuitry 1510 includes one or more processing devices (e.g., baseband processors) to carry out various protocol and radio control functions. Baseband circuitry 1510 may interface with application circuitry of system 1500 for generation and processing of baseband signals and for controlling operations of the RFEMs 1515. The baseband circuitry 1510 may handle various radio control functions that enable communication with one or more radio networks via the RFEMs 1515. The baseband circuitry 1510 may include circuitry such as, but not limited to, one or more single-core or multi-core processors (e.g., one or more baseband processors) or control logic to process baseband signals received from a receive signal path of the RFEMs 1515, and to generate baseband signals to be provided to the RFEMs 1515 via a transmit signal path. In various embodiments, the baseband circuitry 1510 may implement a RTOS to manage resources of the baseband circuitry 1510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 15, in one embodiment, the baseband circuitry 1510 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 1515 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 1515 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1510 and/or RFEMs 1515. The baseband circuitry 1510 may also support radio communications for more than one wireless protocol.

Continuing with the aforementioned embodiment, the baseband circuitry 1510 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include FFT, precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 1550 may include one or more user interfaces designed to enable user interaction with the system 1500 or peripheral component interfaces designed to enable peripheral component interaction with the system 1500. User interfaces may include, but are not limited to, one or more physical or virtual buttons (e.g., a reset button), one or more indicators (e.g., LEDs), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a USB port, an audio jack, a power supply interface, etc.

The RFEMs 1515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 1515, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 1510 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 1520 may include one or more of volatile memory including DRAM and/or SDRAM, and nonvolatile memory including high-speed electrically erasable memory (commonly referred to as Flash memory), PRAM, MRAM, etc., and may incorporate the 3D crosspoint (XPOINT) memories from Intel® and Micron®. Memory circuitry 1520 may be implemented as one or more of solder down packaged integrated circuits, socketed memory modules and plug-in memory cards. The memory circuitry 1520 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 1500, an operating system of infrastructure equipment 1500, one or more applications, and/or for carrying out the embodiments discussed herein. The computational logic may be stored or loaded into memory circuitry 1520 as instructions for execution by the processors of the application circuitry 1505 to provide or perform the functions described herein. The various elements may be implemented by assembler instructions supported by processors of the application circuitry 1505 or high-level languages that may be compiled into such instructions. The permanent copy of the programming instructions may be placed into persistent storage devices of memory circuitry 1520 in the factory during manufacture, or in the field through, for example, a distribution medium (not shown), through a communication interface (e.g., from a distribution server), and/or OTA.

The PMIC 1525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1530 may provide for electrical power drawn from a network cable to provide both power supply and data connectivity to the infrastructure equipment 1500 using a single cable.

The network controller circuitry 1535 provides connectivity to a network using a standard network interface protocol such as Ethernet, Ethernet over GRE Tunnels, Ethernet over MPLS, or some other suitable protocol, such as those discussed herein. Network connectivity may be provided to/from the infrastructure equipment 1500 via network interface connector 1540 using a physical connection, which may be electrical (commonly referred to as a "copper interconnect"), optical, or wireless. The network controller circuitry 1535 may include one or more dedicated processors and/or FPGAs to communicate using one or more of the aforementioned protocols. In some implementations, the network controller circuitry 1535 may include multiple controllers to provide connectivity to other networks using the same or different protocols. In various embodiments, the network controller circuitry 1535 enables communication with associated equipment and/or with a backend system (e.g., server(s) 1230 of FIG. 12), which may take place via a suitable gateway device.

The positioning circuitry 1545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1545 may include a Micro-Technology for Positioning, Navigation, and Timing (Micro-PNT) IC that uses a master timing clock to perform position tracking/estimation without GNSS assistance. The positioning circuitry 1545 may also be part of, or interact with, the baseband circuitry 1510 and/or RFEMs 1515 to communicate with the nodes and components of the positioning network. The positioning circuitry 1545 may also provide position data and/or time data to the application circuitry 1505, which may use the data to synchronize operations with various other infrastructure equipment, or the like.

Additionally, when a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In ITSC implementations, the facilities layer of the road side ITS-S includes an ITS-S positioning service facility that provides and updates the geographical positioning of the ITS-S and/or other ITS-Ss in real time. Any of the aforementioned positioning technologies can be used to determine in real time the geographic position, with variable accuracy level for road safety ITS applications. In these implementations, the ITS-S positioning service facility may operate the positioning augmentation technology.

The components shown by FIG. 15 may communicate with one another using interface circuitry 1506 or IX 1506, which may include any number of bus and/or IX technologies such as ISA, extended ISA, I²C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, and/or any number of other IX technologies. The IX technology may be a proprietary bus, for example, used in an SoC based system.

Figure 16:
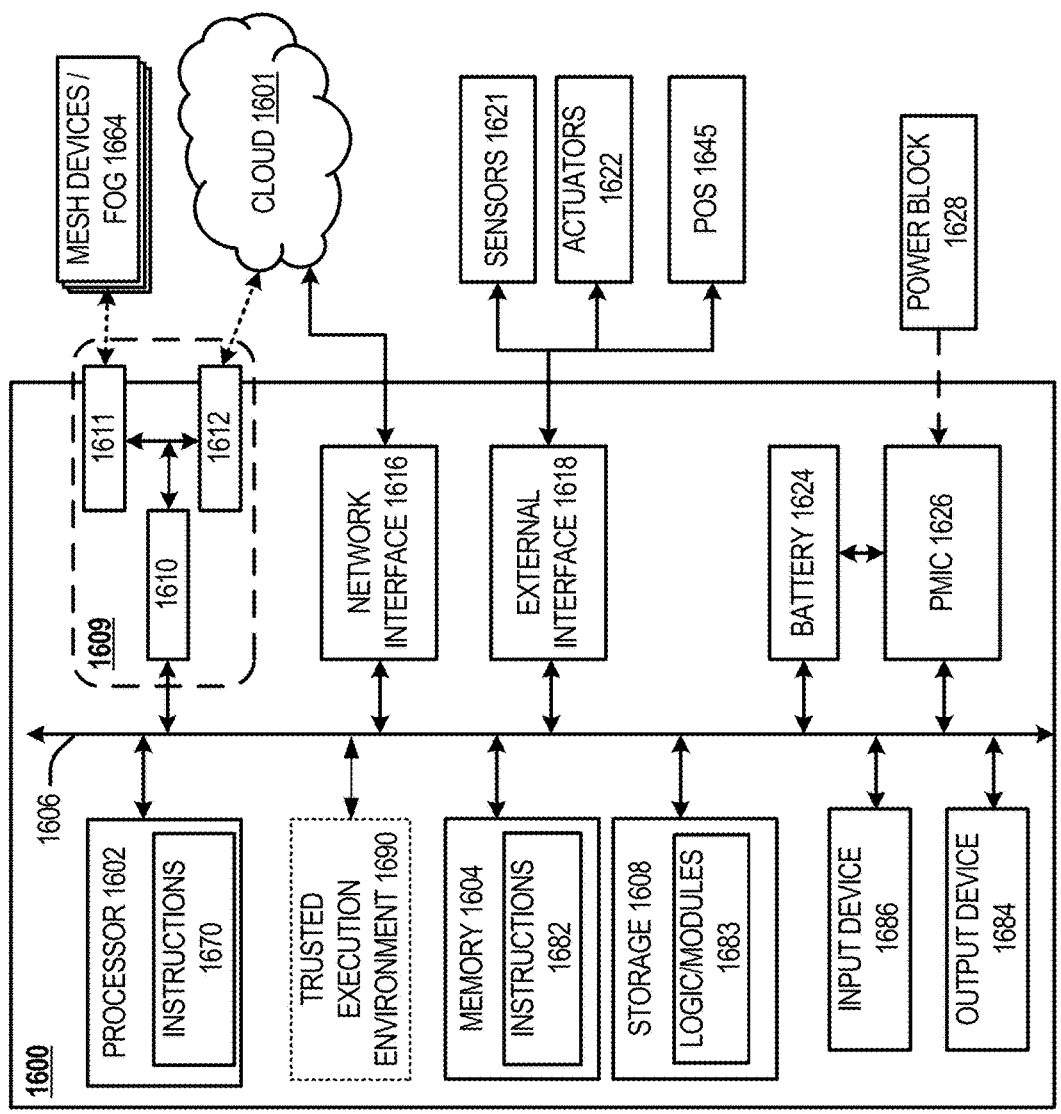
FIG. 16 depicts example components of a computer platform in accordance with various embodiments.

FIG. 16 illustrates an example of an platform 1600 (also referred to as "system 1600," "device 1600," "appliance 1600," or the like) in accordance with various embodiments. In embodiments, the platform 1600 may be suitable for use as intermediate nodes 1220 and/or endpoints 1210 of FIG. 12, IoT devices vehicle UEs (vUEs), and/or any other element/device discussed herein with regard any other figure shown and described herein. Platform 1600 may also be implemented in or as a server computer system or some other element, device, or system discussed herein. The platform 1600 may include any combinations of the components shown in the example. The components of platform 1600 may be implemented as integrated circuits (ICs), portions thereof, discrete electronic devices, or other modules, logic, hardware, software, firmware, or a combination thereof adapted in the computer platform 1600, or as components otherwise incorporated within a chassis of a larger system. The example of FIG. 16 is intended to show a high level view of components of the computer platform 1600. However, some of the components shown may be omitted, additional components may be present, and different arrangement of the components shown may occur in other implementations.

The platform 1600 includes processor circuitry 1602. The processor circuitry 1602 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1602 may include one or more hardware accelerators, which may be microprocessors, programmable processing devices (e.g., FPGA, ASIC, etc.), or the like. The one or more hardware accelerators may include, for example, computer vision and/or deep learning accelerators. In some implementations, the processor circuitry 1602 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 1602 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 1602 may be coupled with or may include memory/storage and may be configured to execute instructions stored in the memory/storage to enable various applications or operating systems to run on the platform 1600. In these embodiments, the processors (or cores) of the processor circuitry 1602 is configured to operate application software to provide a specific service to a user of the platform 1600. In some embodiments, the processor circuitry 1602 may be a special-purpose processor/controller to operate according to the various embodiments herein.

As examples, the processor circuitry 1602 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, Calif. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 1602 may be a part of a system on a chip (SoC), System-in-Package (SiP), a multi-chip package (MCP), and/or the like, in which the processor circuitry 1602 and other components are formed into a single integrated circuit, or a single package, such as the Edison™ or Galileo™ SoC boards from Intel® Corporation. Other examples of the processor circuitry 1602 are mentioned elsewhere in the present disclosure.

Additionally or alternatively, processor circuitry 1602 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 1602 may comprise logic blocks or logic fabric including and other interconnected resources that may be programmed to perform various functions, such as the procedures, methods, functions, etc. of the various embodiments discussed herein. In such embodiments, the circuitry of processor circuitry 1602 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 1602 may communicate with system memory circuitry 1604 over an interconnect 1606 (e.g., a bus). Any number of memory devices may be used to provide for a given amount of system memory. As examples, the memory circuitry 1604 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 1604 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 1604 may also comprise persistent storage devices, which may be temporal and/or persistent storage of any type, including, but not limited to, non-volatile memory, optical, magnetic, and/or solid state mass storage, and so forth.

The individual memory devices of memory circuitry 1604 may be implemented as one or more of solder down packaged integrated circuits, socketed memory modules, and plug-in memory cards. The memory circuitry 1604 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. In embodiments, the memory circuitry 1604 may be disposed in or on a same die or package as the processor circuitry 1602 (e.g., a same SoC, a same SiP, or soldered on a same MCP as the processor circuitry 1602).

To provide for persistent storage of information such as data, applications, operating systems (OS), and so forth, a storage circuitry 1608 may also couple to the processor circuitry 1602 via the interconnect 1606. In an example, the storage circuitry 1608 may be implemented via a solid-state disk drive (SSDD). Other devices that may be used for the storage circuitry 1608 include flash memory cards, such as SD cards, microSD cards, xD picture cards, and the like, and USB flash drives. In low power implementations, the storage circuitry 1608 may be on-die memory or registers associated with the processor circuitry 1602. However, in some examples, the storage circuitry 1608 may be implemented using a micro hard disk drive (HDD). Further, any number of new technologies may be used for the storage circuitry 1608 in addition to, or instead of, the technologies described, such resistance change memories, phase change memories, holographic memories, or chemical memories, among others.

The storage circuitry 1608 store computational logic 1683 (or "modules 1683") in the form of software, firmware, or hardware commands to implement the techniques described herein. The computational logic 1683 may be employed to store working copies and/or permanent copies of computer programs, or data to create the computer programs, for the operation of various components of platform 1600 (e.g., drivers, etc.), an OS of platform 1600 and/or one or more applications for carrying out the embodiments discussed herein. The computational logic 1683 may be stored or loaded into memory circuitry 1604 as instructions 1682, or data to create the instructions 1682, for execution by the processor circuitry 1602 to provide the functions described herein. The various elements may be implemented by assembler instructions supported by processor circuitry 1602 or high-level languages that may be compiled into such instructions (e.g., instructions 1670, or data to create the instructions 1670). The permanent copy of the programming instructions may be placed into persistent storage devices of storage circuitry 1608 in the factory or in the field through, for example, a distribution medium (not shown), through a communication interface (e.g., from a distribution server (not shown)), or over-the-air (OTA).

In an example, the instructions 1682 provided via the memory circuitry 1604 and/or the storage circuitry 1608 of FIG. 16 are embodied as one or more non-transitory computer readable storage media (see e.g., NTCRSM 1660) including program code, a computer program product or data to create the computer program, with the computer program or data, to direct the processor circuitry 1602 of platform 1600 to perform electronic operations in the platform 1600, and/or to perform a specific sequence or flow of actions, for example, as described with respect to the flowchart(s) and block diagram(s) of operations and functionality depicted previously. The processor circuitry 1602 accesses the one or more non-transitory computer readable storage media over the interconnect 1606.

In alternate embodiments, programming instructions (or data to create the instructions) may be disposed on multiple NTCRSM 1660. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1660 may be embodied by devices described for the storage circuitry 1608 and/or memory circuitry 1604. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 1683, instructions 1682, 1670 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 1600, partly on the system 1600, as a stand-alone software package, partly on the system 1600 and partly on a remote computer or entirely on the remote computer or server. In the latter scenario, the remote computer may be connected to the system 1600 through any type of network, including a LAN or WAN, or the connection may be made to an external computer (e.g., through the Internet using an Internet Service Provider).

In an example, the instructions 1670 on the processor circuitry 1602 (separately, or in combination with the instructions 1682 and/or logic/modules 1683 stored in computer-readable storage media) may configure execution or operation of a trusted execution environment (TEE) 1690. The TEE 1690 operates as a protected area accessible to the processor circuitry 1602 to enable secure access to data and secure execution of instructions. In some embodiments, the TEE 1690 may be a physical hardware device that is separate from other components of the system 1600 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

In other embodiments, the TEE 1690 may be implemented as secure enclaves, which are isolated regions of code and/or data within the processor and/or memory/storage circuitry of the system 1600. Only code executed within a secure enclave may access data within the same secure enclave, and the secure enclave may only be accessible using the secure application (which may be implemented by an application processor or a tamper-resistant microcontroller). Various implementations of the TEE 1690, and an accompanying secure area in the processor circuitry 1602 or the memory circuitry 1604 and/or storage circuitry 1608 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1600 through the TEE 1690 and the processor circuitry 1602.

In some embodiments, the memory circuitry 1604 and/or storage circuitry 1608 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1604 and/or storage circuitry 1608 may be divided into one or more trusted memory regions for storing applications or software modules of the TEE 1690.

Although the instructions 1682 are shown as code blocks included in the memory circuitry 1604 and the computational logic 1683 is shown as code blocks in the storage circuitry 1608, it should be understood that any of the code blocks may be replaced with hardwired circuits, for example, built into an FPGA, ASIC, or some other suitable circuitry. For example, where processor circuitry 1602 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 1604 and/or storage circuitry 1608 may store program code of an operating system (OS), which may be a general purpose OS or an OS specifically written for and tailored to the computing platform 1600. For example, the OS may be Unix or a Unix-like OS such as Linux e.g., provided by Red Hat Enterprise, Windows™ provided by Microsoft Corp.®, macOS provided by Apple Inc.®, or the like. In another example, the OS may be a mobile OS, such as Android® provided by Google iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For ToT® provided by Microsoft Corp.®, Micro-Controller Operating Systems ("MicroC/OS" or "µC/OS") provided by Micrium®, Inc., FreeRTOS, VxWorks° provided by Wind River Systems, Inc.®, PikeOS provided by Sysgo AG®, Android Things® provided by Google QNX® RTOS provided by BlackBerry Ltd., or any other suitable RTOS, such as those discussed herein.

The OS may include one or more drivers that operate to control particular devices that are embedded in the platform 1600, attached to the platform 1600, or otherwise communicatively coupled with the platform 1600. The drivers may include individual drivers allowing other components of the platform 1600 to interact or control various I/Odevices that may be present within, or connected to, the platform 1600. For example, the drivers may include a display driver to control and allow access to a display device, a touchscreen driver to control and allow access to a touchscreen interface of the platform 1600, sensor drivers to obtain sensor readings of sensor circuitry 1621 and control and allow access to sensor circuitry 1621, actuator drivers to obtain actuator positions of the actuators 1622 and/or control and allow access to the actuators 1622, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from a secure execution environment, trusted execution environment, and/or management engine of the platform 1600 (not shown).

The components may communicate over the IX 1606. The IX 1606 may include any number of technologies, including ISA, extended ISA, I²C, SPI, point-to-point interfaces, power management bus (PMBus), PCI, PCIe, PCIx, Intel® UPI, Intel® Accelerator Link, Intel® CXL, CAPI, Open-CAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, and/or any number of other IX technologies. The IX 1606 may be a proprietary bus, for example, used in a SoC based system.

The interconnect 1606 couples the processor circuitry 1602 to the communication circuitry 1609 for communications with other devices. The communication circuitry 1609 is a hardware element, or collection of hardware elements, used to communicate over one or more networks (e.g., cloud 1601) and/or with other devices (e.g., mesh devices/fog 1664). The communication circuitry 1609 includes baseband circuitry 1610 (or "modem 1610") and RF circuitry 1611 and 1612.

The baseband circuitry 1610 includes one or more processing devices (e.g., baseband processors) to carry out various protocol and radio control functions. Baseband circuitry 1610 may interface with application circuitry of platform 1600 (e.g., a combination of processor circuitry 1602, memory circuitry 1604, and/or storage circuitry 1608) for generation and processing of baseband signals and for controlling operations of the RF circuitry 1611 or 1612. The baseband circuitry 1610 may handle various radio control functions that enable communication with one or more radio networks via the RF circuitry 1611 or 1612. The baseband circuitry 1610 may include circuitry such as, but not limited to, one or more single-core or multi-core processors (e.g., one or more baseband processors) or control logic to process baseband signals received from a receive signal path of the RF circuitry 1611 and/or 1612, and to generate baseband signals to be provided to the RF circuitry 1611 or 1612 via a transmit signal path. In various embodiments, the baseband circuitry 1610 may implement an RTOS to manage resources of the baseband circuitry 1610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 16, in one embodiment, the baseband circuitry 1610 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 1609 is a cellular radiofrequency communication system, such as millimeter wave (mmWave) communication circuitry or some other suitable cellular communication circuitry. In the first example, the protocol processing circuitry 1602 would operate MAC, RLC, PDCP, SDAP, RRC, and NAS functions. In a second example, the protocol processing circuitry may operate one or more IEEE-based protocols when the communication circuitry 1609 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 1610 and/or RF circuitry 1611 and 1612. The baseband circuitry 1610 may also support radio communications for more than one wireless protocol.

Continuing with the aforementioned embodiment, the baseband circuitry 1610 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 1609 also includes RF circuitry 1611 and 1612 to enable communication with wireless networks using modulated electromagnetic radiation through a non-solid medium. Each of the RF circuitry 1611 and 1612 include a receive signal path, which may include circuitry to convert analog RF signals (e.g., an existing or received modulated waveform) into digital baseband signals to be provided to the baseband circuitry 1610. Each of the RF circuitry 1611 and 1612 also include a transmit signal path, which may include circuitry configured to convert digital baseband signals provided by the baseband circuitry 1610 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 1611 or 1612 using metal transmission lines or the like.

The RF circuitry 1611 (also referred to as a "mesh transceiver") is used for communications with other mesh or fog devices 1664. The mesh transceiver 1611 may use any number of frequencies and protocols, such as 2.4 GHz transmissions under the IEEE 802.15.4 standard, using the Bluetooth® low energy (BLE) standard, as defined by the Bluetooth® Special Interest Group, or the ZigBee® standard, among others. Any number of RF circuitry 1611, configured for a particular wireless communication protocol, may be used for the connections to the mesh devices 1664. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 1611 may communicate using multiple standards or radios for communications at different ranges. For example, the platform 1600 may communicate with close/proximate devices, e.g., within about 10 meters, using a local transceiver based on BLE, or another low power radio, to save power. More distant mesh devices 1664, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 1612 (also referred to as a "wireless network transceiver," a "cloud transceiver," or the like) may be included to communicate with devices or services in the cloud 1601 via local or wide area network protocols. The wireless network transceiver 1612 includes one or more radios to communicate with devices in the cloud 1601. The cloud 1601 may be the same or similar to cloud 144 discussed previously. The wireless network transceiver 1612 may be a LPWA transceiver that follows the IEEE 802.15.4, or IEEE 802.15.4g standards, among others, such as those discussed herein. The platform 1600 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1611 and wireless network transceiver 1612, as described herein. For example, the radio transceivers 1611 and 1612 may include an LTE or other cellular transceiver that uses spread spectrum (SPA/SAS) communications for implementing high-speed communications. Further, any number of other protocols may be used, such as WiFi® networks for medium speed communications and provision of network communications. The transceivers 1611 and 1612 may include radios that are compatible with, and/or may operate according to any one or more of the following radio communication technologies and/or standards including but not limited to those discussed herein.

Network interface circuitry/controller (NIC) 1616 may be included to provide wired communication to the cloud 1601 or to other devices, such as the mesh devices 1664 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 1600 via NIC 1616 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 1616 may include one or more dedicated processors and/or FPGAs to communicate using one or more of the aforementioned network interface protocols. In some implementations, the NIC 1616 may include multiple controllers to provide connectivity to other networks using the same or different protocols. For example, the platform 1600 may include a first NIC 1616 providing communications to the cloud over Ethernet and a second NIC 1616 providing communications to other devices over another type of network.

The interconnect 1606 may couple the processor circuitry 1602 to an external interface 1618 (also referred to as "I/O interface circuitry" or the like) that is used to connect external devices or subsystems. The external devices include, inter alia, sensor circuitry 1621, actuators 1622, and positioning circuitry 1645.

The sensor circuitry 1621 may include devices, modules, or subsystems whose purpose is to detect events or changes in its environment and send the information (sensor data) about the detected events to some other a device, module, subsystem, etc. Examples of such sensors 1621 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 1618 connects the platform 1600 to actuators 1622, allow platform 1600 to change its state, position, and/or orientation, or move or control a mechanism or system. The actuators 1622 comprise electrical and/or mechanical devices for moving or controlling a mechanism or system, and converts energy (e.g., electric current or moving air and/or liquid) into some kind of motion. The actuators 1622 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1622 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1600 may be configured to operate one or more actuators 1622 based on one or more captured events and/or instructions or control signals received from a service provider and/or various client systems.

The positioning circuitry 1645 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1645 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1645 may include a Micro-Technology for Positioning, Navigation, and Timing (Micro-PNT) IC that uses a master timing clock to perform position tracking/estimation without GNSS assistance. The positioning circuitry 1645 may also be part of, or interact with, the communication circuitry 1609 to communicate with the nodes and components of the positioning network. The positioning circuitry 1645 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS).

In some implementations, the positioning circuitry 1645 is, or includes an INS, which is a system or device that uses sensor circuitry 1621 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1600 without the need for external references.

In some examples, various I/O devices may be present within, or connected to, the platform 1600, which are referred to as input device circuitry 1686 and output device circuitry 1684 in FIG. 16. The input device circuitry 1686 and output device circuitry 1684 include one or more user interfaces designed to enable user interaction with the platform 1600 and/or peripheral component interfaces designed to enable peripheral component interaction with the platform 1600. Input device circuitry 1686 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 1684 may be included to show information or otherwise convey information, such as sensor readings, actuator position(s), or other like information. Data and/or graphics may be displayed on one or more user interface components of the output device circuitry 1684. Output device circuitry 1684 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1600. The output device circuitry 1684 may also include speakers or other audio emitting devices, printer(s), and/or the like. In some embodiments, the sensor circuitry 1621 may be used as the input device circuitry 1686 (e.g., an image capture device, motion capture device, or the like) and one or more actuators 1622 may be used as the output device circuitry 1684 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

A battery 1624 may be coupled to the platform 1600 to power the platform 1600, which may be used in embodiments where the platform 1600 is not in a fixed location. The battery 1624 may be a lithium ion battery, a lead-acid automotive battery, or a metal-air battery, such as a zinc-air battery, an aluminum-air battery, a lithium-air battery, a lithium polymer battery, and/or the like. In embodiments where the platform 1600 is mounted in a fixed location, the platform 1600 may have a power supply coupled to an electrical grid. In these embodiments, the platform 1600 may include power tee circuitry to provide for electrical power drawn from a network cable to provide both power supply and data connectivity to the platform 1600 using a single cable.

PMIC 1626 may be included in the platform 1600 to track the state of charge (SoCh) of the battery 1624, and to control charging of the platform 1600. The PMIC 1626 may be used to monitor other parameters of the battery 1624 to provide failure predictions, such as the state of health (SoH) and the state of function (SoF) of the battery 1624. The PMIC 1626 may include voltage regulators, surge protectors, power alarm detection circuitry. The power alarm detection circuitry may detect one or more of brown out (under-voltage)

and surge (over-voltage) conditions. The PMIC 1626 may communicate the information on the battery 1624 to the processor circuitry 1602 over the interconnect 1606. The PMIC 1626 may also include an analog-to-digital (ADC) convertor that allows the processor circuitry 1602 to directly monitor the voltage of the battery 1624 or the current flow from the battery 1624. The battery parameters may be used to determine actions that the platform 1600 may perform, such as transmission frequency, mesh network operation, sensing frequency, and the like. As an example, the PMIC 1626 may be a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex.

A power block 1628, or other power supply coupled to a grid, may be coupled with the PMIC 1626 to charge the battery 1624. In some examples, the power block 1628 may be replaced with a wireless power receiver to obtain the power wirelessly, for example, through a loop antenna in the platform 1600. A wireless battery charging circuit, such as an LTC4020 chip from Linear Technologies of Milpitas, Calif., among others, may be included in the PMIC 1626. The specific charging circuits chosen depend on the size of the battery 1624, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 17:
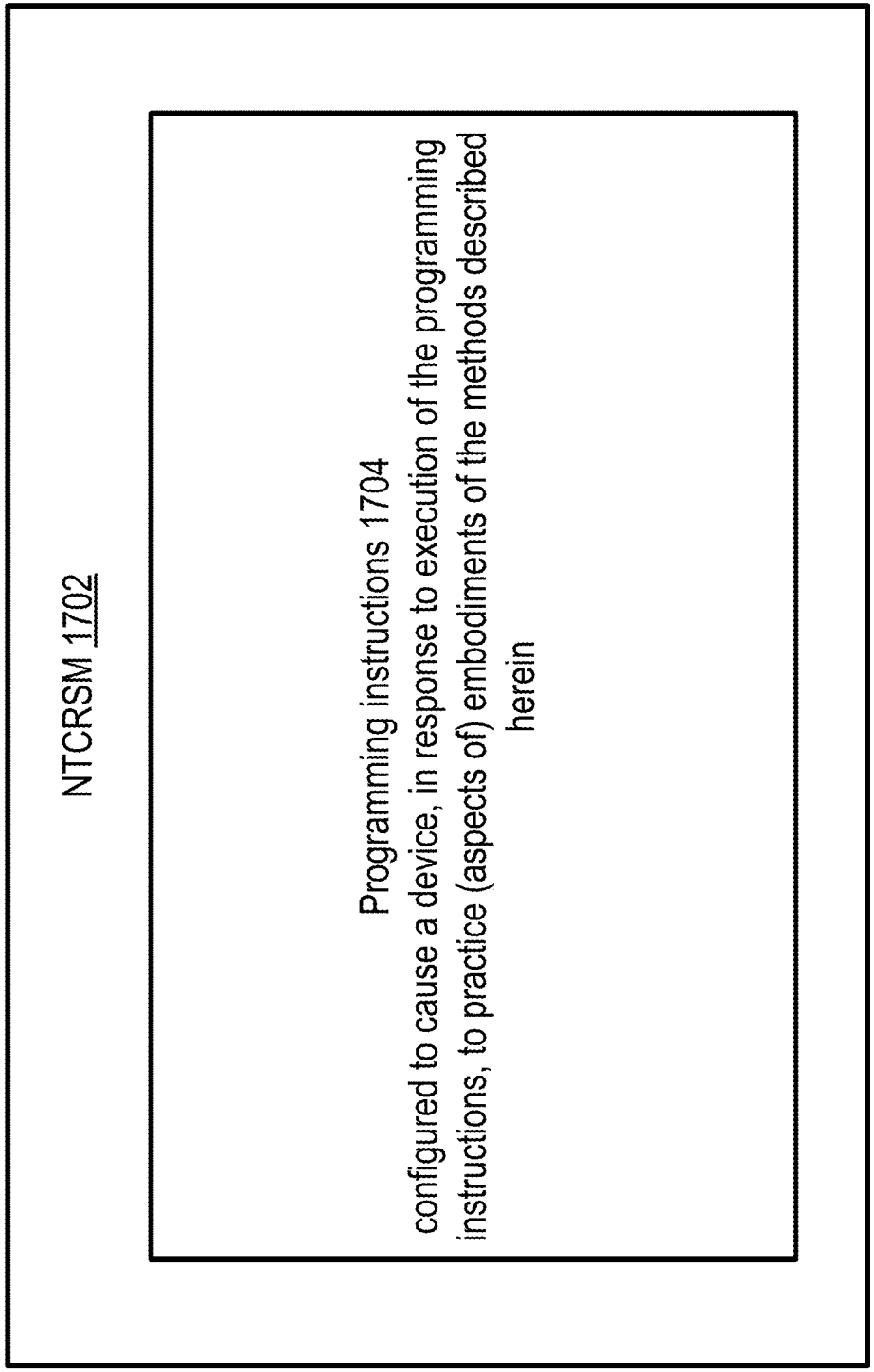
FIG. 17 illustrates an example non-transitory computer-readable storage media according to various embodiments.

Furthermore, the present disclosure may take the form of a computer program product or data to create the computer program, with the computer program or data embodied in any tangible or non-transitory medium of expression having the computer-usable program code (or data to create the computer program) embodied in the medium. FIG. 17 illustrates an example non-transitory computer-readable storage media (NTCRSM) that may be suitable for use to store instructions (or data that creates the instructions) that cause an apparatus (such as any of the devices/components/ systems shown and described herein), in response to execution of the instructions by the apparatus, to practice selected aspects of the present disclosure. As shown, NTCRSM 1702 may include a number of programming instructions 1704 (or data to create the programming instructions). Programming instructions 1704 may be configured to enable a device (e.g., any of the devices/components/systems described herein), in response to execution of the programming instructions, to perform various programming operations associated with operating system functions, one or more applications, and/or aspects of the present disclosure. In some embodiments, the programming instructions 1704 (or data to create the programming instructions) to be executed may be in a pre-configured form that may require configuration instructions to install or provision the programming instructions 1704 to an apparatus (such as any of the devices/components/systems described herein). When installed/provisioned, configured and executed, the programming instructions 1704 can complete or perform various programming operations associated with operating system functions, one or more applications, and/or aspects of the present disclosure (including various programming operations associated with FIGS. 3-7).

In alternate embodiments, programming instructions 1704 (or data to create the instructions) may be disposed on multiple NTCRSM 1702. In alternate embodiments, programming instructions 1704 (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 1702 may be embodied by devices described for the storage circuitry 2008 and/or memory circuitry 2004 described with regard to FIG. 20. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2083, instructions 2082, 2070 discussed previously with regard to FIG. 20) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.j s, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2000, partly on the system 2000, as a stand-alone software package, partly on the system 2000 and partly on a remote computer or entirely on the remote computer or server (e.g., system 1900). In the latter scenario, the remote computer may be connected to the system 2000 through any type of network, including a LAN or WAN, or the connection may be made to an external computer (e.g., through the Internet using an Internet Service Provider).

EXAMPLES

Illustrative examples of the devices, systems, and methods disclosed herein are provided below. An embodiment of the devices, systems, and methods may include any one or more, and any combination of, the examples described below Example A01 includes a method to provide Mobility Service Provider (MSP) Server selection for vehicle user equipment (vUEs) the method comprises: selecting, by a selection function (or "target server selector"), a target MSP Server of a plurality of MSP Servers to serve an individual vUE, wherein the selection function (or "target server selector") is operated in response to detection of a trigger to perform an MSP Server selection procedure; and sending, by the selection function (or "target server selector"), a selection notification to the target MSP Server and the vUE, the selection notification indicating the target MSP Server as the selected MSP Server.

Example A02 includes the method of example A01 and/or some other example(s) herein, further comprising: receiving, by the selection function (or "target server selector"), a trigger notification from an access network indicating the detection of the trigger by the access network. Example A03 includes the method of example A02 and/or some other example(s) herein, further comprising: sending, by the selection function (or "target server selector"), a subscription request to the access network to subscribe to receive event notifications related to one or more vUEs.

Example A04 includes the method of example A03 and/or some other example(s) herein, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas. Example A05 includes the method of examples A01-A04 and/or some other example(s) herein, wherein the selecting comprises, selecting, by the selection function (or "target server selector"), the target MSP Server based on one or more of Radio Access Network (RAN) information, one or more policies, one or more application rules, a type of trigger event triggering the MSP Server selection, data offloading conditions, location of the vUE, or MSP Server capabilities.

Example A06 includes the method of examples A01-A05 and/or some other example(s) herein, further comprising: determining or identifying, by the selection function (or "target server selector"), a target MSP Server identity (ID), the target MSP Server ID including an internet protocol (IP) address, a Media Access Control (MAC) address, a universally unique identifier (UUID), a resolvable fully qualified domain name (FQDN), socket, or a port number.

Example A07 includes the method of example A06 and/or some other example(s) herein, further comprising: generating, by the selection function (or "target server selector"), the selection notification to include the target MSP Server ID.

Example A08 includes the method of examples A01-A07 and/or some other example(s) herein, further comprising: sending, by the selection function (or "target server selector"), the selection notification to a source MSP Server, the source MSP Server is an MSP Server currently serving the vUE, and the selection notification is to cause the source MSP Server to perform a data transfer procedure with the target MSP Server.

Example A09 includes the method of examples A01-A08 and/or some other example(s) herein, wherein the method is performed by a computing system, the computing system comprises network interface circuitry arranged to communicatively couple the computing system with a plurality of MSP Servers, each of the plurality of MSP Servers are communicatively coupled with one another to form an MSP network, and the computing system comprises processing circuitry coupled with network interface circuitry, wherein the processing circuitry is arranged to operate the selection function (or "target server selector").

Example A10 includes the method of example A09 and/or some other example(s) herein, wherein the plurality of MSP Servers include MSP edge servers or MSP center servers; and the computing system is a Domain Name System (DNS) server, an MSP center server, or an MSP edge server.

Example A11 includes the method of example A10 and/or some other example(s) herein, wherein the MSP edge servers are Multi-access Edge Computing (MEC) hosts or Content Delivery Network (CDN) node, and the access network is one of a Third Generation Partnership Project (3GPP) network or a Wireless Local Area Network (WLAN).

Example B01 a method of operating a Mobility Service Provider (MSP) center server, the method comprising: receiving a first notification indicating occurrence of a trigger event to select an MSP edge server among a plurality of MSP edge servers to serve a vehicle system; performing an MSP server selection procedure to select a target MSP edge server of the plurality of MSP edge servers to serve the vehicle system; sending a second notification to the target MSP edge server to notify the target MSP edge server about the selection; and sending an instruction to the vehicle system instructing the vehicle system to establish a communication session with the target MSP edge server.

Example B02 includes the method of example B01 and/or some other example(s) herein, wherein receiving the first notification comprises: receiving the first notification from an access network via a source MSP edge server of the plurality of MSP edge servers, the source MSP edge server is an MSP edge server currently serving the vehicle system.

Example B03 includes the method of example B02 and/or some other example(s) herein, further comprising: sending a third notification to the access network to notify the access network about the selection; and sending a fourth notification to the source MSP edge server to notify the source MSP edge server about the selection, and the fourth notification is to cause the source MSP edge server to perform a data transfer procedure with the target MSP edge server.

Example B04 includes the method of examples B02-B03 and/or some other example(s) herein, further comprising: sending a subscription request to the access network to subscribe to receive event notifications related to the vehicle system.

Example B05 includes the method of example B04 and/or some other example(s) herein, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas.

Example B06 includes the method of examples B01-B05 and/or some other example(s) herein, wherein performing the MSP server selection procedure comprises: determining or identifying a target MSP edge server identity (ID), the target MSP edge server ID including an internet protocol (AP) address, a Media Access Control (MAC) address, a universally unique identifier (UUID), a resolvable fully qualified domain name (FQDN), socket, or a port number.

Example B07 includes the method of example B06 and/or some other example(s) herein, further comprising: generating the second notification to include the target MSP edge server ID.

Example B08 includes the method of examples B06-B07 and/or some other example(s) herein, further comprising: generating the instruction to include the target MSP edge server ID.

Example C01 includes a method of operating a vehicle user equipment (vUE), the method comprising: receiving a first notification from a first access network based on detection of a trigger to reselect a Mobility Service Provider (MSP) Server serving the vUE; performing a connection establishment procedure with a second access network in response to receipt of the notification, the second access network being associated with an MSP Server selected to serve the vUE; and receiving a second notification from the selected MSP Server indicating successful establishment of a session or service with the selected MSP Server.

Example C02 includes the method of example C01 and/or some other example(s) herein, wherein the first notification includes an instruction to switch access networks, and includes information about one or more access networks including the second access network, wherein the information at least includes information about MSP Servers associated with each of the one or more access networks.

Example C03 includes the method of example C02 and/or some other example(s) herein, further comprising: selecting the second access network based on at least the information included in the first notification.

Example D01 includes a method of managing server selection for vehicle user equipment (vUEs), the method comprising: in response to detection of an event trigger, selecting an edge server of a plurality of edge servers to serve an individual vUE, wherein the selection is based on an application rule indicating how to select the edge server based on the detected event trigger; and sending a selection notification to the individual vUE, the selection notification indicating the selected edge server.

Example D02 includes the method of example D01 and/or some other example(s) herein, further comprising: receiving a configuration from a selection function, the configuration indicating one or more application rules for edge server reselection and one or more event triggers, the detected event trigger being among the one or more event triggers, and the application rule used for the selection is among the one or more application rules.

Example D03 includes the method of example D02 and/or some other example(s) herein, further comprising: sending the selection notification to the selected edge server and a current edge server currently serving the individual vUE, the selection notification causing the selected edge server and the current edge server to perform a background data transfer procedure.

Example D04 includes the method of example D02 and/or some other example(s) herein, wherein the one or more event triggers include one or more of receipt of measurement reports from the vUE, signal measurements indicated by the measurement reports being above or below a threshold signal strength or signal quality, timer expiry, location changes of the vUE, network congestion level being above or below a threshold congestion level, a latency measurement being above or below a threshold latency value, or a number of vehicle systems in one or more geographical areas.

Example D05 includes the method of examples D01-D04 and/or some other example(s) herein, wherein the method is performed by a computing system, the computing system comprises processor circuitry coupled with network interface circuitry, the network interface circuitry is arranged to communicatively couple the computing system with the plurality of edge servers, each of the plurality of edge servers are disposed at an edge of a communication network, and each of the plurality of edge servers are arranged to provide computing resources to one or more vUEs including the individual vUE.

Example Z01 may include an apparatus comprising means to perform one or more elements of a method described in or related to any of examples A01-A11, B01-B08, C01-0C03, D01-D05, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A11, B01-B08, C01-0C03, D01-D05, or any other method or process described herein.

Example Z03 may include an apparatus comprising logic, modules, or circuitry to perform one or more elements of a method described in or related to any of examples A01-A11, B01-B08, C01-0C03, D01-D05, or any other method or process described herein. Example Z04 may include a method, technique, or process as described in or related to any of examples A01-A11, B01-B08, C01-0C03, D01-D05, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A11, B01-B08, C01-0C03, D01-D05, or portions thereof.

Example Z06 may include a signal as described in or related to any of examples A01-A11, B01-B08, C01-0C03, D01-D05, or portions or parts thereof. Example Z07 may include a datagram, packet, frame, segment, protocol data unit (PDU), or message as described in or related to any of examples A01-A11, B01-B08, C01-0C03, D01-D05, or portions or parts thereof, or otherwise described in the present disclosure. Example Z08 may include a signal encoded with data as described in or related to any of examples A01-A11, B01-B08, C01-0C03, D01-D05, or portions or parts thereof, or otherwise described in the present disclosure. Example Z09 may include a signal encoded with a datagram, packet, frame, segment, protocol data unit (PDU), or message as described in or related to any of examples A01-A11, B01-B08, C01-0C03, D01-D05, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A11, B01-B08, C01-0C03, D01-D05, or portions thereof.

Example Z11 may include a computer program comprising instructions, wherein execution of the program by a processing element is to cause the processing element to carry out the method, techniques, or process as described in or related to any of examples A01-A11, B01-B08, C01-0C03, D01-D05, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-GSB, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

As used herein, the term "computational offloading" or "offloading" refers to the transfer of resource intensive computational tasks or workloads from a device, computing system, etc., to an external platform such as an edge node/server, cluster, grid, cloud computing service, and/or the like.

As used herein, the term "workload" may refer to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A computing system to perform Mobility Service Provider (MSP) Server selection for one or more vehicle user equipment (vUEs), the computing system comprising:
    network interface circuitry arranged to communicatively couple the computing system with a plurality of MSP Servers, the plurality of MSP Servers including MSP edge servers or MSP center servers, the computing system is a Domain Name System (DNS) server, an MSP center server, or an MSP edge server, the MSP edge servers are Multi-access Edge Computing (MEC) hosts or Content Delivery Network (CDN) node, and each MSP Server of the plurality of MSP Servers are communicatively coupled with one another to form an MSP network, and
    processing circuitry coupled with network interface circuitry, wherein:
    the processing circuitry is arranged to operate a target server selector to select a target MSP Server of the plurality of MSP Servers to serve an individual vUE of the one or more vUEs, wherein the target server selector is operated in response to a detection of a trigger to perform an MSP Server selection procedure; and
    the network interface circuitry is arranged to send a selection notification to the target MSP Server and the individual vUE, the selection notification indicating the target MSP Server as the selected MSP Server.

2. The computing system of claim 1, wherein the network interface circuitry is further arranged to:
    receive a trigger notification from an access network indicating the detection of the trigger by the access network, wherein the access network is one of a Third Generation Partnership Project (3GPP) network or a Wireless Local Area Network (WLAN).

3. The computing system of claim 2, wherein the network interface circuitry is further arranged to:
    send a subscription request to the access network to subscribe to receive event notifications related to the one or more vUEs.

4. The computing system of claim 3, wherein the subscribed events include one or more of receipt of measurement reports from the individual vUE, signal measurements being above or below a threshold signal strength or signal quality, timer expiry, location changes of the individual vUE, network congestion level being above or below a threshold congestion level, a latency measurement being above or below a threshold latency value, or a number of vUEs in one or more geographical areas.

5. The computing system of claim 1, wherein the processing circuitry is arranged to operate the target server selector to select the target MSP Server based on one or more of Radio Access Network (RAN) information, one or more policies, one or more application rules, a type of trigger event triggering the MSP Server selection, data offloading conditions, location of the individual vUE, or MSP Server capabilities.

6. The computing system of claim 1, wherein the processing circuitry is arranged to operate the target server selector to:
    determine or identify a target MSP Server identity (ID), the target MSP Server ID including an internet protocol (IP) address, a Media Access Control (MAC) address, a universally unique identifier (UUID), a resolvable fully qualified domain name (FQDN), socket, or a port number.

7. The computing system of claim 6, wherein the processing circuitry is arranged to operate the target server selector to:
    generate the selection notification to include the target MSP Server ID.

8. The computing system of claim 1, wherein the network interface circuitry is further arranged to:
    send the selection notification to a source MSP Server, the source MSP Server is an MSP Server currently serving the individual vUE, and the selection notification is to cause the source MSP Server to perform a data transfer procedure with the target MSP Server.

9. One or more non-transitory computer-readable media (NTCRM) comprising instructions, wherein execution of the instructions by one or more processors of a Mobility Service Provider (MSP) center server is to cause the MSP center server to:
    receive a first notification indicating occurrence of a trigger event to select an MSP edge server among a plurality of MSP edge servers to serve a vehicle system;
    perform an MSP server selection procedure to select a target MSP edge server of the plurality of MSP edge servers to serve the vehicle system, wherein to perform the MSP server slection procedure, execution of the instructions is to cause the MSP center server to:
    determine or identify a target MSP edge server identity (ID), the target MSP edge server ID including an internet protocol (AP) address, a Media Access Control (MAC) address, a universally unique identifier (UUID), a resolvable fully qualified domain name (FQDN), socket, or a port number;
    generate a second notification to include the target MSP edge server ID;
    send the second notificication to the target MSP edge server to notify the target MSP edge server about the selection; and send a command to the vehicle system instructing the vehicle system to establish a communication session with the target MSP edge server.

10. The one or more NTCRM of claim 9, wherein, to receive the first notification, execution of the instructions is to cause the MSP center server to:
receive the first notification from an access network via a source MSP edge server of the plurality of MSP edge servers, the source MSP edge server is an MSP edge server currently serving the vehicle system.

11. The one or more NTCRM of claim 10, wherein execution of the instructions is to further cause the MSP center server to:
send a third notification to the access network to notify the access network about the selection; and
send a fourth notification to the source MSP edge server to notify the source MSP edge server about the selection, and the fourth notification is to cause the source MSP edge server to perform a data transfer procedure with the target MSP edge server.

12. The one or more NTCRM of claim 10, wherein, prior to receipt of the first notification, execution of the instructions is to cause the MSP center server to:
send a subscription request to the access network to subscribe to receive event notifications related to the vehicle system.

13. The one or more NTCRM of claim 12, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas.

14. The one or more NTCRM of claim 9, wherein execution of the instructions is to cause the MSP center server to:
generate the command to include the target MSP edge server ID.

15. A method of operating a vehicle user equipment (vUE), the method comprising:
receiving a first notification from a first access network based on detection of a trigger to reselect a Mobility Service Provider (MSP) Server serving the vUE, wherein the first notification includes an instruction to switch access networks, and includes information about one or more access networks including a second access network, wherein the information about the one or more access networks at least includes infomration about MSP Servers associated with each of the one or more access networks;
selecting the second access network based at least on the information included in the first notification;
performing a connection establishment procedure with the second access network in response to receipt of the notification, the second access network being associated with an MSP Server selected to serve the vUE; and
receiving a second notification from the selected MSP Server indicating successful establishment of a session or service with the selected MSP Server.

16. The method of claim 15, wherein the vUE is one of a vehicle, an in-vehicle system, an on-board unit, a smartphone within or connected to a vehicle, a tablet computer within or connected to a vehicle, a wearable device within or connected to a vehicle, a laptop computer within or connected to a vehicle, a wireless handset within or connected to a vehicle, an unmanned aerial vehicle, a drone, or a robot.

17. The method of claim 15, further comprising:
accessing one or more services from an MSP center server via the selected MSP Server.

18. A computing system to manage server selection for vehicle user equipment (vUEs), the computing system comprising:
processor circuitry coupled with network interface circuitry, the network interface circuitry arranged to communicatively couple the computing system with a plurality of edge servers, each of the plurality of edge servers are disposed at an edge of a communication network, and each of the plurality of edge servers are arranged to provide computing resources to one or more vUEs, and wherein:
the processor circuitry is arranged to, in response to detection of an event trigger, select an edge server of the plurality of edge servers to serve an individual vUE of the one or more vUEs, wherein the selection is based on an application rule indicating how to select the edge server based on the detected event trigger; and
the network interface circuitry is arranged to:
send a selection notification to the individual vUE, the selection notification indicating the selected edge server, and
receive a configuration from a selection function, the configuration indicating one or more application rules for edge serve reselection and one or more event triggers, the detected event trigger being among the one or more event triggers, and the application rule used for the selection is among the one or more application rules.

19. The computing system of claim 18, wherein the network interface circuitry is further arranged to:
send the selection notification to the selected edge server and a current edge server currently serving the individual vUE, the selection notification causing the selected edge server and the current edge server to perform a background data transfer procedure.

20. The computing system of claim 18, wherein the one or more event triggers include one or more of receipt of measurement reports from the individual vUE, signal measurements indicated by the measurement reports being above or below a threshold signal strength or signal quality, timer expiry, location changes of the individual vUE, network congestion level being above or below a threshold congestion level, a latency measurement being above or below a threshold latency value, or a number of vehicle systems in one or more geographical areas.

21. A computing system to perform Mobility Service Provider (MSP) Server selection for one or more vehicle user equipment (vUEs), the computing system comprising:
network interface circuitry arranged to communicatively couple the computing system with a plurality of MSP Servers, each of the plurality of MSP Servers are communicatively coupled with one another to form an MSP network, and
processing circuitry coupled with network interface circuitry, wherein the processing circuitry is arranged to operate a selection function to:
select a target MSP Server of the plurality of MSP Servers to serve an individual vUE of the one or more vUEs, wherein the selection function is operated in response to a detection of a trigger to perform an MSP Server selection procedure, determine or identify a target MSP Server identity (ID), the target MSP Server ID including an internet protocol (IP) address, a Media Access Control (MAC) address, a universally unique identifier (UUID), a resolvable fully qualified domain name (FQDN), socket, or a port number, and generate a selection notification to include the target MSP Server ID; and the network interface circuitry is arranged to send the selection notification to the target MSP Server and the individual vUE, the selection notification indicating the target MSP Server as the selected MSP Server.

22. The computing system of claim 21, wherein the network interface circuitry is further arranged to:

receive a trigger notification from an access network indicating the detection of the trigger by the access network.

23. The computing system of claim 22, wherein the network interface circuitry is further arranged to:

send a subscription request to the access network to subscribe to receive event notifications related to the one or more vUEs.

24. The computing system of claim 23, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas.

25. The computing system of claim 21, wherein the processing circuitry is arranged to operate the selection function to select the target MSP Server based on one or more of Radio Access Network (RAN) information, one or more policies, one or more application rules, a type of trigger event triggering the MSP Server selection, data offloading conditions, location of the individual vUE, or MSP Server capabilities.

26. The computing system of claim 21, wherein the network interface circuitry is further arranged to:

send the selection notification to a source MSP Server, the source MSP Server is an MSP Server currently serving the vUE, and the selection notification is to cause the source MSP Server to perform a data transfer procedure with the target MSP Server.

27. The computing system of claim 21, wherein:

the plurality of MSP Servers include MSP edge servers or MSP center servers; and the computing system is a Domain Name System (DNS) server, an MSP center server, or an MSP edge server.

28. The computing system of claim 27, wherein the MSP edge servers are Multi-access Edge Computing (MEC) hosts or Content Delivery Network (CDN) node, and the access network is one of a Third Generation Partnership Project (3GPP) network or a Wireless Local Area Network (WLAN).

29. One or more non-transitory computer-readable media (NTCRM) comprising instructions, wherein execution of the instructions by one or more processors of a Mobility Service Provider (MSP) center server is to cause the MSP center server to:

receive, from an access network via a source MSP edge server of a plurality of MSP edge servers, a first notification indicating occurrence of a trigger event to select an MSP edge server among a plurality of MSP edge servers to serve a vehicle system, wherein the source MSP edge server is an MSP edge server currently serving the vehicle system;

perform an MSP server selection procedure to select a target MSP edge server of the plurality of MSP edge servers to serve the vehicle system;

send a second notification to the target MSP edge server to notify the target MSP edge server about the selection;

send an instruction to the vehicle system instructing the vehicle system to establish a communication session with the target MSP edge server;

send a third notification to the access network to notify the access network about the selection; and send a fourth notification to the source MSP edge server to notify the source MSP edge server about the selection, and the fourth notification is to cause the source MSP edge server to perform a data transfer procedure with the target MSP edge server.

30. The one or more NTCRM of claim 29, wherein, prior to receipt of the first notification, execution of the instructions is to cause the MSP center server to:

send a subscription request to the access network to subscribe to receive event notifications related to the vehicle system.

31. The one or more NTCRM of claim 30, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas.

32. The one or more NTCRM of claim 29, wherein, to perform the MSP server selection procedure, execution of the instructions is to cause the MSP center server to:

determine or identify a target MSP edge server identity (ID), the target MSP edge server ID including an internet protocol (AP) address, a Media Access Control (MAC) address, a universally unique identifier (UUID), a resolvable fully qualified domain name (FQDN), socket, or a port number.

33. The one or more NTCRM of claim 32, wherein execution of the instructions is to cause the MSP center server to:

generate the second notification to include the target MSP edge server ID.

34. The one or more NTCRM of claim 32, wherein execution of the instructions is to cause the MSP center server to:

generate the instruction to include the target MSP edge server ID.

35. One or more non-transitory computer-readable media (NTCRM) comprising instructions, wherein execution of the instructions by one or more processors of a Mobility Service Provider (MSP) center server is to cause the MSP center server to:

receive a first notification indicating occurrence of a trigger event to select an MSP edge server among a plurality of MSP edge servers to serve a vehicle system;

perform an MSP server selection procedure to select a target MSP edge server of the plurality of MSP edge servers to serve the vehicle system, wherein, to perform the MSP server selection procedure, execution of the instructions is to cause the MSP center server to determine or identify a target MSP edge server identity (ID), the target MSP edge server ID including an internet protocol (AP) address, a Media Access Control (MAC) address, a universally unique identifier (UUID), a resolvable fully qualified domain name (FQDN), socket, or a port number;

send a second notification to the target MSP edge server to notify the target MSP edge server about the selection;

generate a command to include the target MSP edge server ID; and send the command to the vehicle system instructing the vehicle system to establish a communication session with the target MSP edge server.

36. The one or more NTCRM of claim 35, wherein, to receive the first notification, execution of the instructions is to cause the MSP center server to:

receive the first notification from an access network via a source MSP edge server of the plurality of MSP edge servers, the source MSP edge server is an MSP edge server currently serving the vehicle system.

37. The one or more NTCRM of claim 36, wherein execution of the instructions is to further cause the MSP center server to:

send a third notification to the access network to notify the access network about the selection; and send a fourth notification to the source MSP edge server to notify the source MSP edge server about the selection, and the fourth notification is to cause the source MSP edge server to perform a data transfer procedure with the target MSP edge server.

38. The one or more NTCRM of claim 36, wherein, prior to receipt of the first notification, execution of the instructions is to cause the MSP center server to:

send a subscription request to the access network to subscribe to receive event notifications related to the vehicle system.

39. The one or more NTCRM of claim 38, wherein the subscribed events include one or more of receipt of measurement reports from the vehicle system, signal measurements being above or below a threshold signal strength or signal quality, timer expiry, location changes of the vehicle system, network congestion level being above or below a threshold congestion level, a latency measurement being above or below a threshold latency value, or a number of vehicle systems in one or more geographical areas.

40. The one or more NTCRM of claim 35, wherein, to perform the MSP server selection procedure, execution of the instructions is to cause the MSP center server to:

determine or identify a target MSP edge server identity (ID), the target MSP edge server ID including an internet protocol (AP) address, a Media Access Control (MAC) address, a universally unique identifier (UUID), a resolvable fully qualified domain name (FQDN), socket, or a port number.

41. The one or more NTCRM of claim 40, wherein execution of the instructions is to cause the MSP center server to:

generate the second notification to include the target MSP edge server ID.

* * * * *